(12) United States Patent
Yang et al.

(10) Patent No.: US 11,049,399 B2
(45) Date of Patent: Jun. 29, 2021

(54) V2X COMMUNICATION DEVICE AND METHOD FOR TRANSMITTING AND RECEIVING V2X MESSAGE THEREOF

(71) Applicant: LG ELECTRONICS INC., Seoul (KR)

(72) Inventors: Seungryul Yang, Seoul (KR); Woosuk Ko, Seoul (KR); Jinwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/959,111

(22) PCT Filed: Dec. 29, 2017

(86) PCT No.: PCT/KR2017/015762
§ 371 (c)(1),
(2) Date: Sep. 16, 2020

(87) PCT Pub. No.: WO2019/132082
PCT Pub. Date: Jul. 4, 2019

(65) Prior Publication Data
US 2021/0012661 A1    Jan. 14, 2021

(51) Int. Cl.
*B60Q 1/00* (2006.01)
*G08G 1/16* (2006.01)
(Continued)

(52) U.S. Cl.
CPC ........... *G08G 1/162* (2013.01); *B60W 30/165* (2013.01); *G08G 1/0112* (2013.01); *G08G 1/166* (2013.01);
(Continued)

(58) Field of Classification Search
CPC ...... G08G 1/162; G08G 1/0112; G08G 1/166; G08G 1/167; G08G 1/00; H04W 4/02;
(Continued)

(56) References Cited

U.S. PATENT DOCUMENTS

2018/0093668 A1* 4/2018 Kim ................. B60W 50/14
2018/0227729 A1* 8/2018 Bai .................... G08G 1/22

FOREIGN PATENT DOCUMENTS

KR    10-2016-0009828    1/2016
KR    10-2017-0025306    3/2017
(Continued)

OTHER PUBLICATIONS

PCT International Application No. PCT/KR2017/015762, International Search Report dated Sep. 28, 2018, 4 pages.
(Continued)

*Primary Examiner* — Toan N Pham
(74) *Attorney, Agent, or Firm* — Lee, Hong, Degerman, Kang & Waimey PC

(57) ABSTRACT

Disclosed is a method for transmitting a vehicle-to-everything (V2X) message by a V2X communication device of a vehicle. The method for transmitting a V2X message by a V2X communication device of a vehicle comprises the steps of detecting a lane change of a target vehicle followed by the subject vehicle; setting a CACC mode on the basis of a preset operation determination for a lane change when the lane change of the target vehicle is detected; and transmitting a V2X message including information on the set CACC mode, wherein the CACC mode includes a single-lane CACC mode for providing a single-lane CACC service and a multi-lane CACC mode for providing a multi-lane CACC service.

14 Claims, 44 Drawing Sheets

(51) Int. Cl.
*H04W 4/40* (2018.01)
*B60W 30/165* (2020.01)
*G08G 1/01* (2006.01)
*H04W 4/02* (2018.01)

(52) U.S. Cl.
CPC .............. *G08G 1/167* (2013.01); *H04W 4/02* (2013.01); *H04W 4/40* (2018.02)

(58) Field of Classification Search
CPC .......... H04W 4/40; H04W 4/46; H04W 4/80; H04W 72/1231; H04W 76/14; H04W 72/0406; H04W 8/22; H04W 72/048; B60W 30/165; B60W 30/09; B60W 30/143
See application file for complete search history.

(56) References Cited

FOREIGN PATENT DOCUMENTS

| | | |
|---|---|---|
| KR | 10-2017-0067555 | 6/2017 |
| KR | 10-2017-0088450 | 8/2017 |

OTHER PUBLICATIONS

Sang-Ung Park, et al., "Empirical Analysis on Radio Communication Range and Vehicle Ratio in V2X Environment", http://dx.doi.org/10.12815/kits.2016.15.5.029, Oct. 2016, 13 pages.

\* cited by examiner

[FIG. 1]
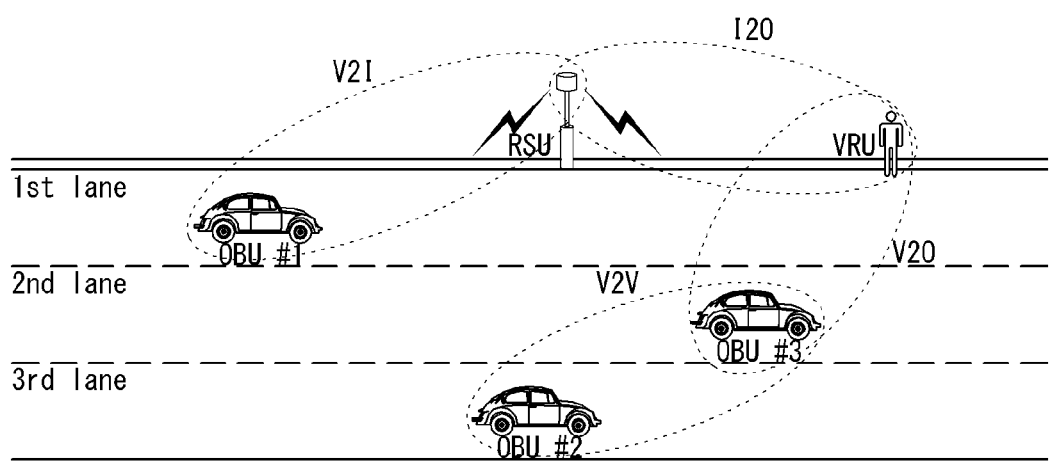

[FIG. 2]
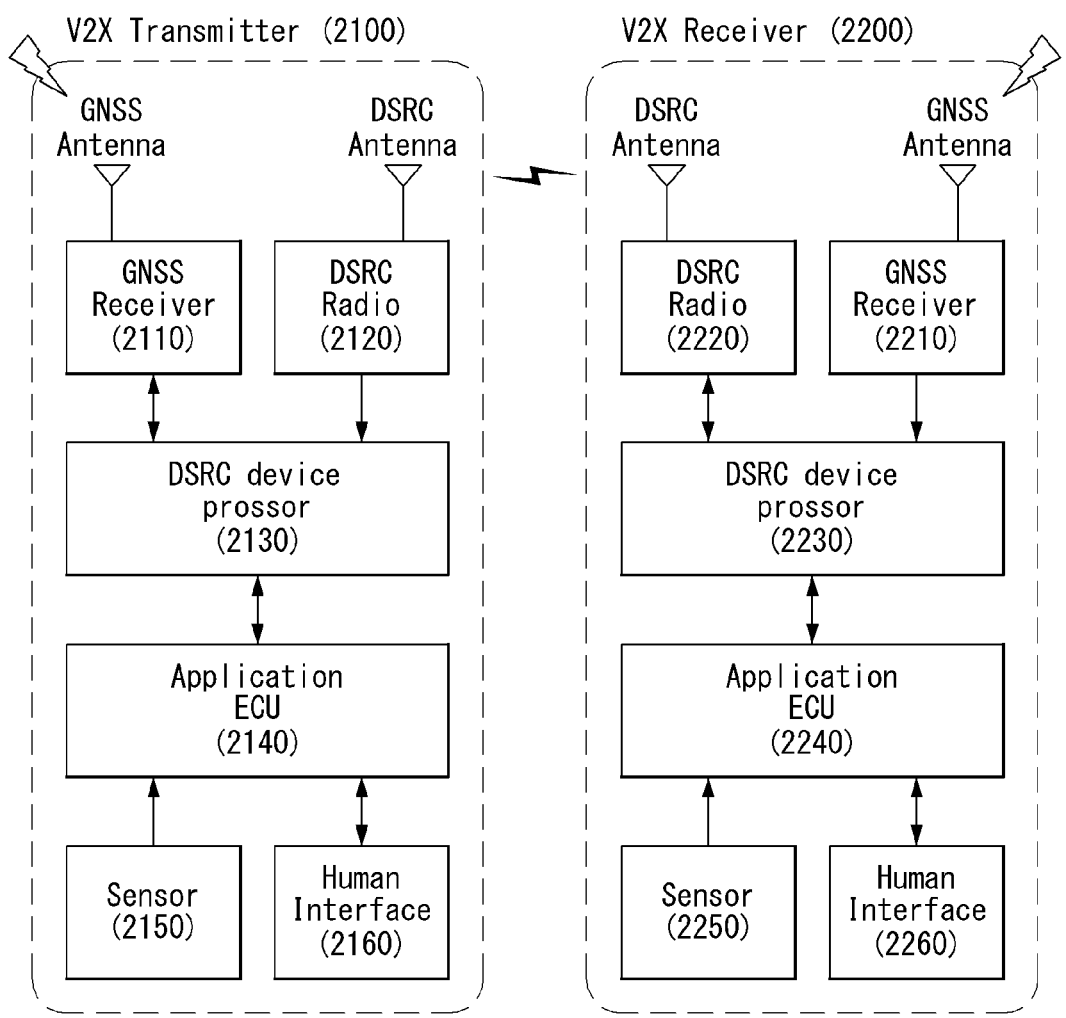

[FIG. 3]
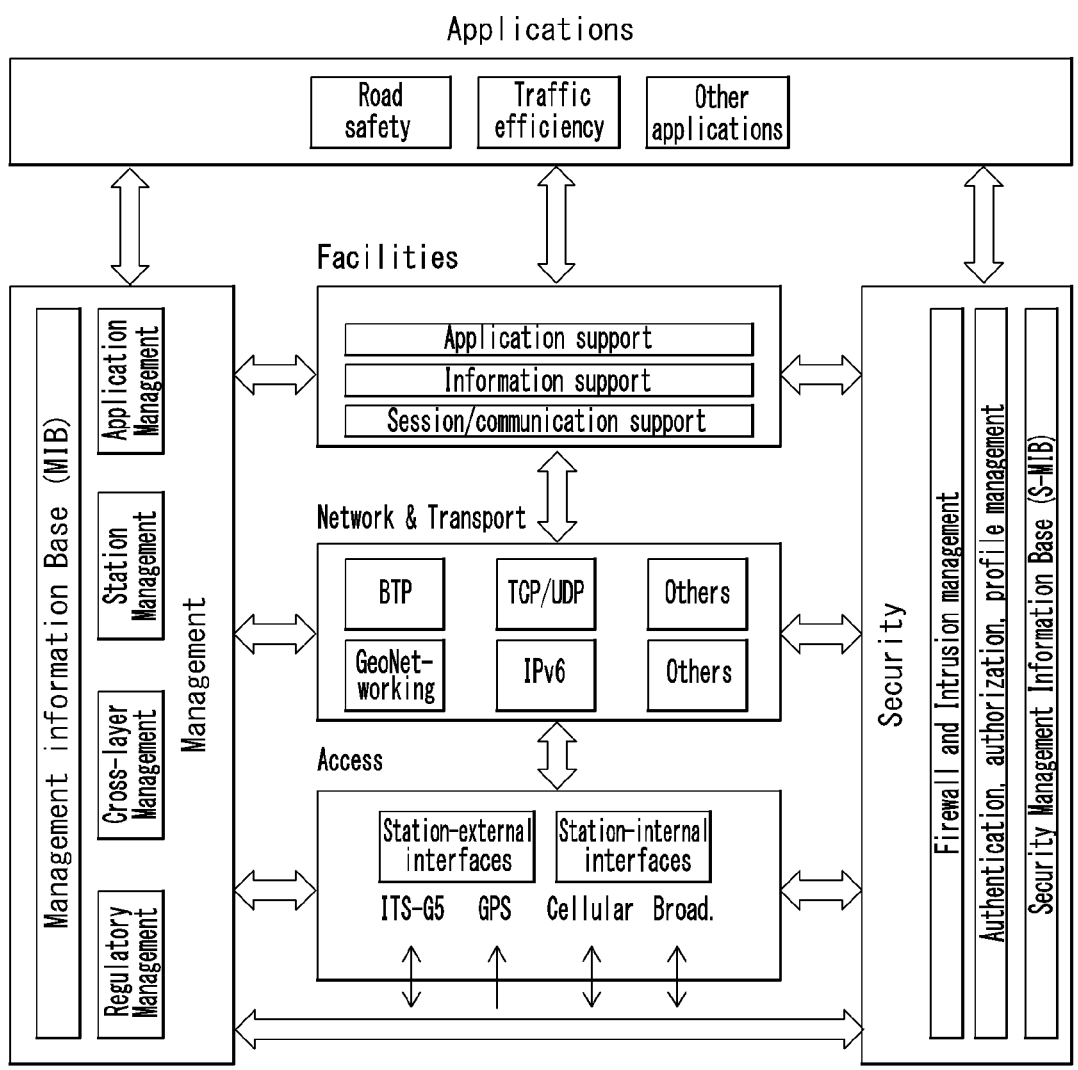

[FIG. 4]
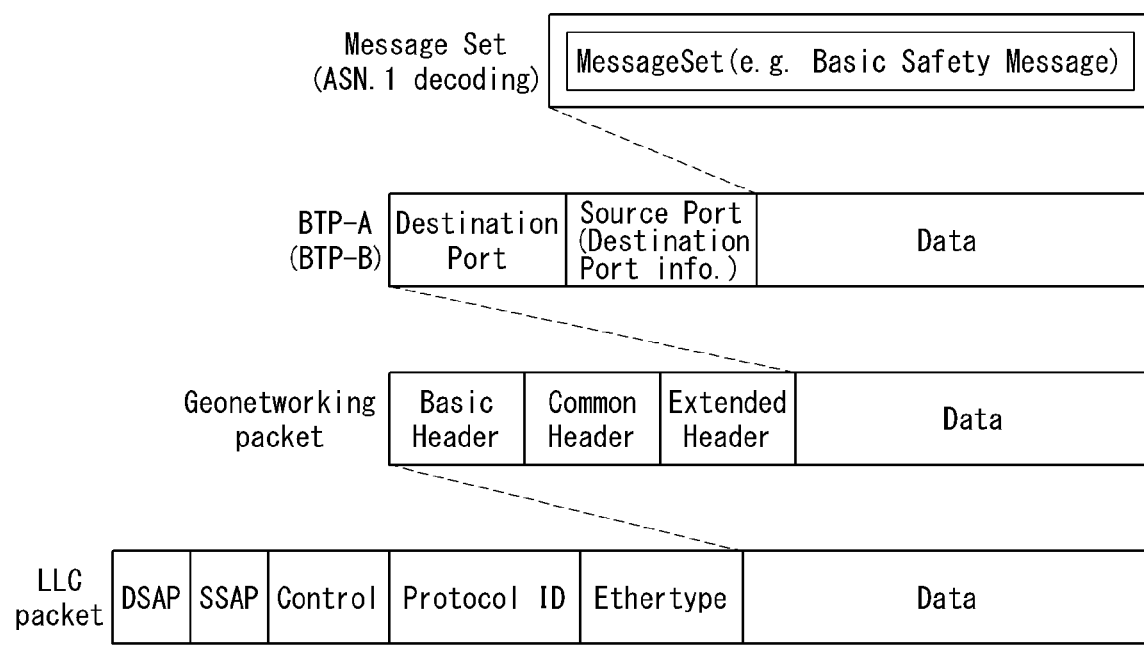

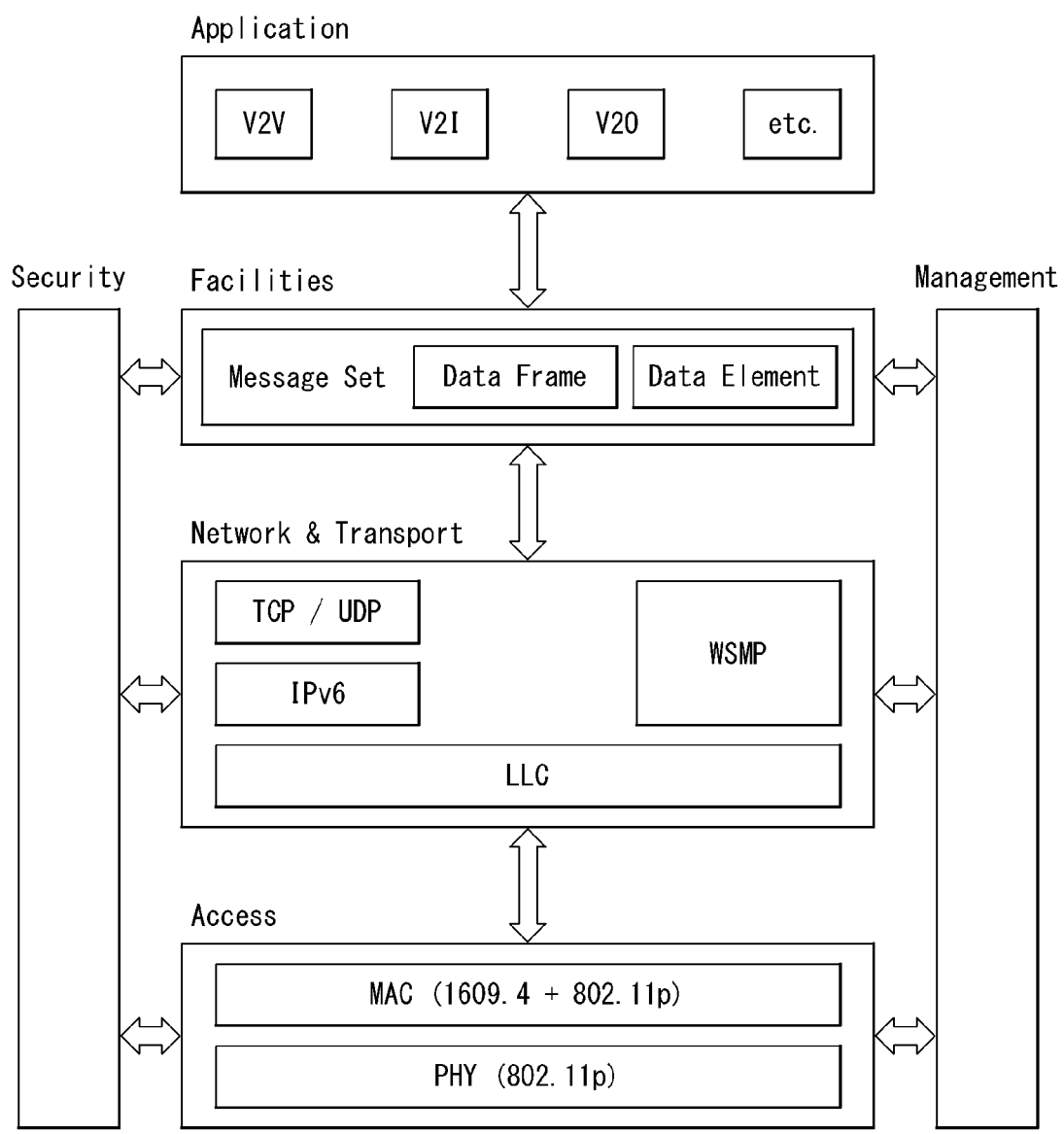
[FIG. 5]

[FIG. 6]
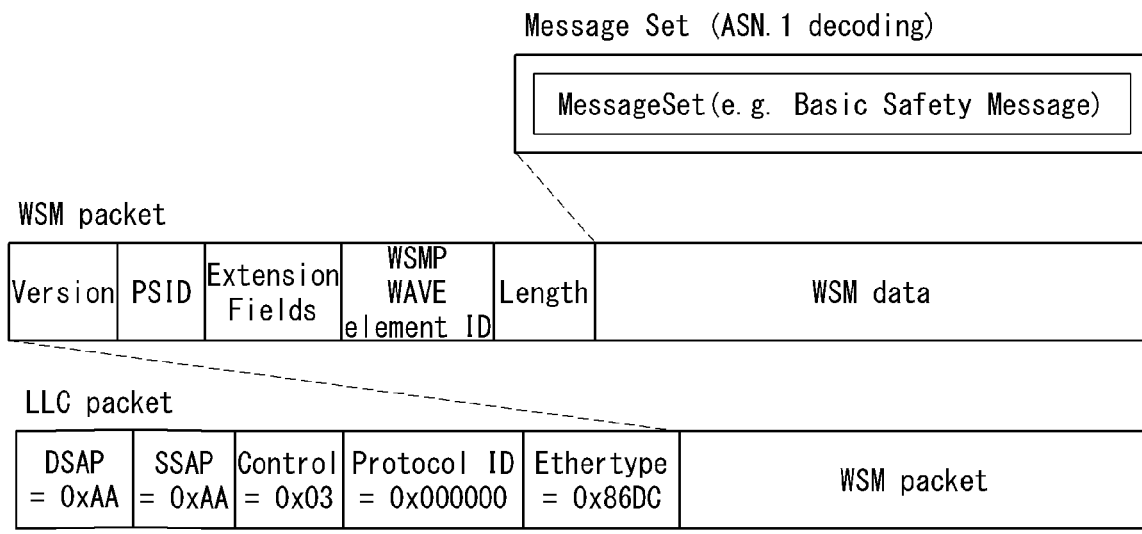

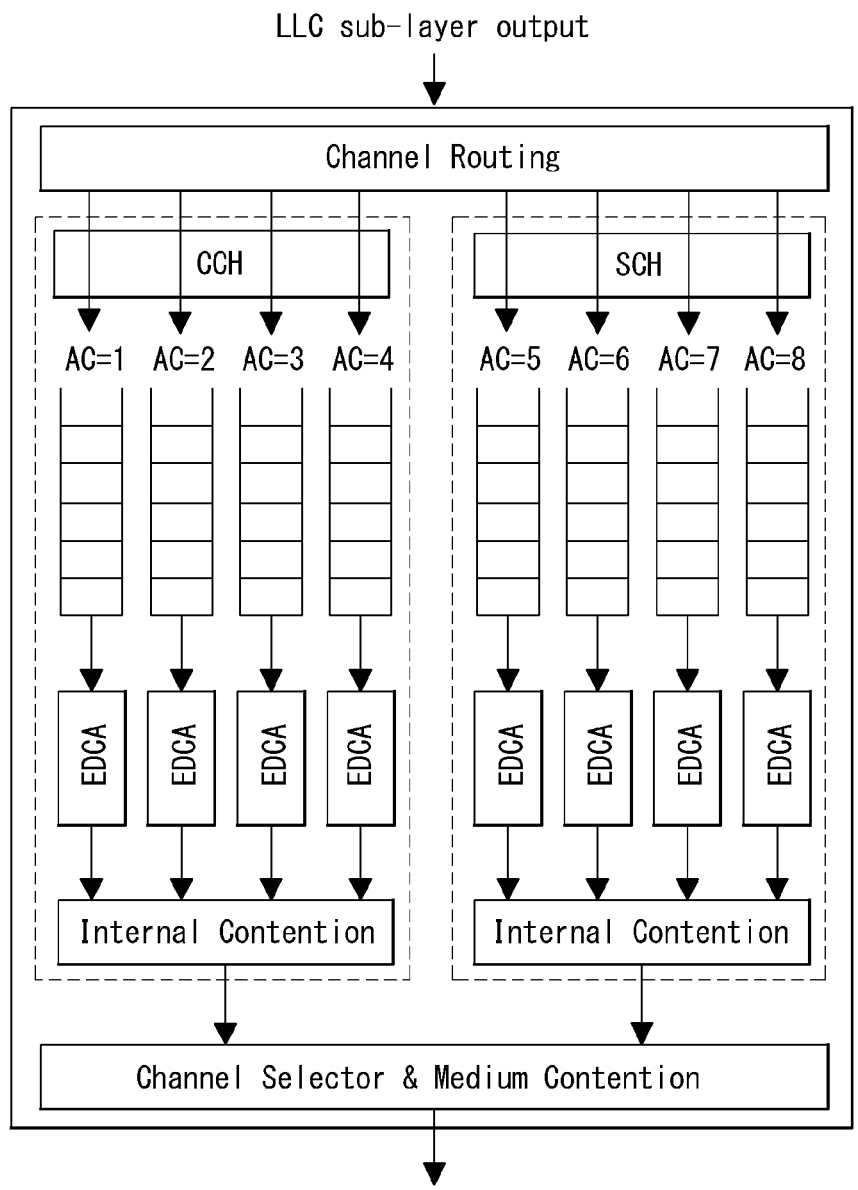
[FIG. 7]

[FIG. 8]
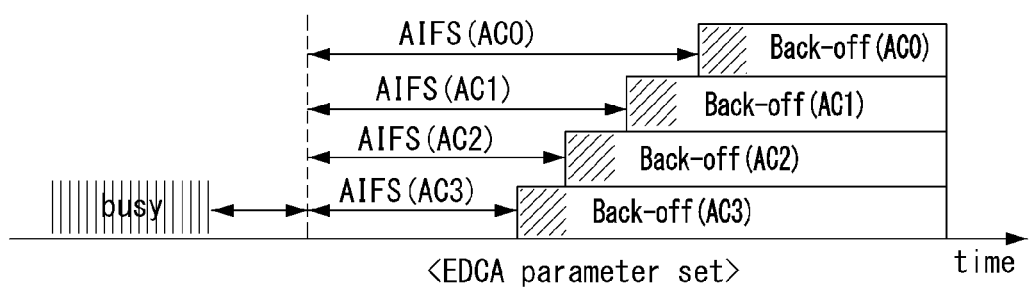

[FIG. 9]
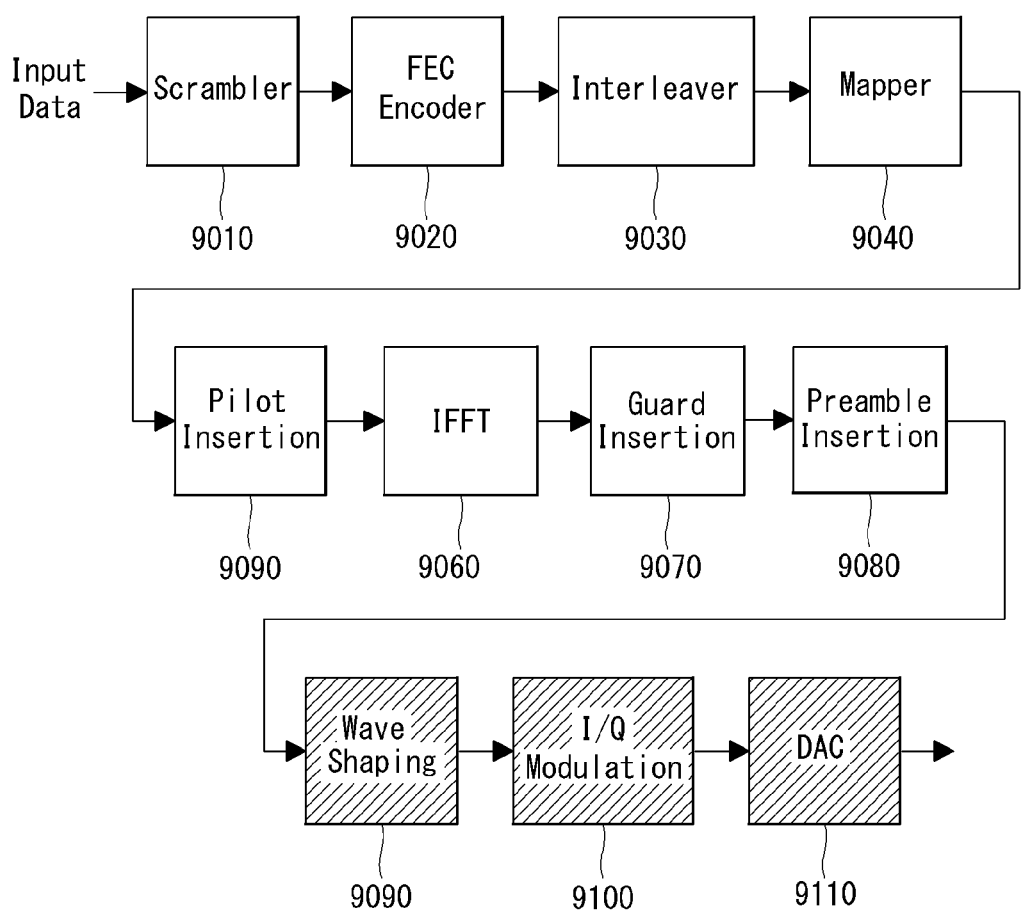

[FIG. 10a]
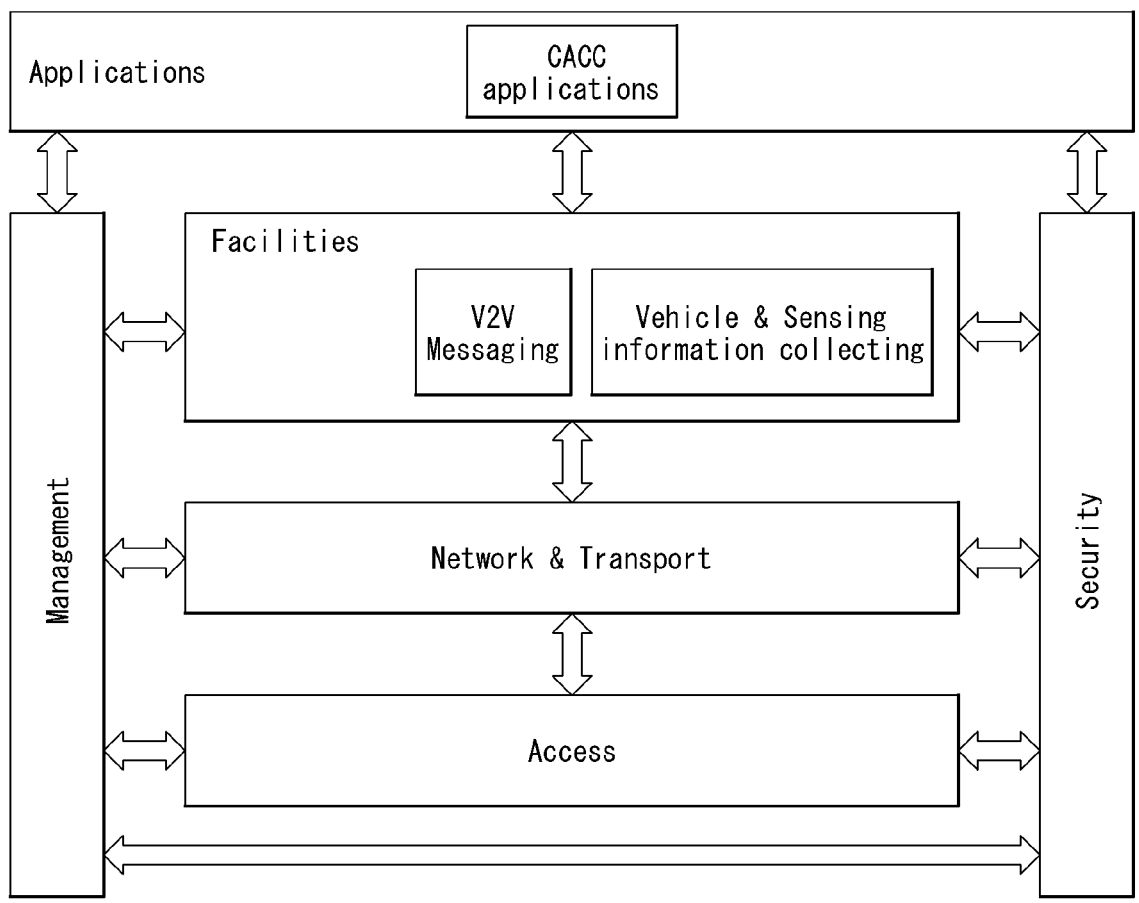

[FIG. 10b]
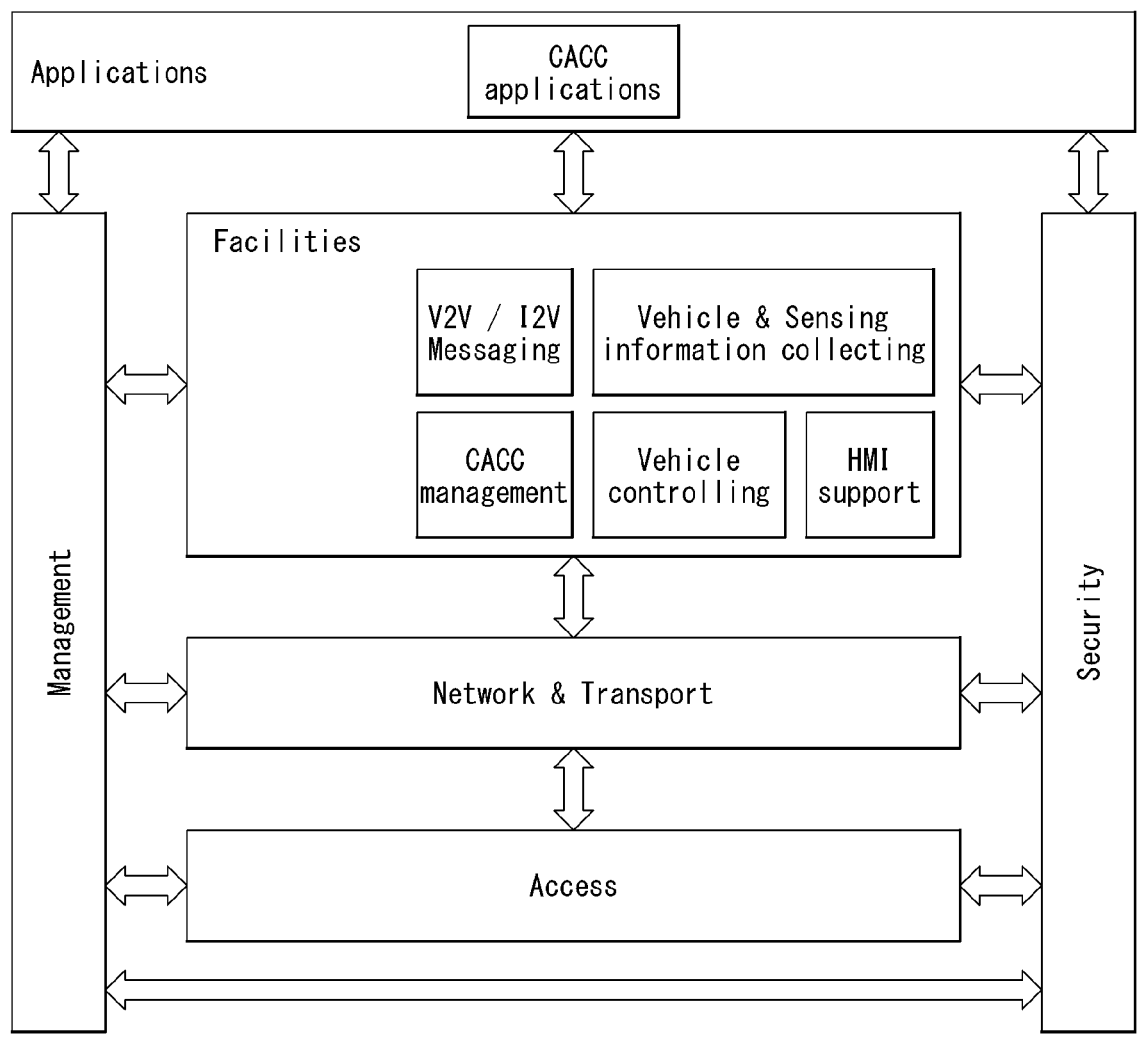

【FIG. 11a】
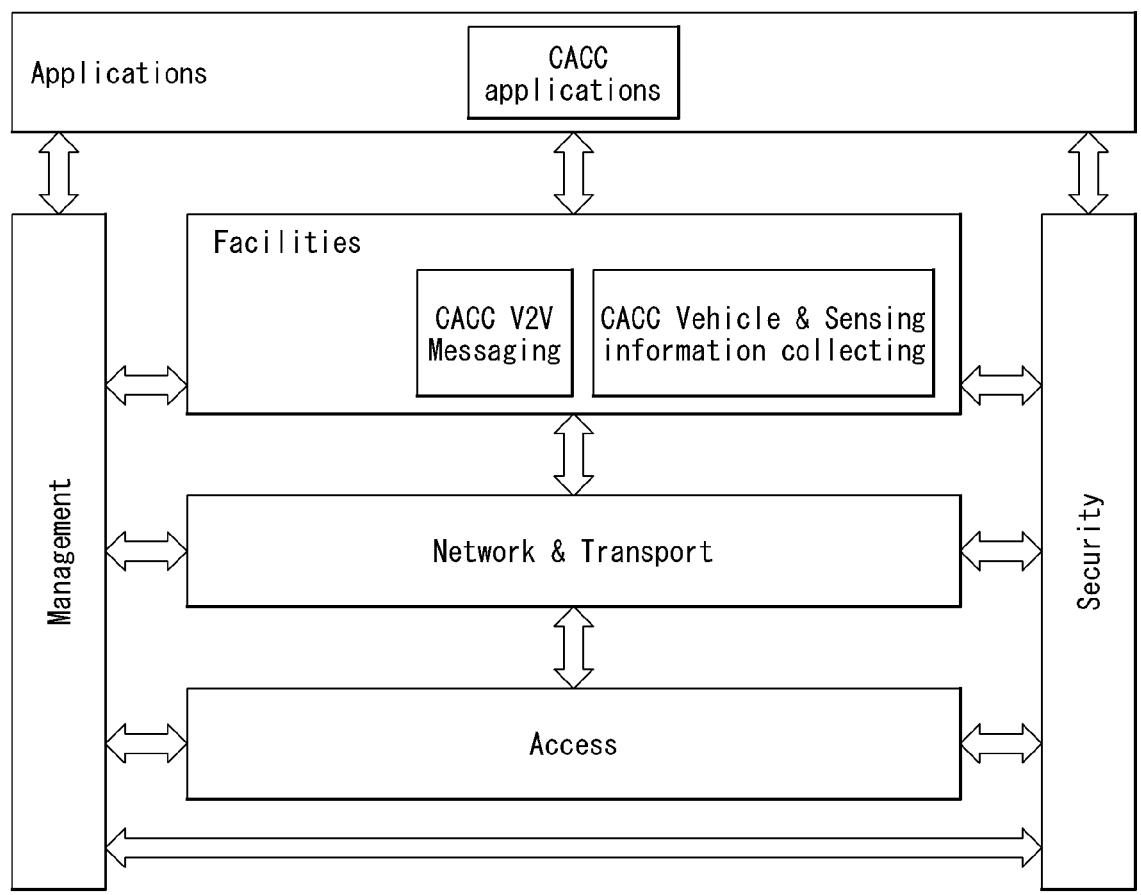

[FIG. 11b]
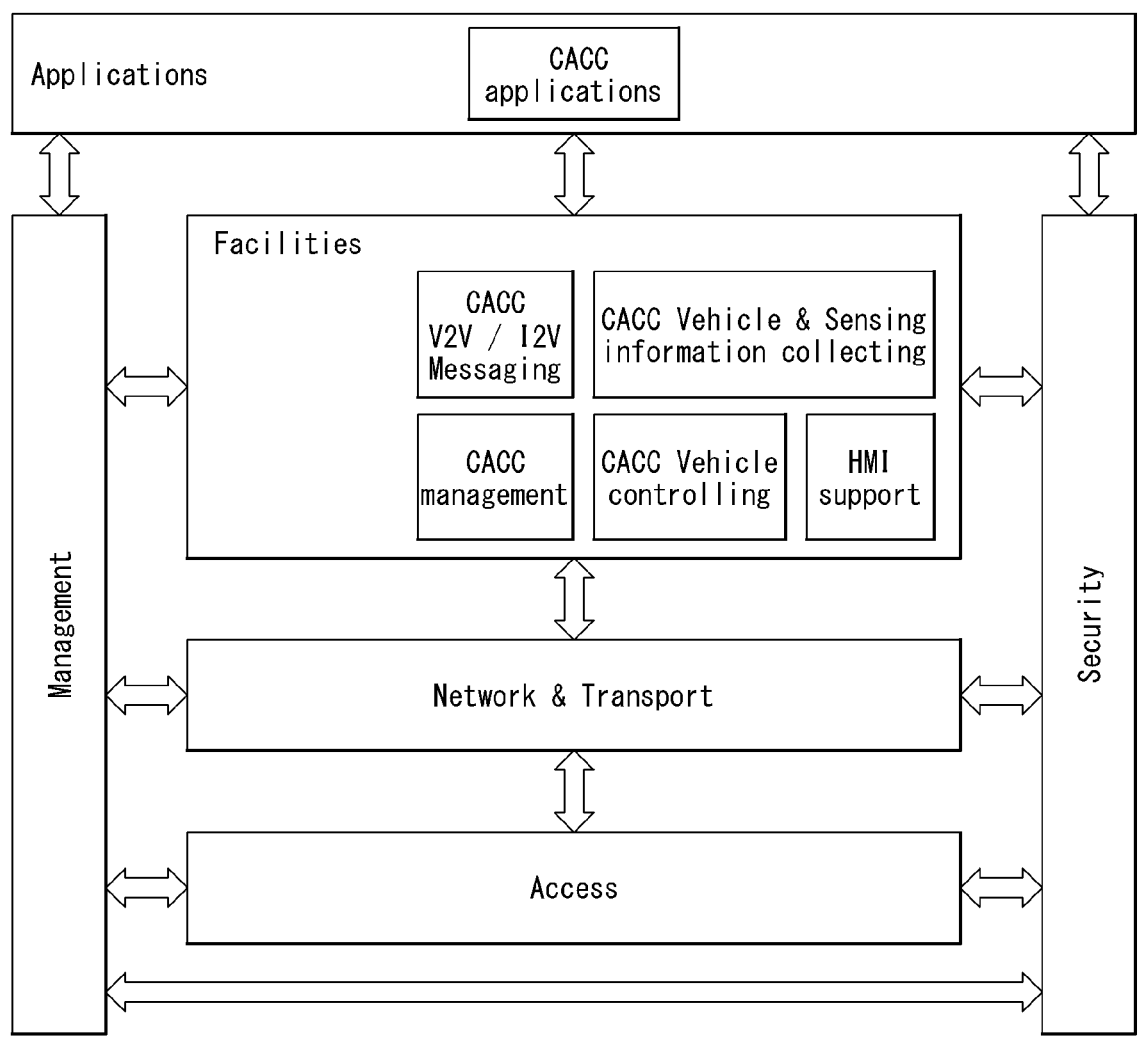

【FIG. 12】
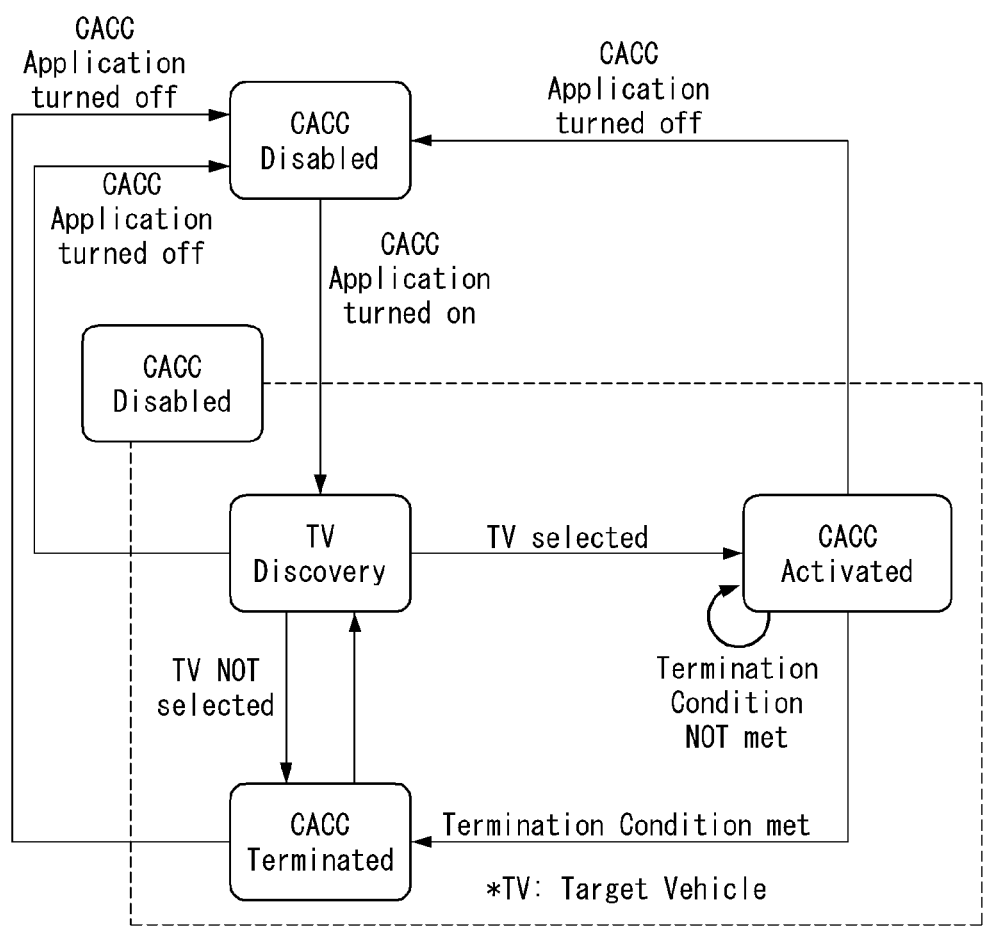

[FIG. 13]
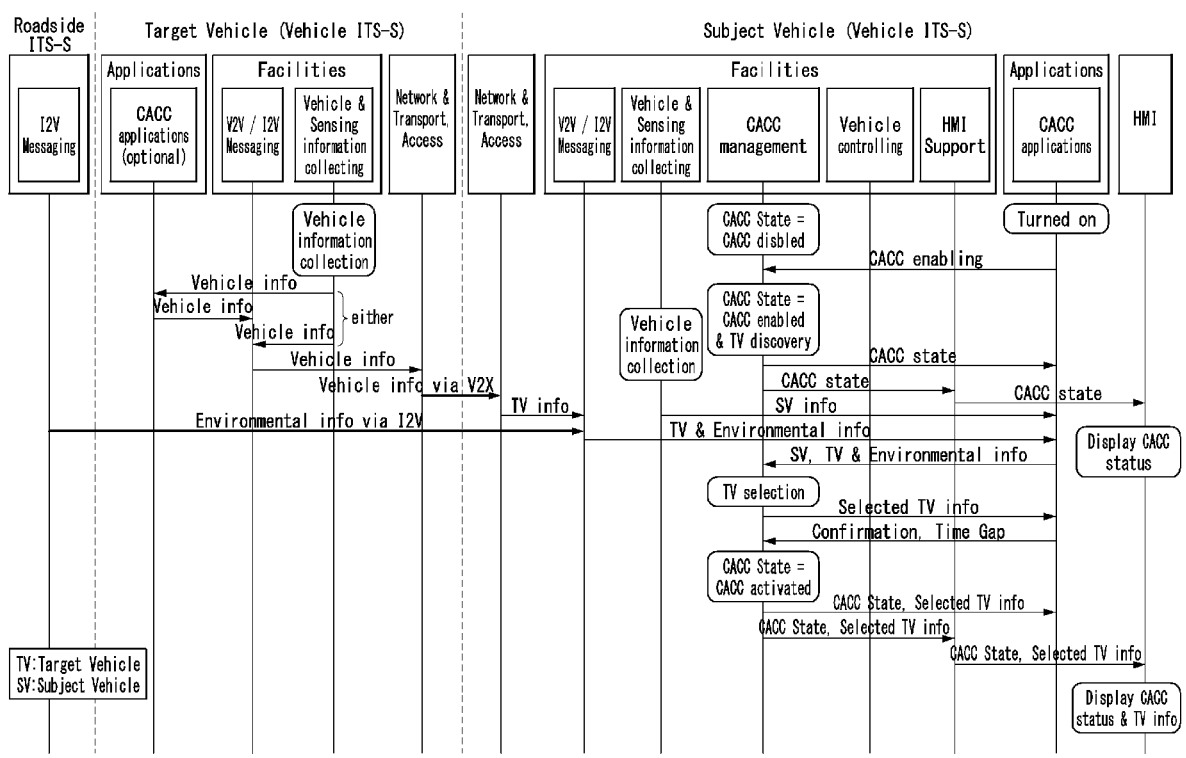

[FIG. 14]
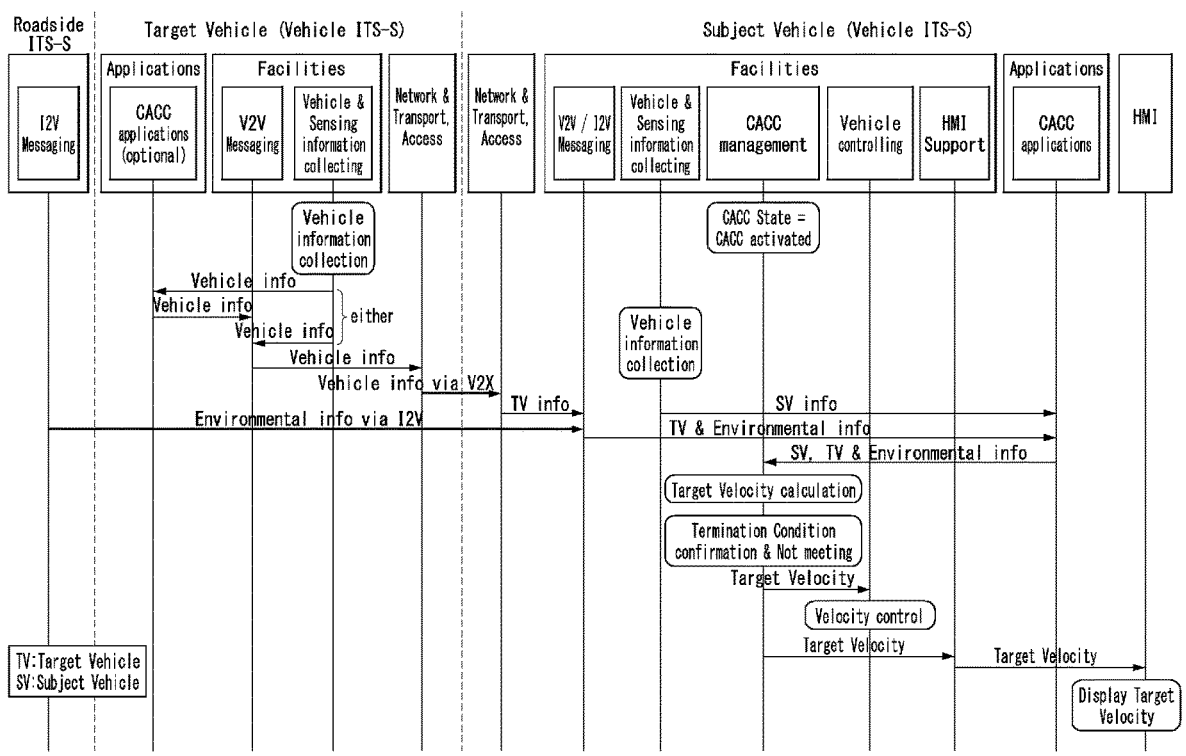

[FIG. 15]
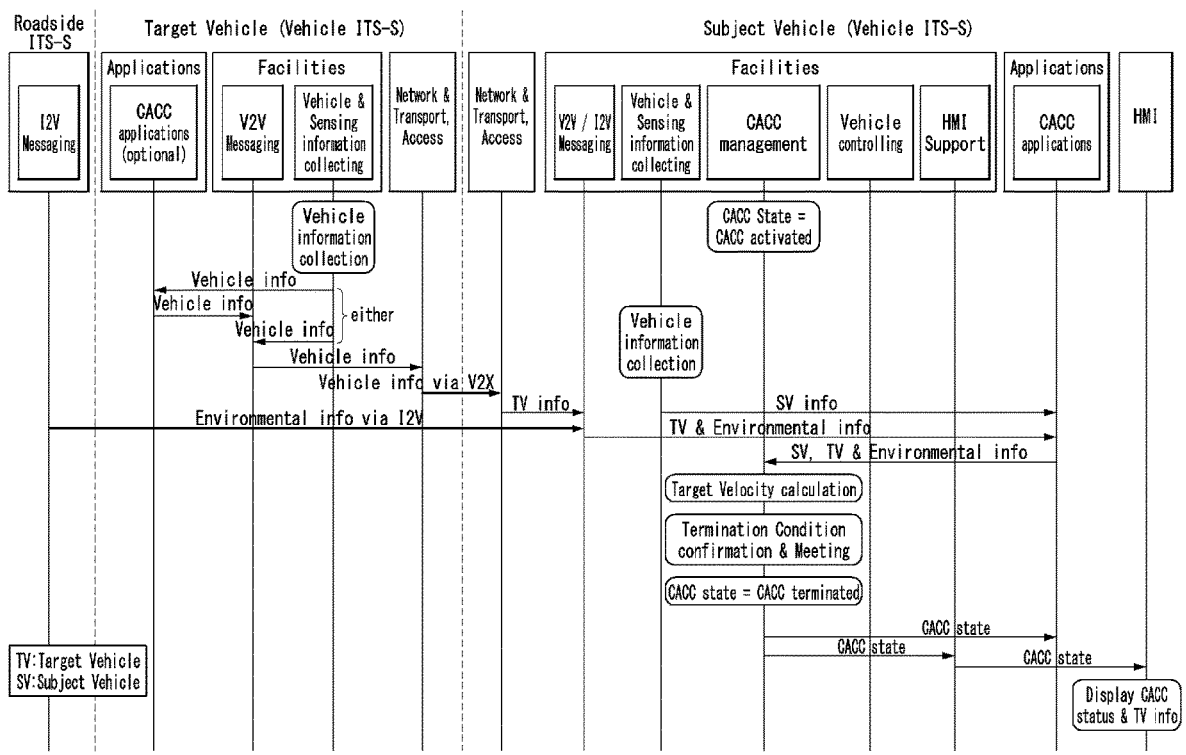

[FIG. 16]
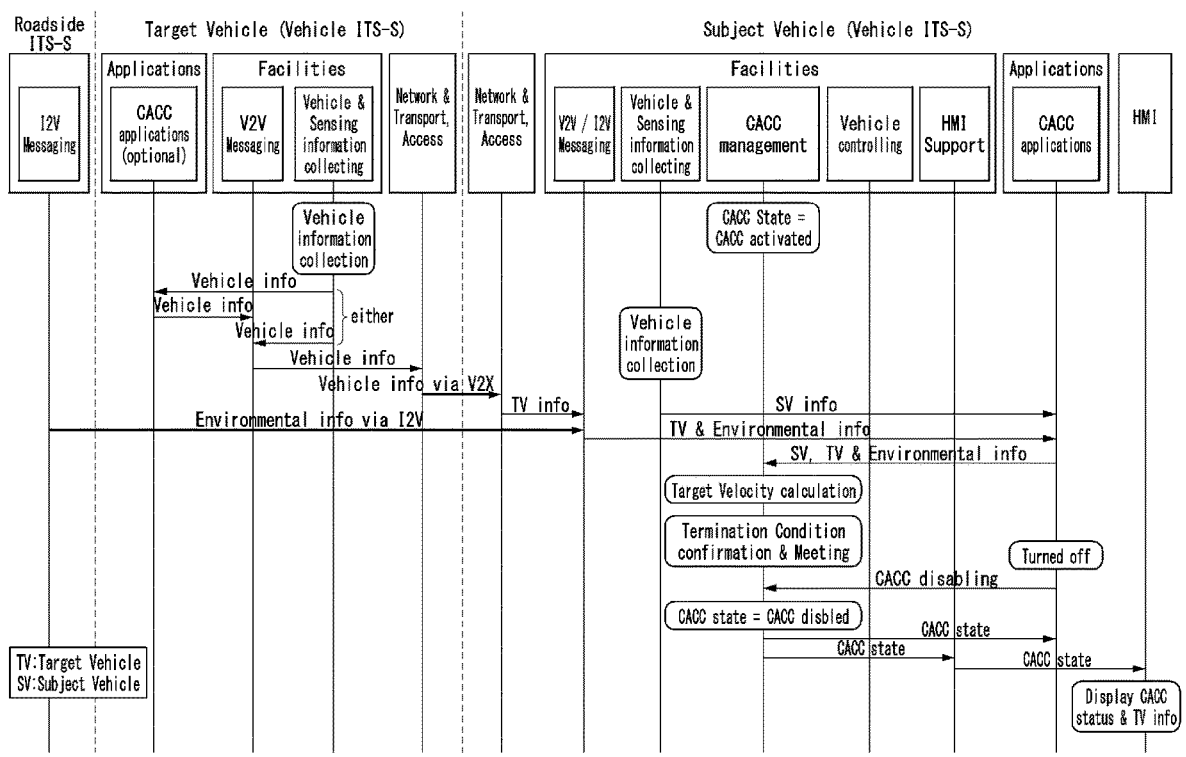

[FIG. 17]
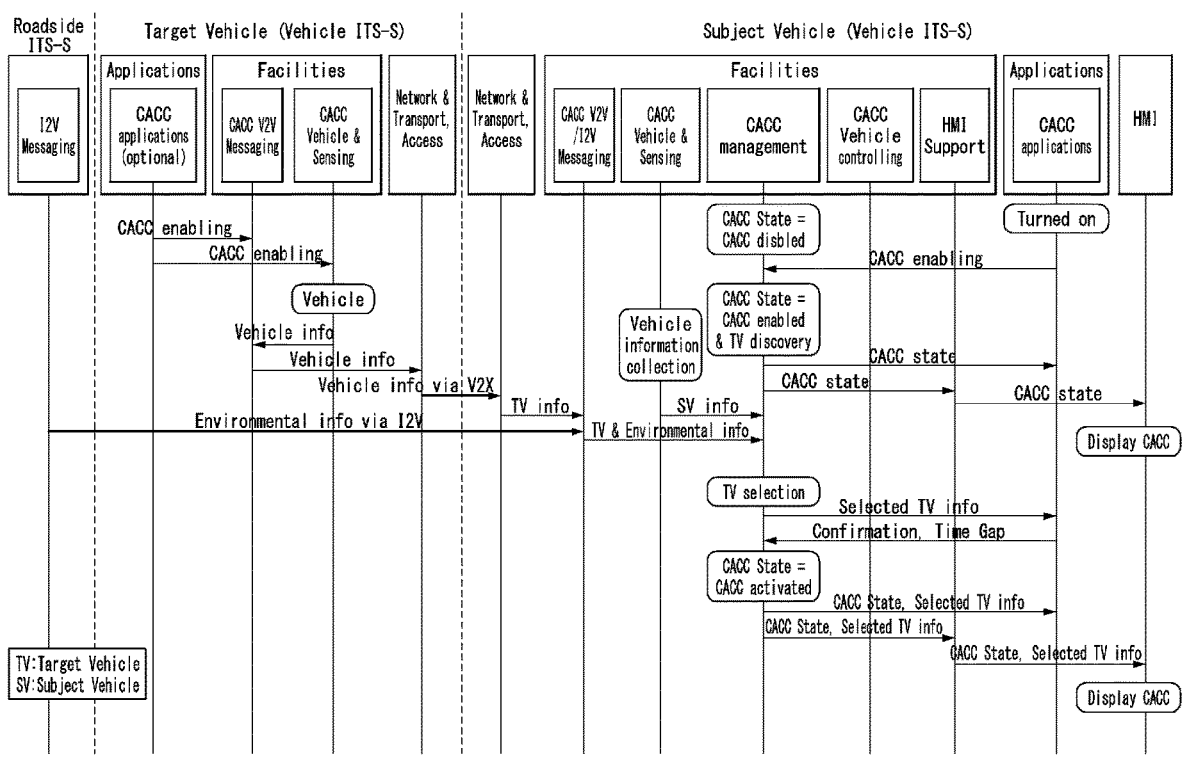

[FIG. 18]
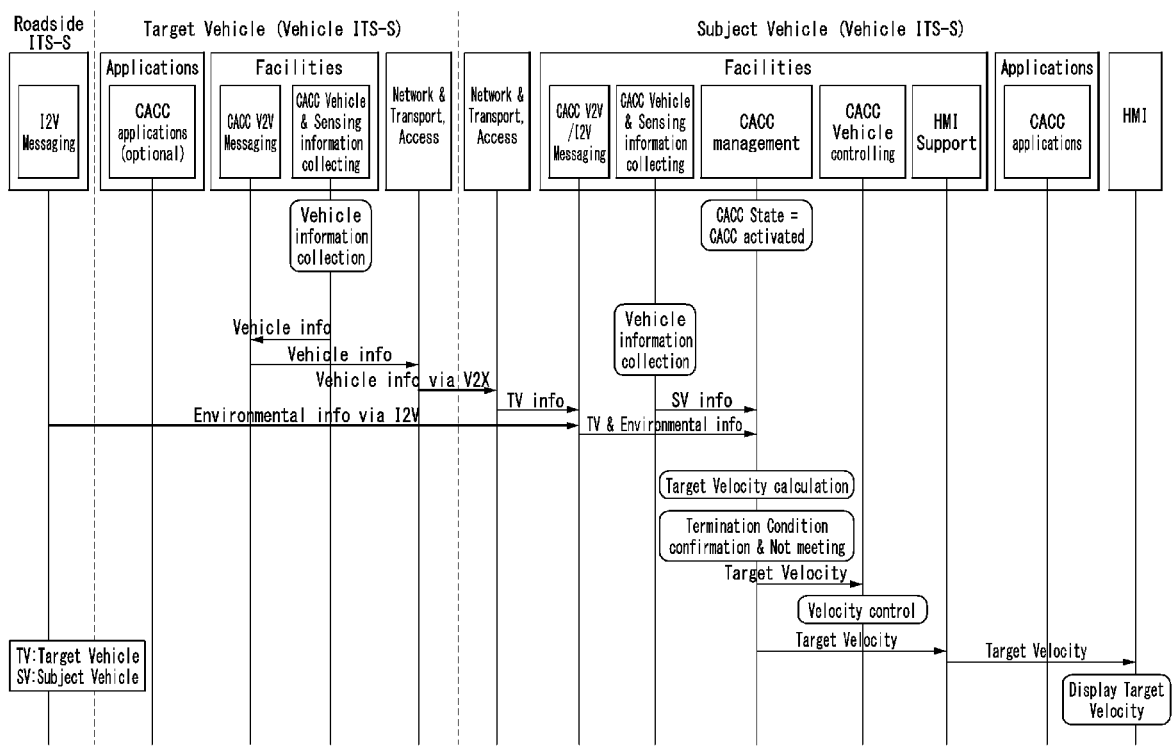

[FIG. 19]
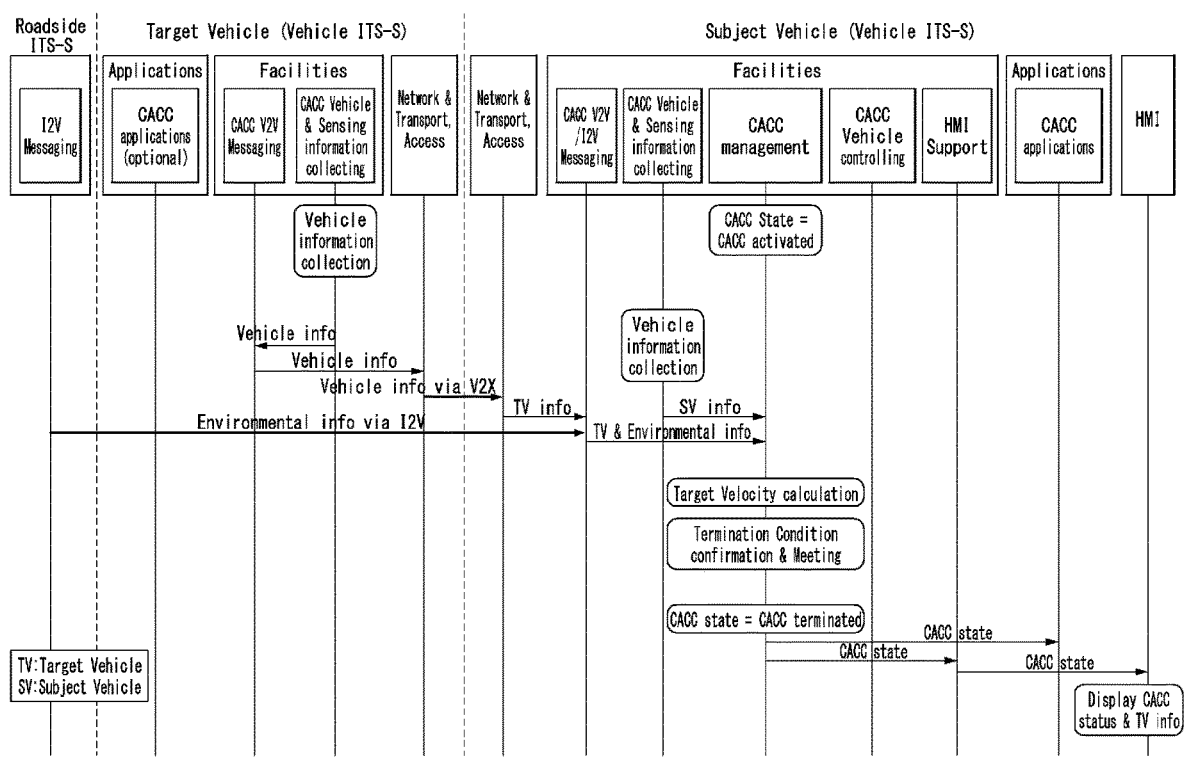

[FIG. 20]
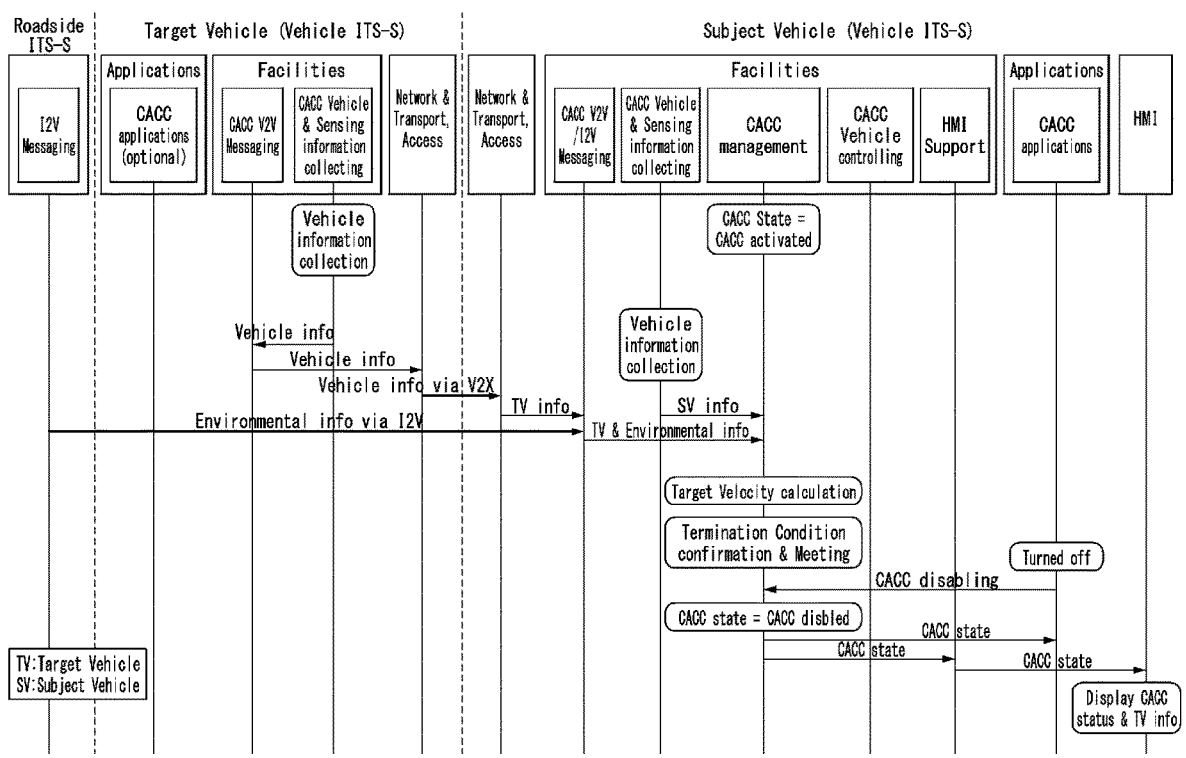

[FIG. 21]
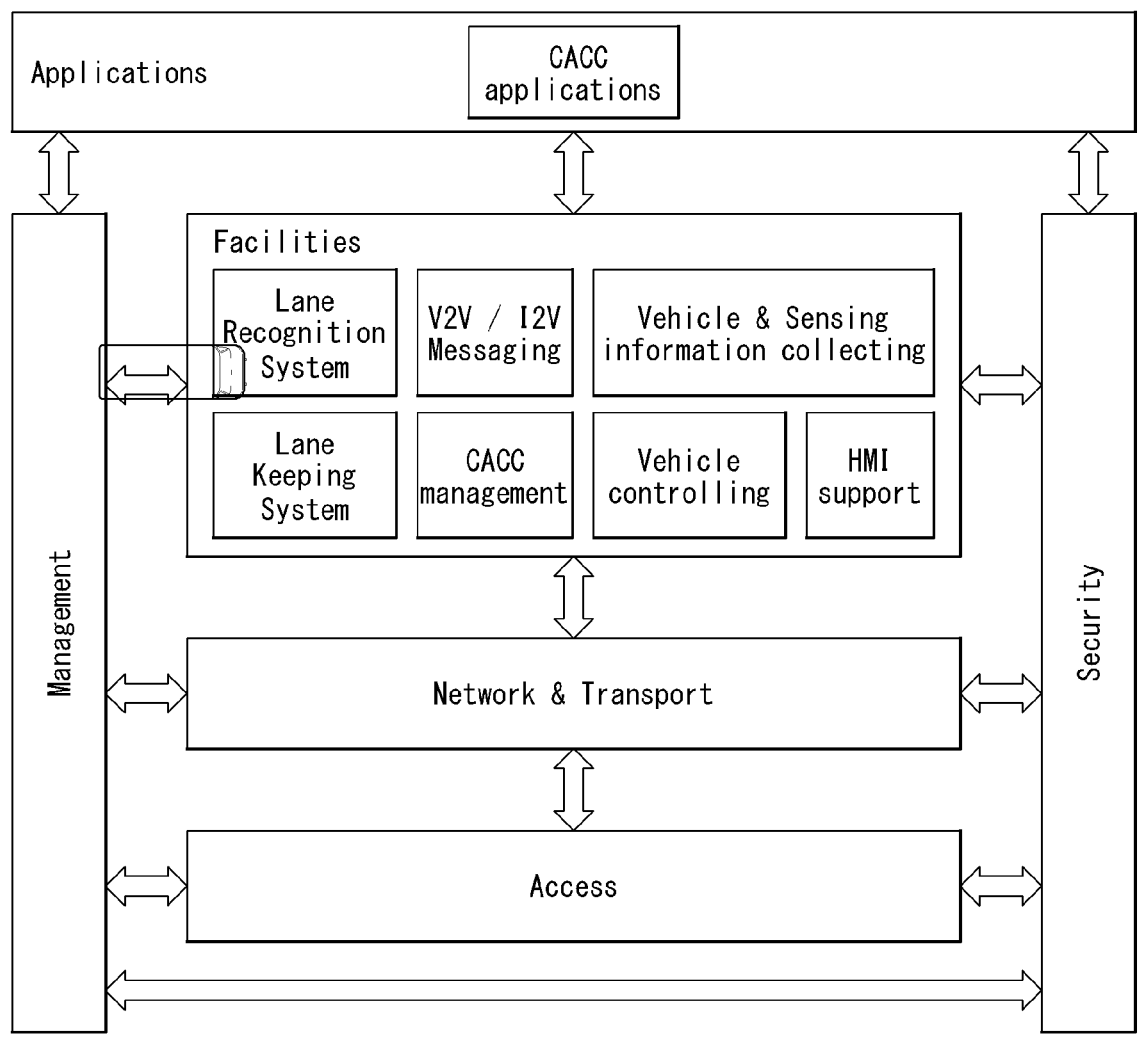

[FIG. 22]
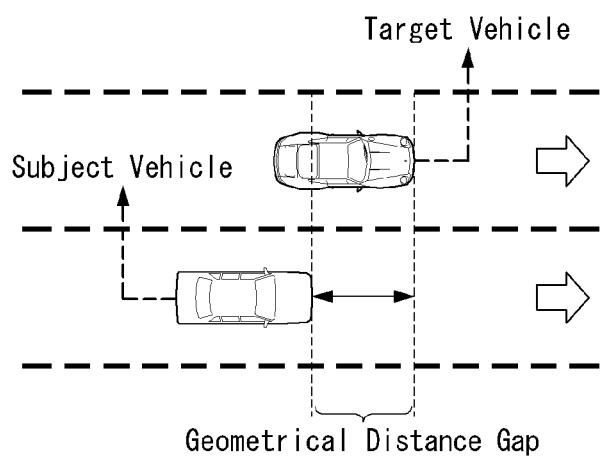
[FIG. 23]
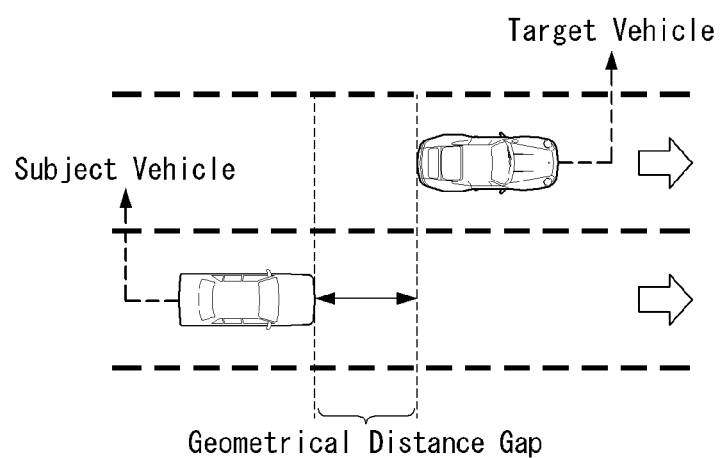

【FIG. 24】
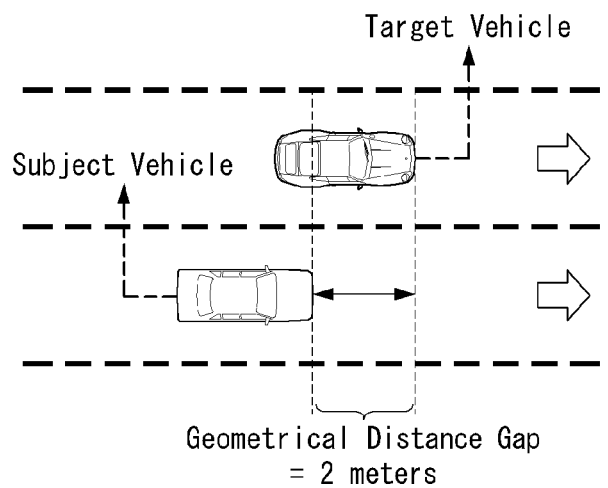
【FIG. 25】
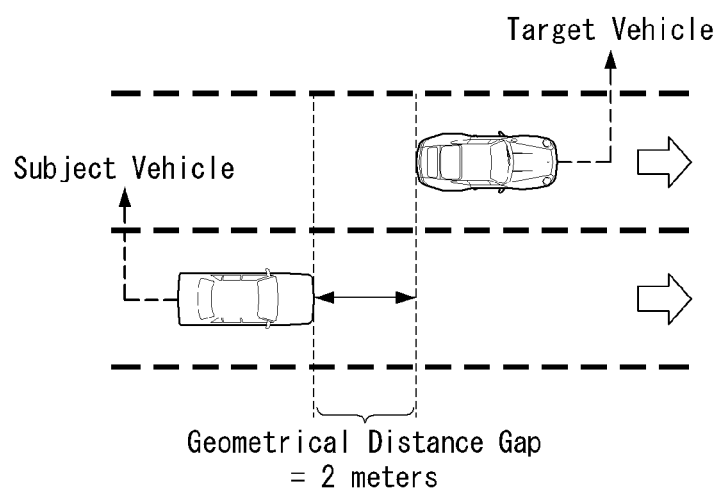

[FIG. 26]
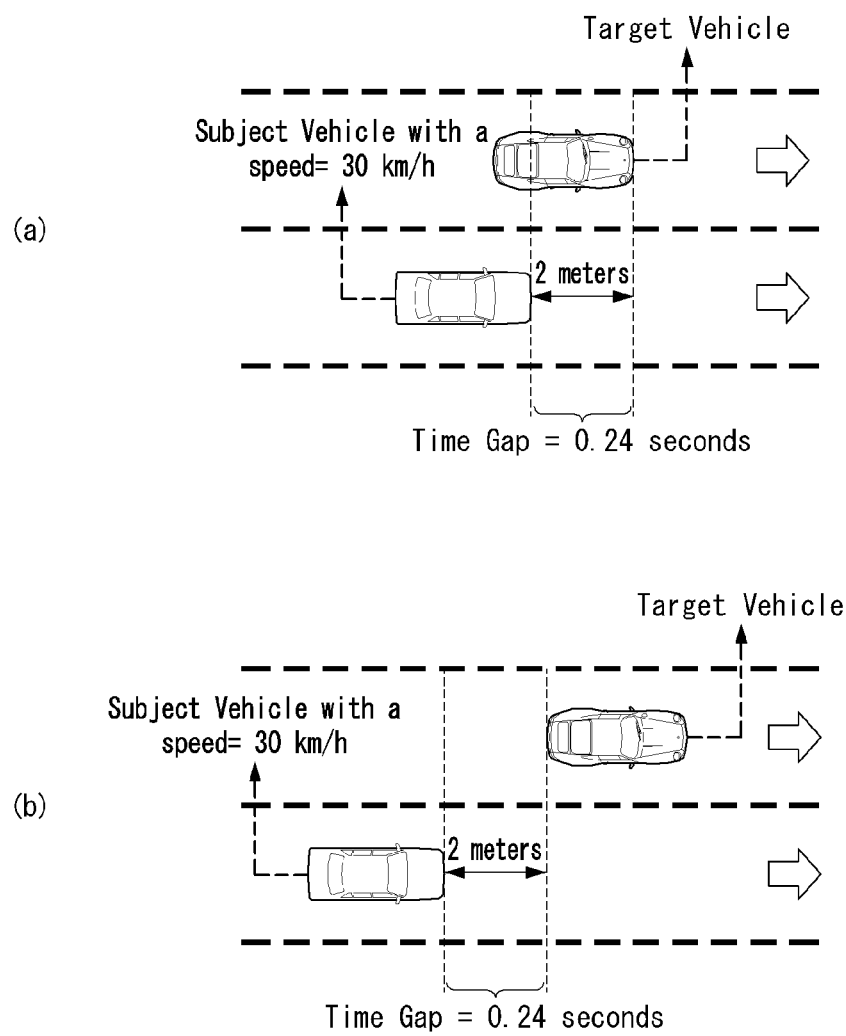

[FIG. 27]
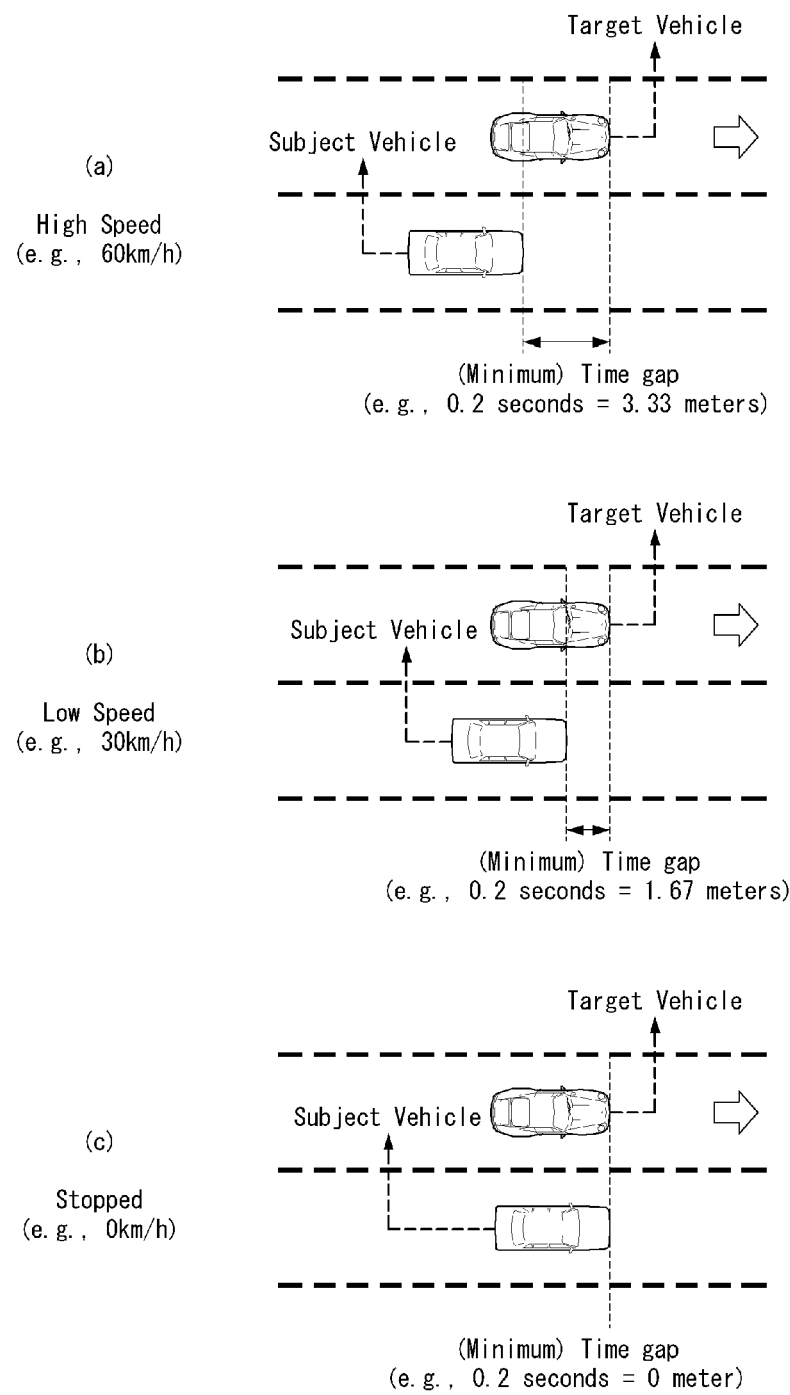

[FIG. 28]
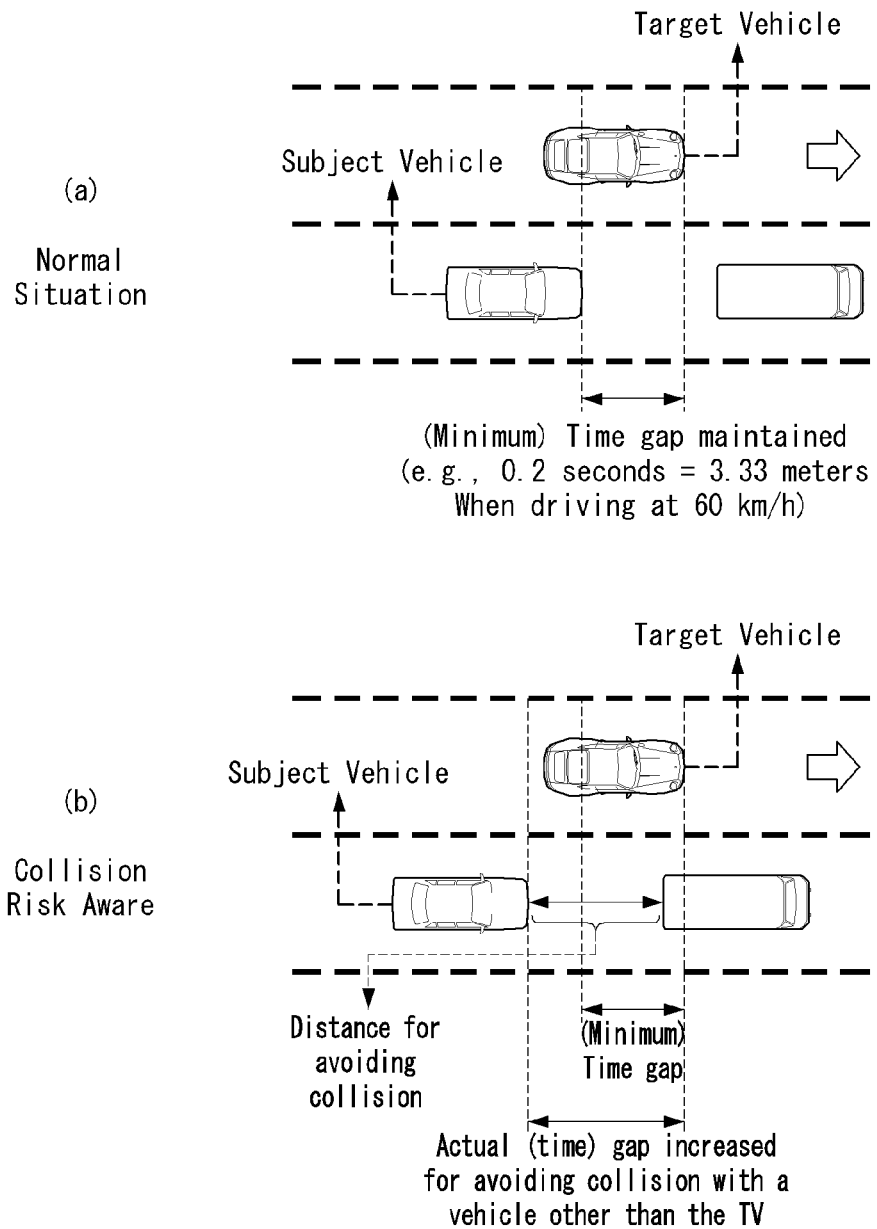

[FIG. 29]
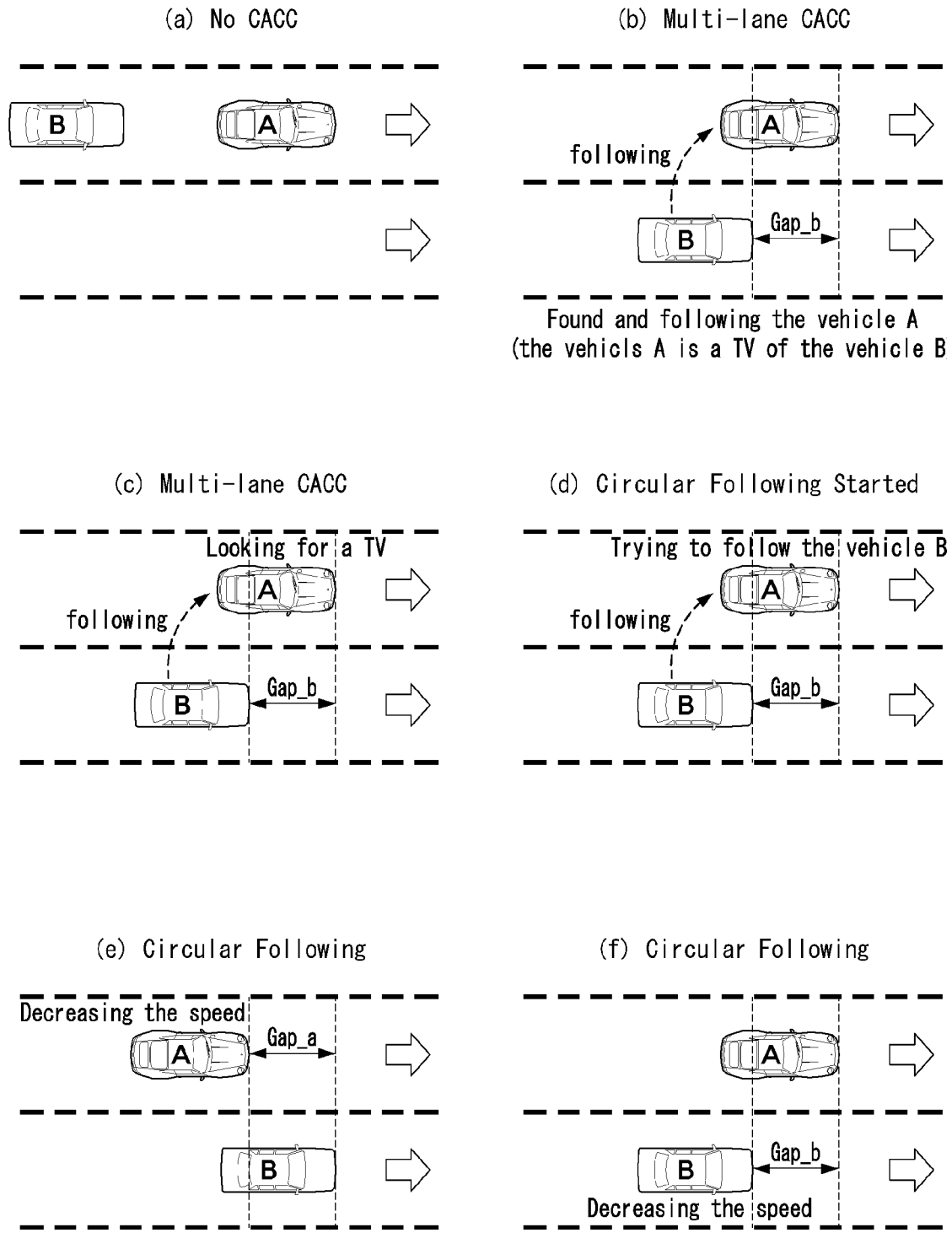

[FIG. 30]
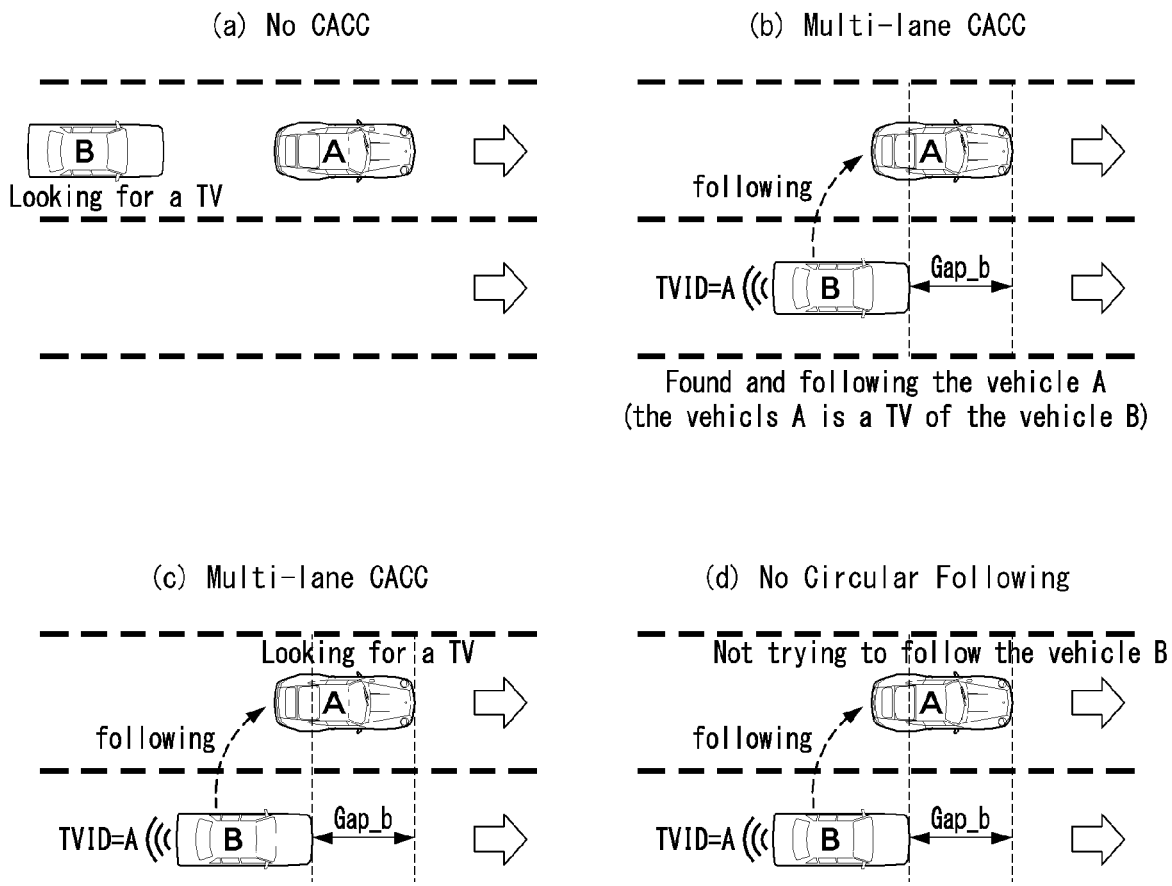

【FIG. 31】
(a) Looking for a TV & find a long single lane CACC string
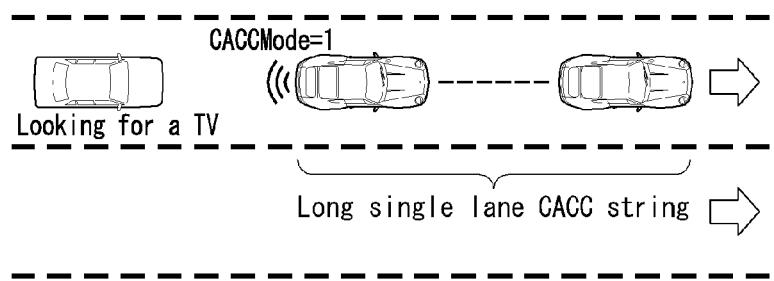
(b) Activate Multi-lane CACC
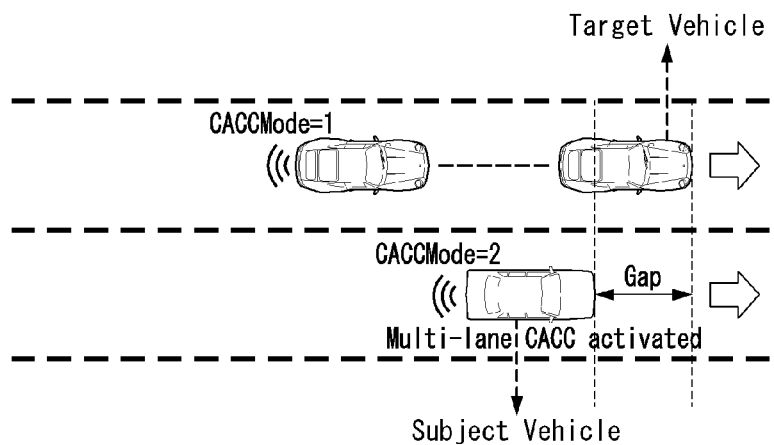

[FIG. 32]
(a) Looking for a TV & find too many multi-lane CACC vehicles
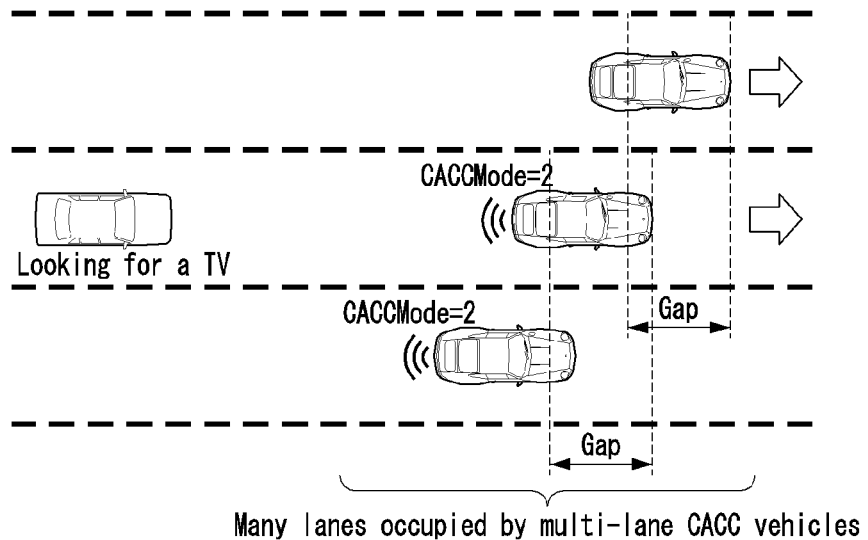
(b) Activate Single lane CACC
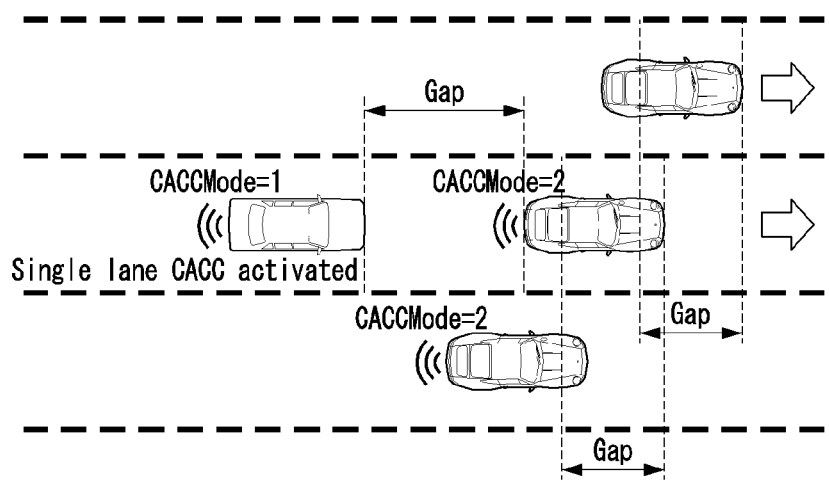

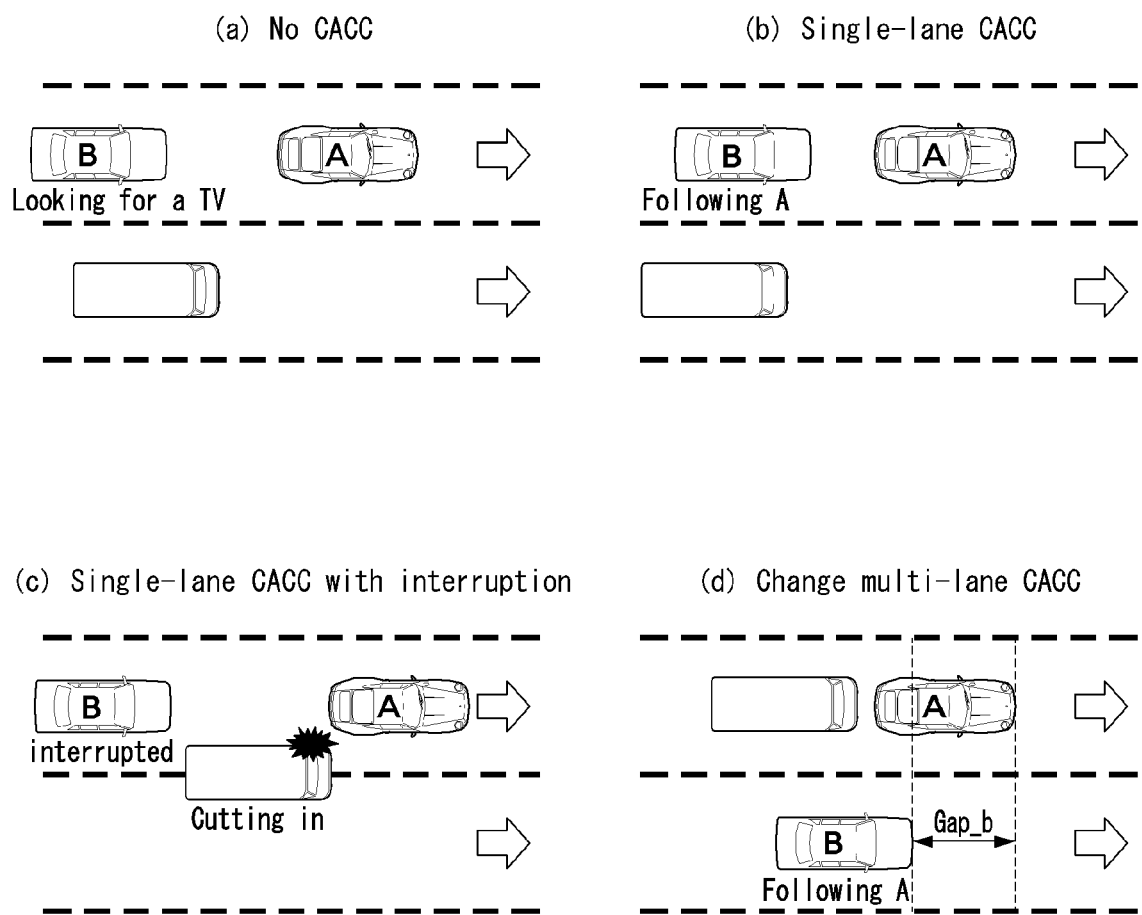
[FIG. 33]

[FIG. 34]
(a) Multi-lane CACC
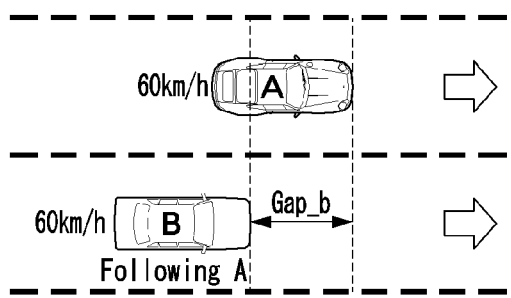
(b) Multi-lane CACC with interruption
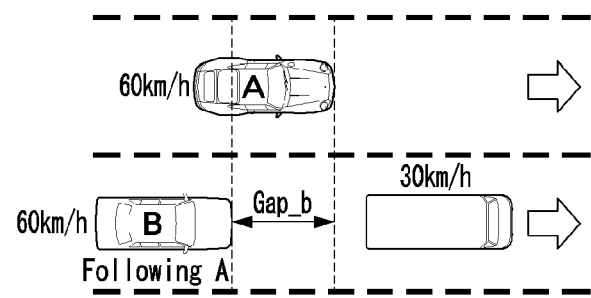
(c) Change to Single-lane CACC
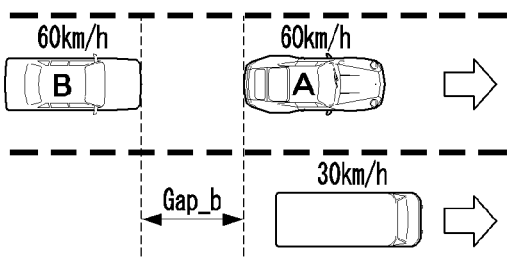

[FIG. 35]
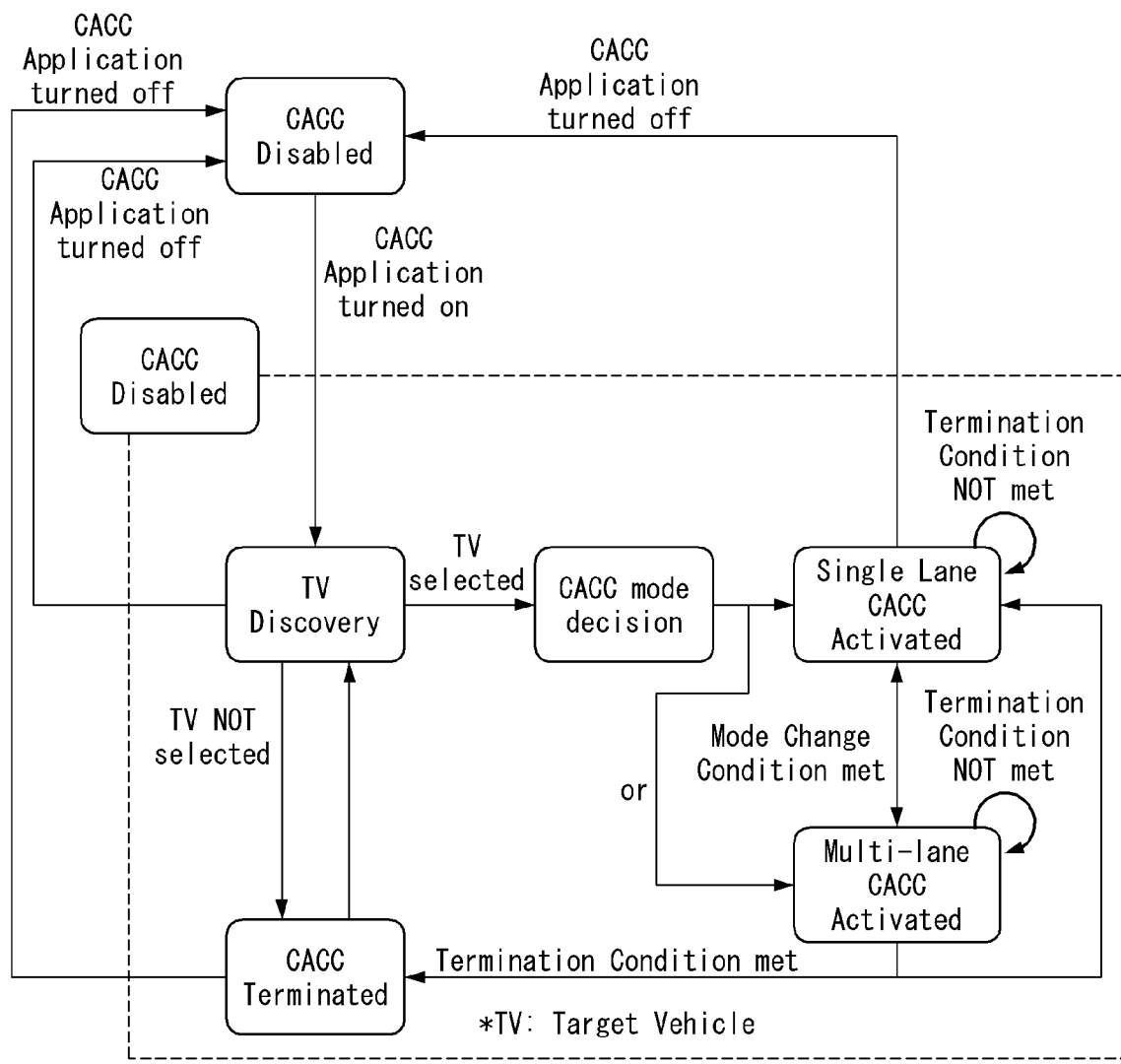

[FIG. 36]
(a) Single-lane CACC
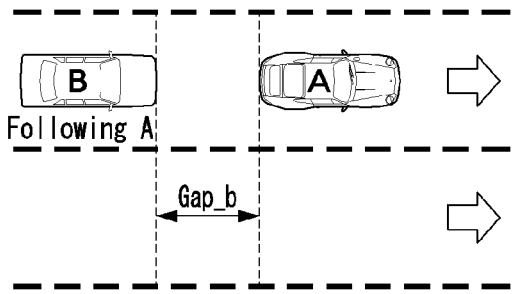
(b) TV changing lane
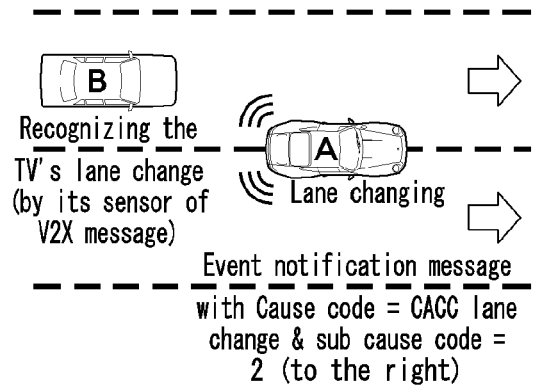
(c) #1:terminate CACC
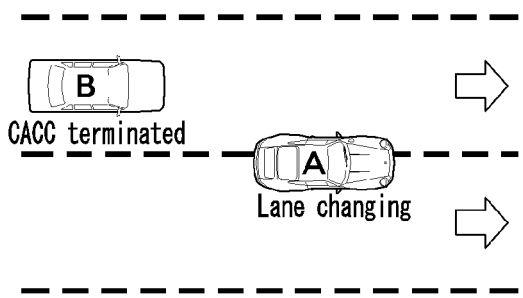
(d) #2:Single-lane CACC with lane change
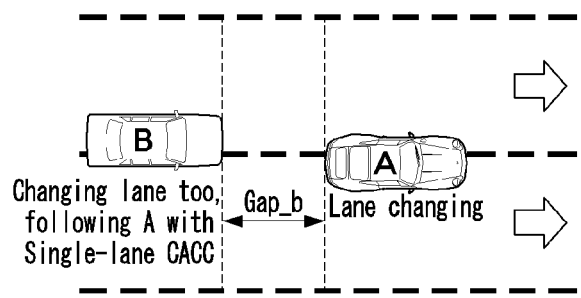
(e) #3:Multi-lane CACC
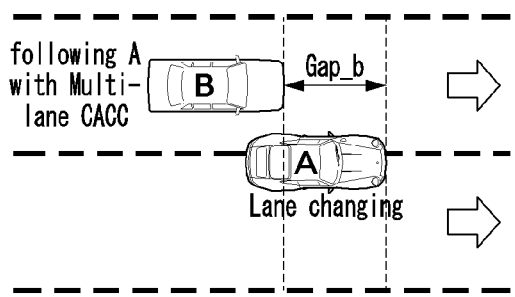

【FIG. 37】
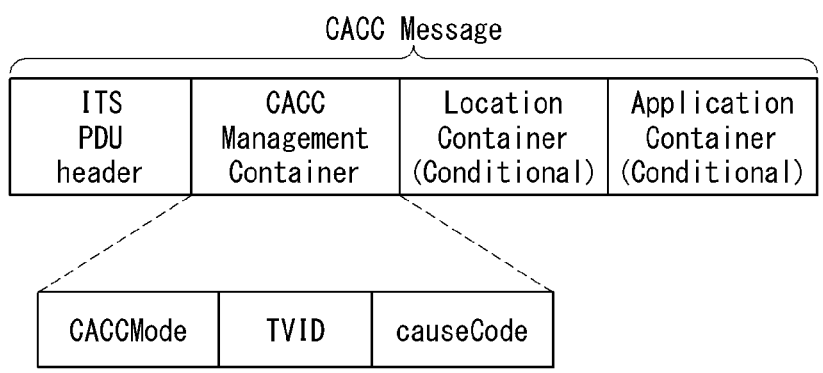
【FIG. 38】
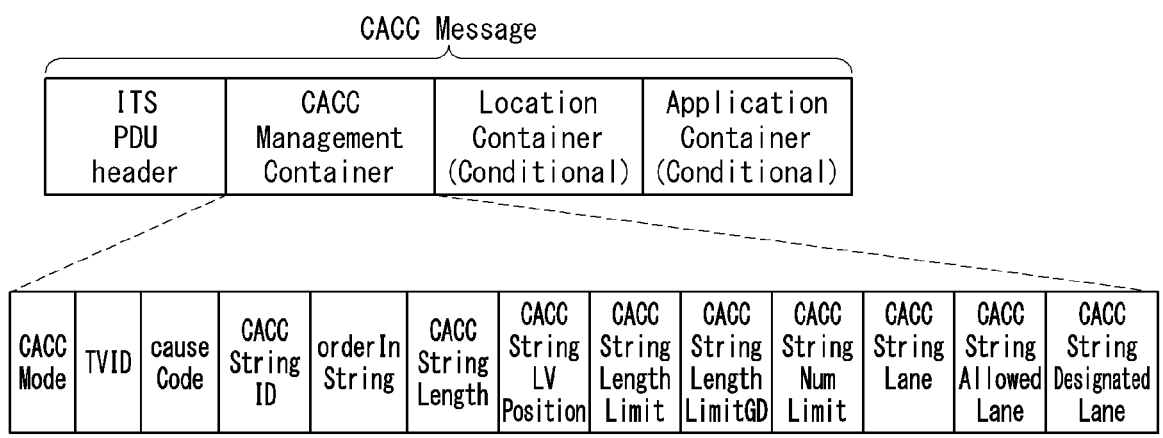

[FIG. 39]
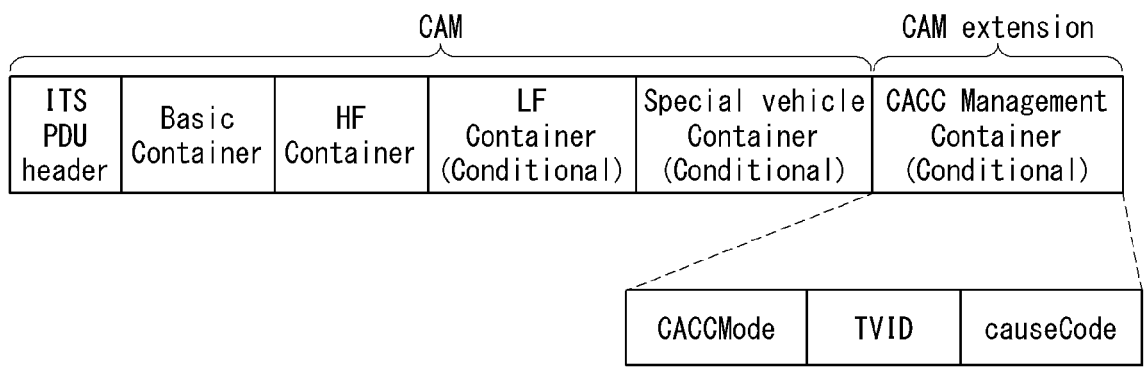
[FIG. 40]
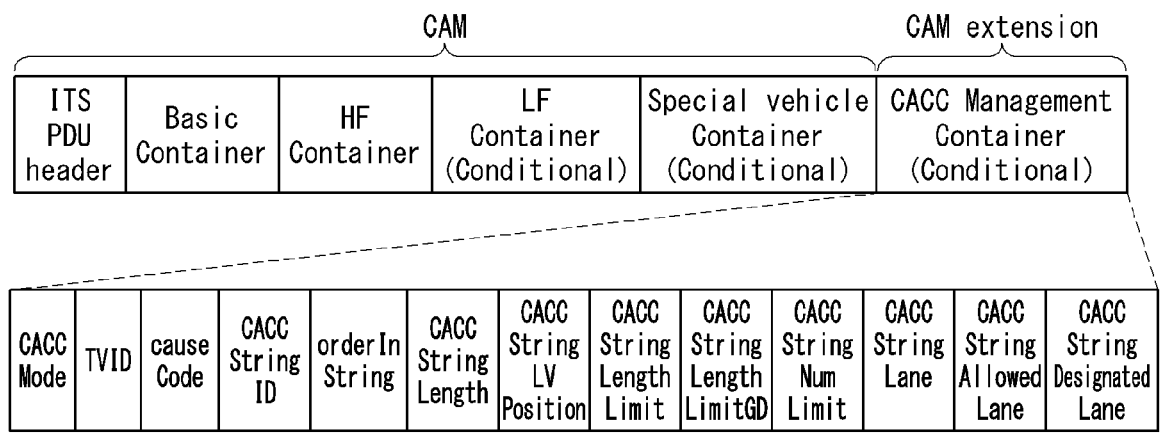

[FIG. 41]
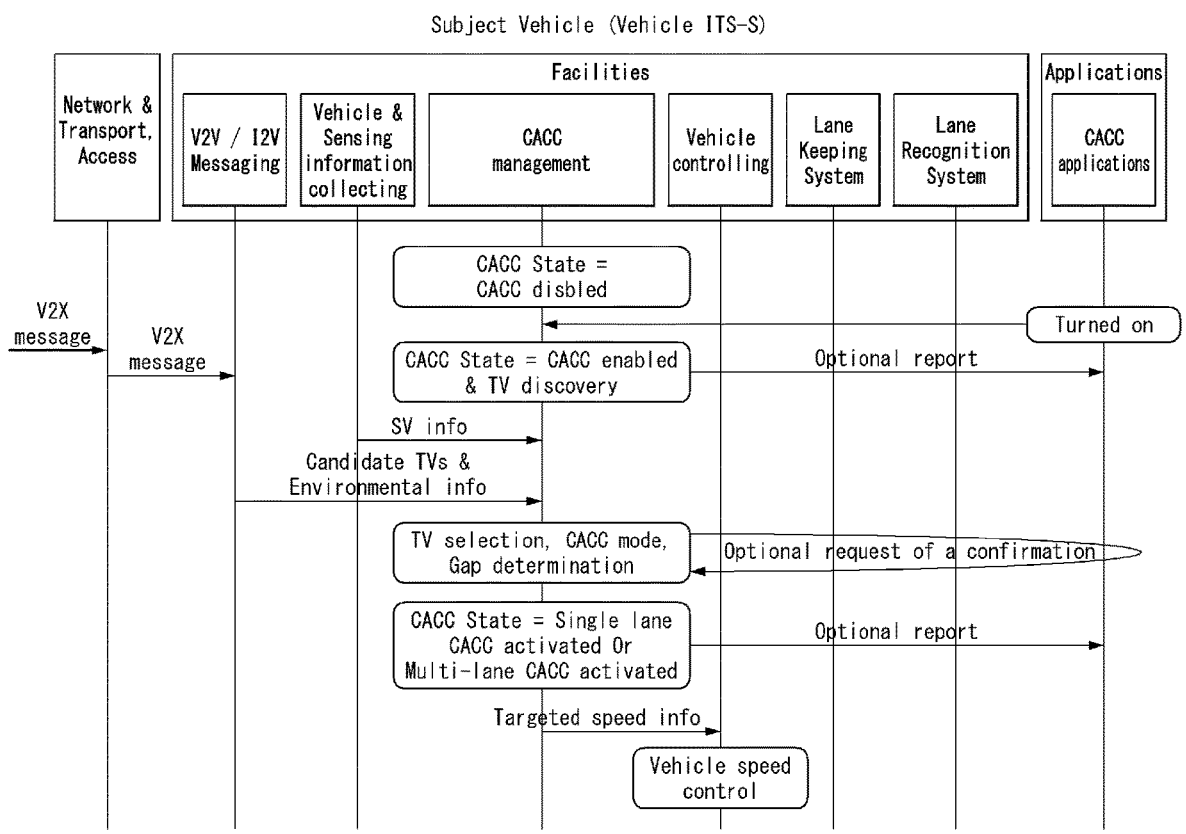

[FIG. 42]
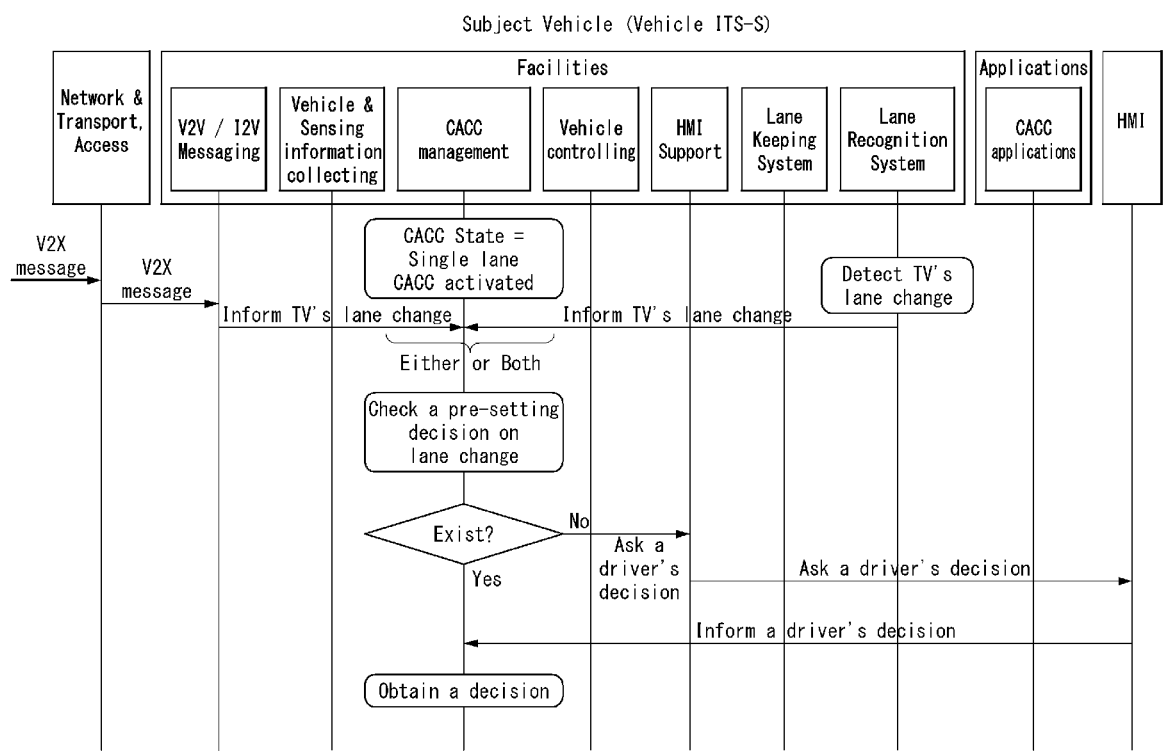

[FIG. 43]
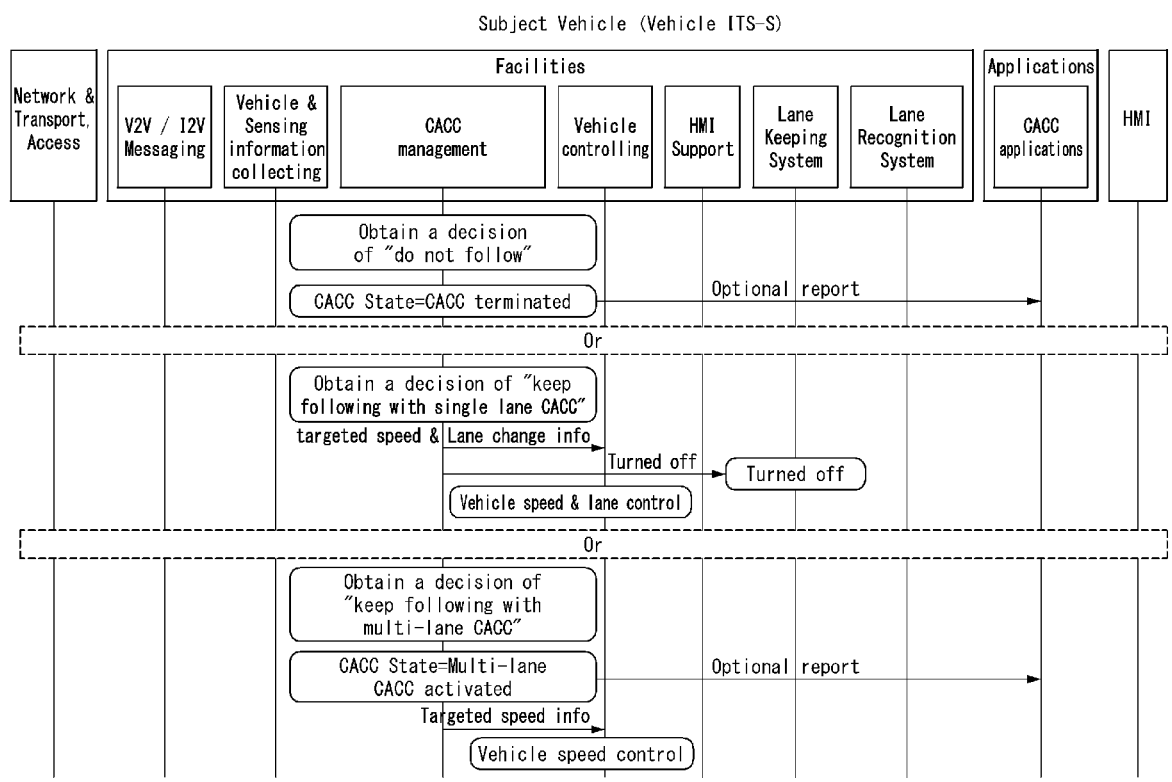

[FIG. 44]
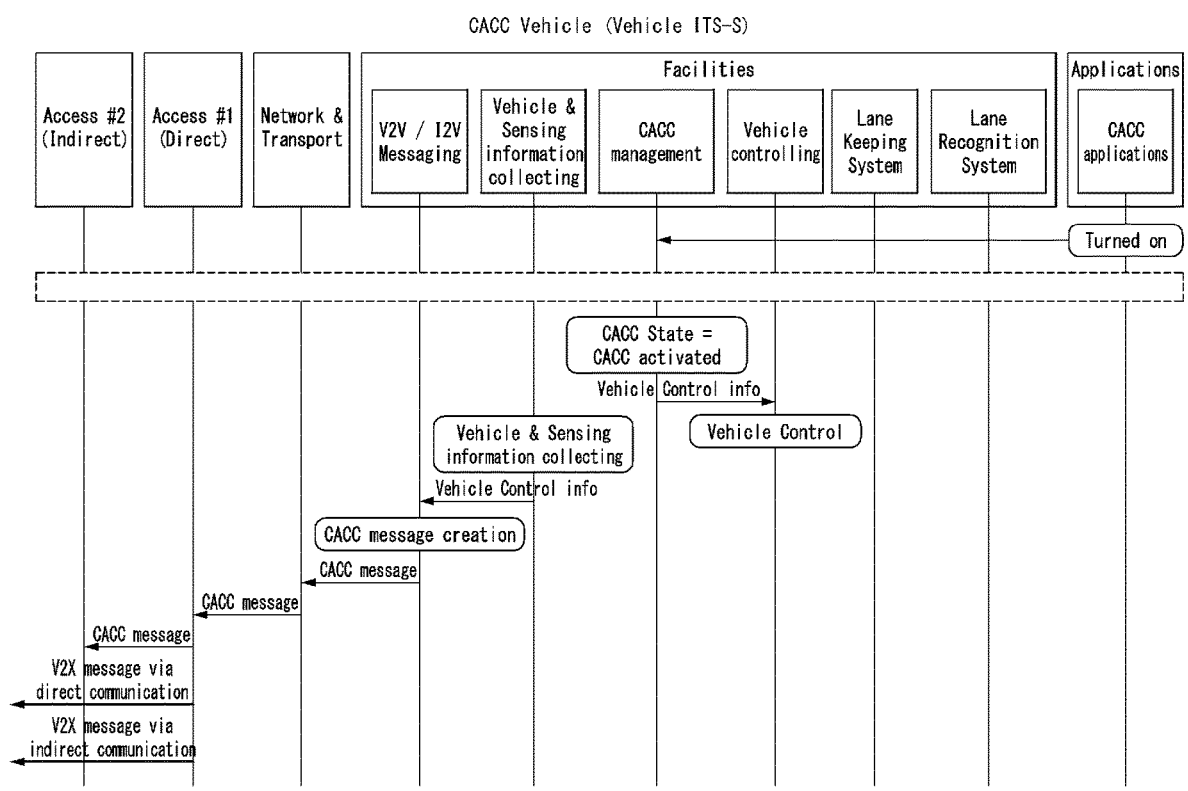

【FIG. 45】
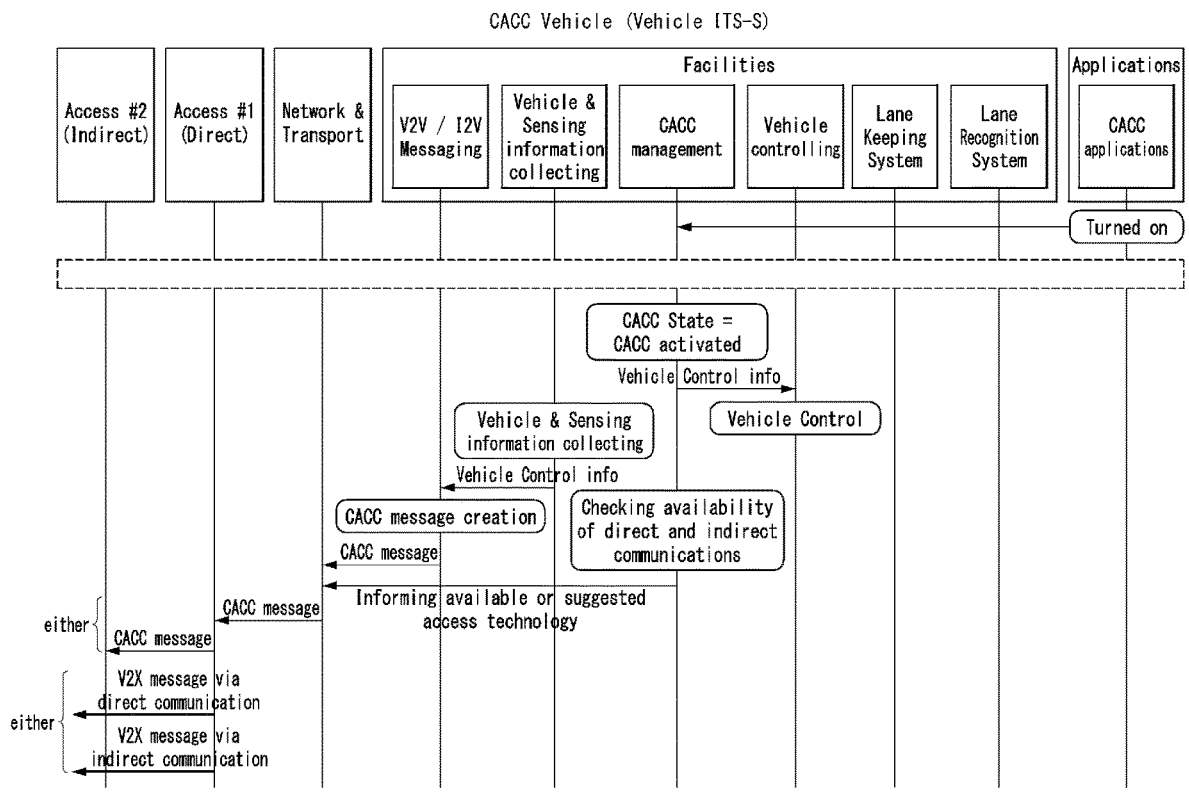
【FIG. 46】
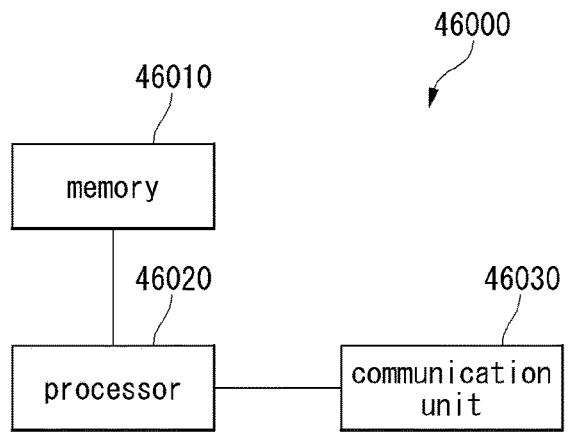

[FIG. 47]
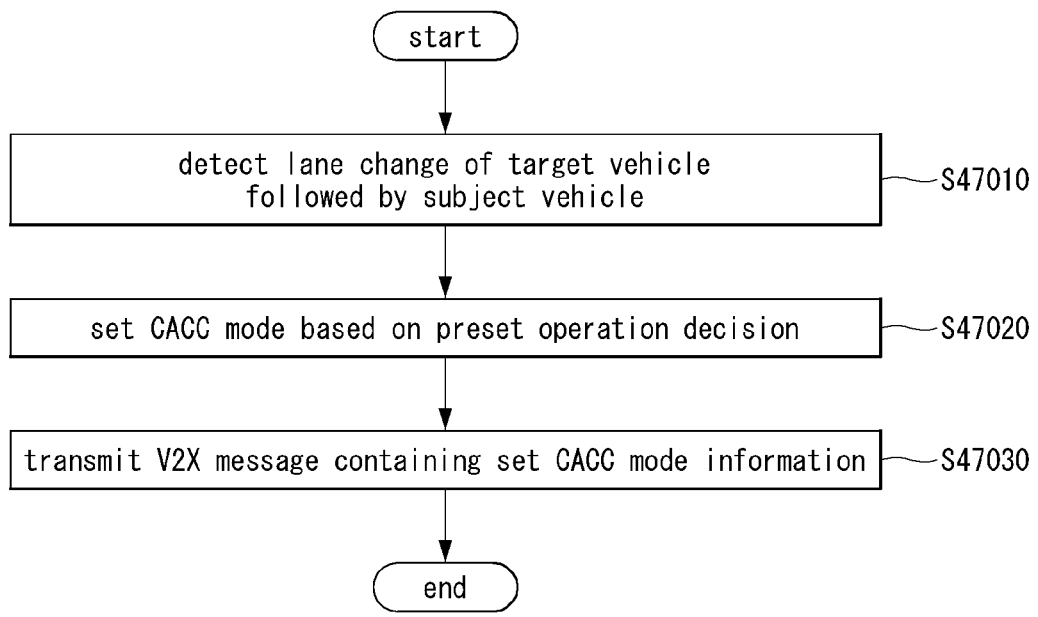

V2X COMMUNICATION DEVICE AND METHOD FOR TRANSMITTING AND RECEIVING V2X MESSAGE THEREOF

CROSS-REFERENCE TO RELATED APPLICATIONS

This application is the National Stage filing under 35 U.S.C. 371 of International Application No. PCT/KR2017/015762, filed on Dec. 29, 2017, the contents of which are all hereby incorporated by reference herein in their entirety.

TECHNICAL FIELD

The disclosure relates to a V2X communication device and V2X message transmission/reception method, and more particularly, to a method for receiving a V2X message containing cooperative adaptive cruise control (CACC)-related information and providing a CACC service based on information contained in the message.

BACKGROUND ART

In recent years, vehicles have become a result of complex industrial technology, which is a fusion of electric, electronic and communication technologies, from centering on mechanical engineering, and the vehicle is also called a smart car in such an aspect. Smart cars have been providing various customized mobile services as well as traditional vehicle technology such as traffic safety/complicatedness by connecting drivers, vehicles, and transportation infrastructures. The connectivity may be implemented using vehicle to everything (V2X) communication technology.

DETAILED DESCRIPTION OF THE DISCLOSURE

Technical Problem

Various services may be provided via V2X communication. For example, there may be provided services related to automated and connected driving targeting safe transport and mobility enhancement. The CACC service is among them. The CACC is technology to form a CACC pair or CACC string and maintain the safety time gap between vehicles as the minimum value so as to enhance traffic efficiency and reduce fuel consumption.

However, in some environments or contexts, the CACC may negatively influence lane capacity or cause heavy traffic. Thus, a need exists for a scheme for smoothing traffic while providing the CACC service. For example, a method for properly determining the CACC mode needs to be considered.

Technical Solution

To achieve the foregoing objectives, there are disclosed a vehicle to everything (V2X) communication device and a V2X message reception method by the V2X communication device.

According to an embodiment of the disclosure, a method of transmitting a vehicle-to-everything (V2X) message by a V2X communication device of a subject vehicle comprises detecting a lane change of a target vehicle followed by the subject vehicle, upon detecting the lane change of the target vehicle, setting a CACC mode based on a preset operation decision on the lane change, and transmitting the V2X message including information for the set CACC mode, wherein the CACC mode includes a single lane CACC mode for providing a single lane CACC service and a multi-lane CACC mode for providing a multi-lane CACC service.

According to an embodiment of the disclosure, the preset operation decision may include at least one of a decision not to follow the target vehicle having changed lanes, a decision to keep following the target vehicle having changed lanes in the single lane CACC mode, or a decision to keep following the target vehicle having changed lanes in the multi-lane CACC mode.

According to an embodiment of the disclosure, the V2X message further includes target vehicle ID information for identifying an ID of the target vehicle.

According to an embodiment of the disclosure, the method further comprises determining whether to change a lane based on the preset operation decision.

According to an embodiment of the disclosure, the determining whether to change the lane includes: when the preset operation decision is the decision not to follow the target vehicle having changed lanes, determining to maintain the lane; when the preset operation decision is the decision to keep following the target vehicle having changed lanes in the single lane CACC mode, determining to change the lane; and when the preset operation decision is the decision to keep following the target vehicle having changed lanes in the multi-lane CACC mode, determining to maintain the lane.

According to an embodiment of the disclosure, the detecting the lane change of the target vehicle is performed based on lane change indication information indicating the lane change of the target vehicle included in the V2X message received from the target vehicle.

According to an embodiment of the disclosure, when a value of the lane change indication information is a first value, the lane change indication information indicates that there is no lane change, when the value of the lane change indication information is a second value, the lane change indication information indicates that there is a lane change to a left, and when the value of the lane change indication information is a third value, the lane change indication information indicates that there is a lane change to a right.

According to an embodiment of the disclosure, a V2X communication device of a subject vehicle comprises a memory storing data, a communication unit transmitting/receiving a wireless signal, and a processor controlling the communication unit, wherein the V2X communication device comprises detecting a lane change of a target vehicle followed by the subject vehicle, upon detecting the lane change of the target vehicle, setting a CACC mode based on a preset operation decision, and transmitting the V2X message including information for the set CACC mode, wherein the CACC mode includes a single lane CACC mode for providing a single lane CACC service and a multi-lane CACC mode for providing a multi-lane CACC service.

Advantageous Effects

According to the disclosure, a multi-lane CACC mode in which a target vehicle is followed on a different lane from the lane where the target vehicle is driving is provided, thus preventing a too long CACC string from occurring and allowing the subject vehicle to keep on following a specific target vehicle even when disturbed by a cut-in vehicle. Further, a proper mode of the single lane CACC mode and the multi-lane CACC mode is selected considering the traffic condition, preventing traffic congestion.

Further, the target vehicle broadcasts the target vehicle's ID, thereby preventing circular following, which is the phenomenon where two vehicles repeatedly follow each other in the multi-lane CACC mode.

Further, a CACC service with lane change is provided, allowing the subject vehicle to keep on following the target vehicle even when the target vehicle changes lanes.

Further, a CACC service with hybrid communication is provided, allowing a CACC vehicle to transmit a CACC message even when direct communication is difficult.

BRIEF DESCRIPTION OF DRAWINGS

The accompanying drawings provided for a better understanding of the disclosure as part of the instant application constitute embodiments of the disclosure along with the detailed description of the disclosure.

FIG. 1 illustrates an intelligent transport system (ITS) according to an embodiment of the disclosure.

FIG. 2 illustrates a V2X transmission/reception system according to an embodiment of the disclosure.

FIG. 3 illustrates a configuration of a V2X system according to an embodiment of the disclosure.

FIG. 4 illustrates a packet structure of a network/transport layer according to an embodiment of the disclosure.

FIG. 5 illustrates a configuration of a V2X system according to another embodiment of the disclosure.

FIG. 6 illustrates a WSMP packet structure according to an embodiment of the disclosure.

FIG. 7 illustrates a conceptual internal architecture of an MAC sublayer performing multi-channel operation (MCO) according to an embodiment of the disclosure.

FIG. 8 illustrates the relationship between user priority of EDCA and access category (AC) according to an embodiment of the disclosure.

FIG. 9 illustrates a configuration of a physical layer of a V2X transmission device according to an embodiment of the disclosure.

FIG. 10 illustrates a CACC protocol architecture including a common facility according to an embodiment of the disclosure.

FIG. 11 illustrates a CACC protocol architecture including a CACC dedicated facility according to an embodiment of the disclosure.

FIG. 12 illustrates a CACC state transition model according to an embodiment of the disclosure.

FIG. 13 illustrates a CACC operation flow of a V2X communication device including a common facility according to an embodiment of the disclosure.

FIG. 14 illustrates a CACC operation flow of a V2X communication device including a common facility according to another embodiment of the disclosure.

FIG. 15 illustrates a CACC operation flow of a V2X communication device including a common facility according to still another embodiment of the disclosure.

FIG. 16 illustrates a CACC operation flow of a V2X communication device including a common facility according to still another embodiment of the disclosure.

FIG. 17 illustrates a CACC operation flow of a V2X communication device including a CACC dedicated facility according to an embodiment of the disclosure.

FIG. 18 illustrates a CACC operation flow of a V2X communication device including a CACC dedicated facility according to another embodiment of the disclosure.

FIG. 19 illustrates a CACC operation flow of a V2X communication device including a CACC dedicated facility according to still another embodiment of the disclosure.

FIG. 20 illustrates a CACC operation flow of a V2X communication device including a CACC dedicated facility according to still another embodiment of the disclosure.

FIG. 21 illustrates a CACC protocol architecture according to another embodiment of the disclosure.

FIG. 22 illustrates a geometrical distance gap for multi-lane CACC according to an embodiment of the disclosure.

FIG. 23 illustrates a geometrical distance gap for multi-lane CACC according to another embodiment of the disclosure.

FIG. 24 illustrates a time gap for multi-lane CACC according to an embodiment of the disclosure.

FIG. 25 illustrates a time gap for multi-lane CACC according to another embodiment of the disclosure.

FIG. 26 illustrates an example of use of a gap for single lane CACC according to an embodiment of the disclosure.

FIG. 27 illustrates an example of use of a gap for multi-lane CACC according to an embodiment of the disclosure.

FIG. 28 illustrates a gap increased upon recognizing a collision risk according to an embodiment of the disclosure.

FIG. 29 illustrates circular following in multi-lane CACC according to an embodiment of the disclosure.

FIG. 30 illustrates a method for avoiding circular following in multi-lane CACC according to an embodiment of the disclosure.

FIG. 31 illustrates a method in which a subject vehicle determines a CACC mode using CACC mode information according to an embodiment of the disclosure.

FIG. 32 illustrates a method in which a subject vehicle determines a CACC mode using CACC mode information according to an embodiment of the disclosure.

FIG. 33 illustrates a method in which a subject vehicle changes a CACC mode according to an embodiment of the disclosure.

FIG. 34 illustrates a method in which a subject vehicle changes a CACC mode according to another embodiment of the disclosure.

FIG. 35 illustrates a CACC state transition model according to another embodiment of the disclosure.

FIG. 36 illustrates a method in which a subject vehicle operates when changing lanes according to an embodiment of the disclosure.

FIG. 37 illustrates a dedicated CACC message format according to an embodiment of the disclosure.

FIG. 38 illustrates a dedicated CACC message format according to another embodiment of the disclosure.

FIG. 39 illustrates an expansion of a CAM message for CACC according to an embodiment of the disclosure.

FIG. 40 illustrates an expansion of a CAM message for CACC according to another embodiment of the disclosure.

FIG. 41 illustrates a message flow for CACC activation according to an embodiment of the disclosure.

FIG. 42 illustrates a message flow for a lane change until a determination for a lane change is obtained according to an embodiment of the disclosure.

FIG. 43 illustrates a message flow for a lane change after a determination for a lane change is obtained according to an embodiment of the disclosure.

FIG. 44 illustrates a simultaneous transmission method for CACC in hybrid communication according to an embodiment of the disclosure.

FIG. 45 illustrates an alternative transmission method for CACC in hybrid communication according to an embodiment of the disclosure.

FIG. 46 illustrates a V2X communication device according to an embodiment of the disclosure.

FIG. 47 illustrates a method in which a V2X communication device receives a V2X message according to an embodiment of the disclosure.

MODE FOR CARRYING OUT THE DISCLOSURE

Preferred embodiments of the disclosure are described in detail and examples thereof are illustrated in the accompanying drawings. The following detailed description with reference to the accompanying drawings is intended to illustrate the preferred embodiments of the disclosure rather than merely illustrating embodiments that may be implemented according to embodiments of the disclosure. The following detailed description includes details in order to provide a thorough understanding of the disclosure, but the disclosure does not require all these details. In the disclosure, respective embodiments described below need not be particularly used separately. Multiple embodiments or all embodiments may be used together, and specific embodiments may be used as a combination.

Most of the terms used in the disclosure are selected from the general ones that are widely used in the field, but some terms are arbitrarily selected by the applicant and the meaning thereof will be described in detail in the following description as necessary. Accordingly, the disclosure should be understood based on the intended meaning of the term rather than the mere name or meaning of the term.

The disclosure relates to a V2X communication apparatus and the V2X communication apparatus is included in an Intelligent Transport System (ITS) to perform all or some functions of the ITS. The V2X communication apparatus may communicate with vehicles and vehicles, vehicles and infrastructure, vehicles and bicycles, and mobile devices. The V2X communication apparatus may be abbreviated as a V2X apparatus. As an embodiment, the V2X apparatus may correspond to an on board unit (OBU) of the vehicle or may be included in the OBU. The OBU may also be referred to as on a board equipment (OBE). The V2X apparatus may correspond to a road side unit (RSU) of the infrastructure or may be included in the RSU. The RSU may also be referred to as a road side equipment (RSE). Alternatively, the V2X communication apparatus may correspond to an ITS station or may be included in the ITS station. All of a predetermined OBU, a predetermined RSU, and a predetermined mobile equipment that perform V2X communication may also be referred to as the ITS station or the V2X communication apparatus.

FIG. 1 illustrates an intelligent transport system (ITS) according to an embodiment of the disclosure.

Intelligent transport system means a system to provide efficient and safe transport services by applying information and communication technology, such as electronic control and communication devices, to traffic facilities installed around roads, such as traffic signals or electronic road signs, and means of transportation, such as vehicles, buses, or trains. To support an ITS, vehicle to everything (V2X) technology may be used. V2X communication technology refers to technology of communication between vehicles or between a vehicle and a device around the vehicle.

A vehicle supporting V2X communication is equipped with an OBU. The OBU includes a dedicated short-range communication (DSRC) communication modem. An infrastructure including V2X modules installed around a road, such as traffic signals, may be denoted an RSU. Vulnerable road users (VRU) are vulnerable users at risk in traffic, such as pedestrians, bicycles, or wheelchairs. VRUs are capable of V2X communication.

Vehicle to vehicle (V2V) denotes communication between V2X communication device-equipped vehicles or technology for such communication. Vehicle to infra-structure (V2I) denotes communication between a V2X communication device-equipped vehicle and an infrastructure or technology for such communication. Besides, communication between a vehicle and a VRU may be denoted V2O, and communication between an infrastructure and a VRU may be denoted 120.

FIG. 2 illustrates a V2X transmission/reception system according to an embodiment of the disclosure.

A V2X transmission/reception system includes a V2X transmitter 2100 and a V2X receiver 2200. The V2X transmitter 2100 and the V2X receiver 2200 are so termed depending on their role of data transmission or data reception, and no difference in device configuration exists therebetween. The V2X transmitter 2100 and the V2X receiver 2200 both correspond to a V2X communication device.

The V2X transmitter 2100 includes a global navigation satellite system (GNSS) receiver 2110, a DSRC radio 2120, a DSRC device processor 2130, an application electronic control unit (ECU) 2140, a sensor 2150, and a human interface 2160.

The DSRC radio 2120 may perform communication based on wireless local area network (WLAN)-based IEEE 802.11 standards and/or the wireless access in vehicular environments (WAVE) of the society of automotive engineers (SAE), a U.S.-based automotive professional association. The DSRC radio 2120 may perform the operations of the physical layer and the MAC layer.

The DSRC device processor 2130 may decode messages received by, or to be transmitted by, the DSRC radio 2120. The GNSS receiver 2110 may perform GNSS processing and obtain location information and time information. According to an embodiment, the GNSS receiver 2110 may be a global positioning system (GPS) device.

The application ECU 2140 may be a microprocessor for providing a specific application service. The application ECU may be operated/generate a message based on a user input and sensor information to provide a service and may transmit/receive messages using the DSRC device processor. The sensor 2150 may obtain the vehicle state and ambient sensor information. The human interface 2160 may receive user inputs or display/provide messages via an interface, such as an input button or monitor.

The V2X receiver 2200 includes a global navigation satellite system (GNSS) receiver 2210, a DSRC radio 2220, a DSRC device processor 2230, an application electronic control unit (ECU) 2240, a sensor 2250, and a human interface 2260. The above-described configuration of the V2X transmitter 2100 is applied to the configuration of the V2X receiver 2200.

The DSRC radio and the DSRC device processor correspond to an embodiment of a communication unit. The communication unit may perform communication based on cellular communication technology, such as 3GPP or long term evolution (LTE).

FIG. 3 illustrates a configuration of a V2X system according to an embodiment of the disclosure.

According to an embodiment, the V2X system of FIG. 3 may correspond to an ITS station reference architecture defined in ISO 21217/EN302 665. FIG. 3 illustrates an example ITS station based on the reference architecture. FIG. 3 illustrates a hierarchical architecture for end-to-end communication. When messages are communicated between vehicles, the message is transferred down through each layer in the transmission vehicle/ITS system and is transferred up through each layer in the reception vehicle/ITS system. Each layer is described below.

Application layer: The application layer may implement and support various use cases. For example, the application may provide road safety, efficient traffic information, and other application information.

The application layer may classify and define ITS applications and provide services to the end vehicle/user/infrastructure through the lower layers. Applications may be defined/applied per use case or be defined/applied with their use cases grouped into, e.g., road-safety, traffic efficiency, local services, and infotainment. According to an embodiment, the application classification or use cases may be updated when a new application scenario occurs. The layer management may manage and service information related to the operation and security of the application layer. The information and service may be bi-laterally transferred and shared through the interface between management entity and application layer (MAMA) and the interface between security entity and ITS-S applications (SA) or the service access point (SAP) (e.g., MA-SAP or SA-SAP). The transfer of a request from the application layer to the facilities layer or information from the facilities layer to the application layer may be performed via the interface between facilities layer and ITS-S applications (FA) (or FA-SAP).

Facilities layer: The facilities layer may provide support for effectively implementing various use cases defined in the application layer. For example, the facilities layer may perform application support, information support, and session/communication support.

Basically, the facilities layer may support the functions of the top three layers of the OSI model, i.e., the session layer, presentation layer, and application layer. Additionally, the facilities layer may provide such evolved facilities as, e.g., application support, information support, and session/communication support for the ITS system. Facility means a component that provides functionality, information, or data.

Facilities may be classified into common facilities and domain facilities. The common facilities may provide a basic ITS application set and core services or functions necessary for ITS station operations. For example, time management, position management, and service management may be provided. The domain facilities may provide a specific service or function to one or more basic ITS application sets. For example, the domain facilities may provide decentralized notification messages (DENM) for road hazard warning applications (RHW). The domain facilities may be optional and, unless supported by the ITS station, may be not used.

Network/transport layer: The network/transport layer may configure a network for vehicular communication between homogeneous/heterogeneous networks by using various transport protocols and network protocols. For example, the network/transport layer may provide routing with the internet access using the internet protocol, such as TCP/UDP+IPv6. Or, the network/transport layer may configure a vehicle network using a geographical position-based protocol, such as basic transport protocol (BTP)/geonetworking.

The transport layer corresponds to a layer for linking between the services provided by the higher layers (session layer, presentation layer, and application layer) and the lower layers (network layer, data link layer, and physical layer). The transport layer plays a role to provide management so that the data sent from the user arrives precisely at the destination. At the transmission side, the transport layer may segment data into packets in a size suitable for efficient data transmission. At the reception side, the transport layer may merge the received packets back into the original file. According to an embodiment, as the transport protocol, the TCP/UDP may be used, or a transport protocol for the ITS, such as the VTS, may be used.

The network layer may assign a logical address and determine a packet transfer path. The network layer may receive the packets generated from the transport layer and add a network header including the logical address of the destination. As an example packet path design, vehicle-to-vehicle, vehicle-to-fixed station, or fixed station-to-fixed station unicast/broadcast may be taken into consideration. According to an embodiment, as the network protocol for the ITS, the geo-networking, IPv6 networking with mobility support, or IPv6 over geo-networking may be considered.

Access layer: The access layer may transmit messages/data received from the higher layer via a physical channel. For example, the access layer may perform/support data communication based on, e.g., IEEE 802.11 and/or 802.11p standard-based communication technology, IEEE 802.11 and/or 802.11p standard physical transmission technology-based ITS-G5 wireless communication technology, 2G/3G/4G (LTE)/5G wireless cellular communication technology including satellite/wideband wireless mobile communication, DVB-T/T2/ATSC or other wideband terrestrial digital broadcast technology, GPS technology, or IEEE 1609 WAVE technology.

The ITS system for vehicular communication and networking may be organically designed considering various access techniques, network protocols, and communication interfaces to provide various use cases. The role and functions of each layer may be supplemented.

FIG. 4 illustrates a packet structure of a network/transport layer according to an embodiment of the disclosure.

FIG. 4 illustrates a packet structure of a network/transport layer. The transport layer may generate BTP packets, and the network layer may generate geo-networking packets. The geo-networking packet may correspond to the data of the logical link control (LLC) packet and be included in the LLC packet. The geo-networking packet may be encapsulated into an LLC packet. In the embodiment of FIG. 4, the data may include a message set, and the message set may be a basic safety message.

The BTP is a protocol for transmitting messages, e.g., CAM or DENM, generated by the facilities layer, to the lower layer. The BTP header is configured in type A or type B. The type-A BTP header may include the destination port and source port which are necessary for interactive packet transmission. The type-B BTP header may include destination port and destination port information necessary for non-interactive packet transmission. The fields/information included in the header is described below.

Destination port: The destination port identifies the facility entity corresponding to the destination of the data (BTP-PDU) included in the BTP packet.

Source port: The source port is a field generated in the case of BTP-A type, and this indicates the port of the protocol entity of the facilities layer in the source where the packet is transmitted. This field may have a size of 16 bits.

Destination port information: This is a field generated in the case of BTP-B type and may provide additional information when the destination port is the most well-known port. This field may have a size of 16 bits.

The geo-networking packet includes a basic header and a common header depending on the protocol of the network layer and, depending on the geo-networking mode, optionally includes an extension header.

The basic header may be 32-bit (4-byte) long. The basic header may include at least one of a version field, next header (NH) field, life time (LT) field, or remaining hop limit (RHL) field. The fields included in the basic header are described below. The size of the bits constituting each field is merely an example and may be varied.

Version (four bits): The version field indicates the version of the geo-networking protocol.

NH (four bits): The next header (NH) field indicates the type of the subsequent header/field. If the field value is 1, the common header follows and, if the field value is 2, a secured packet may follow.

LT (eight bits): The life time (LT) field indicates the maximum life time of the packet.

RHL (eight bits): The remaining hop limit (RHL) field indicates the remaining hop limit. The RHL field value may be decremented by one whenever forwarded from the geoadhoc router. If the RHL field value becomes 0, the packet is no longer forwarded.

The common header may be 64-bit (8-byte) long. The common header may include at least one of a next header (NH) field, header type (HT) field, header sub-type (HST) field, traffic class (TC) field, flags field, payload length (PL) field, and maximum hop limit (MHL) field. Each field is described below.

NH (four bits): The next header (NH) field indicates the type of the subsequent header/field. The field value being 0 indicates the packet of "ANY" type which is not defined, the field value being 1 indicates the packet of BTP-A type, the field value being 2 indicates the packet of BTP-B type, and the field value being 3 indicates the IP diagram of IPv6.

HT (four bits): This field indicates the geo-networking type. The geo-networking type includes beacon, geounicast, geoanycast, geobroadcast, topologically-scoped broadcast (TSB), or location service (LS).

HST (four bits): The header sub type field indicates the detailed type along with the header type. According to an embodiment, if the HT type is set to TSB, this may indicate single hop if the HST value is '0' and multi-hop if the HST value is '1.'

TC (eight bits): The traffic class field may include store-carry-forward (SCF), channel offload, and TC ID. The SCF field indicates whether the packet is stored unless there is a neighbor to which the packet is to be transferred. The channel offload field indicates that the packet may be transferred through other channel in the case of multi-channel operation. The TC ID field is a value assigned when the packet is transferred from the facilities layer and be used to set a contention window value in the physical layer.

Flags (eight bits): The flags field indicates whether the ITS device is mobile or stationary and, in an embodiment, this may be the last one bit.

PL (eight bits): The payload length field indicates, in bytes, the length of the data subsequent to the geo-networking header. For example, for CAM-carrying geo-networking packets, the PL field may indicate the length of the CAM and the BTP header.

MHL (eight bits): The maximum hop limit (MHL) field may indicate the maximum hop count.

An LLC header may be added to the geo-networking packet, generating an LLC packet. The LLC header provides the function of transmitting IP data and geo-networking data, with the IP data and the geo-networking data differentiated from each other. The IP data and the geo-networking data may be differentiated from each other by the ethertype of the SNAP. According to an embodiment, when the IP data is transmitted, the ethertype may be set to 0x86DD and be included in the LLC header. According to an embodiment, when the geo-networking data is transmitted, the ethertype may be set to 0x86DC and be included in the LLC header. The receiver may identify the ethertype field of the LLC packet header and, depending on the value, forward the packet to the IP data path or geo-networking path and process it.

FIG. 5 illustrates a configuration of a V2X system according to another embodiment of the disclosure.

FIG. 5 illustrates a hierarchical architecture corresponding to another embodiment of the V2X system of FIG. 3. According to an embodiment, the north American V2X system uses IEEE 802.11 PHY and MAC technology and may additionally use IEEE 1609.4 MAC technology. In the network/transport layer technology, IEEE 802.2 standard technology may be applied to the LLC block, and IEEE 1609.3 technology may be applied to the WAVE short message protocol (WSMP). The facilities layer may use the message set of SAE J2735 standard, and the application layer may use the application defined for V2V, V2I, or V2O in the J2945 standard.

The application layer may perform the function of implementing and supporting use cases. The application may be optionally used depending on the use case. The system requirements for each use case may be defined in the J2945 standard. J2945/1 defines the application of V2V technology such as V2V safe communication.

The J2945/1 documentation defines applications such as emergency electronic brake lights (EEBL), forward crash warning (FCW), blind spot warning (BSW), lane change warning (LCW), intersection movement assist (IMA), and control loss warning (CLW). According to an embodiment, FCW technology is V2V safe communication technology that warns of colliding with a vehicle in front. When a V2X communication device-equipped vehicle comes to a sudden stop or stops due to an accident, the vehicle may transmit an FCW safety message to avoid collision with a following vehicle. The following vehicle may receive the FCW message, warn the driver, or control to decelerate or change lanes. In particular, even when another vehicle is between a parked vehicle and a driving vehicle, the state of the parked vehicle may advantageously be grasped via the FCW. The FCW safety message may include the vehicle's location information (latitude, longitude, and lane), vehicle information (kind, length, direction, and speed), event information (stop, sudden stop, and slow-down), and such information may be generated at the request of the facilities layer.

The facilities layer may correspond to OSI layer 5 (session layer), layer 6 (presentation layer), or layer 7 (application layer). The facilities layer may generate a message set depending on the context to support the application. The message set may be defined in the J2735 standard and be specified/decoded via ASN.1. The message set may include a BasicSafetyMessage message, a MapData message, a SPAT message, a CommonSafetyRequest message, an EmergencyVehicleAlert message, an IntersectionCollision message, a ProbeVehicleData message, a RoadSideAlert message, and a PersonalSafetyMessag message.

The facilities layer may compile information to be transmitted from the higher layer, generating a message set. The message set may be displayed in an abstract syntax notation 1 (ASN.1) scheme. ASN.1 is a notation used to specify data architectures and may also define encoding/decoding rules. ASN.1 does not depend upon a specific device, data representation scheme, programming language, or hardware platform. ASN.1 is a language for specifying data regardless of platforms and is the joint standard of CCITT (Consultative Committee on International Telegraphy and Telephony, X.208) and ISO (international Organization for Standardization, ISO 8824).

The message set is a collection of messages related to V2X operation. There is a message set that fits the context of the higher application. The message set may be represented in the format of a data frame and may include at least one element. Each element may include a data frame or data element.

The data frame expresses two or more data listings. The data frame may be a data element listing structure or a data frame listing structure. According to an embodiment, DV_vehicleData is a data frame structure indicating information for the vehicle and may include a plurality of data elements (e.g., Height, Bumbers, mass, or trailerweight). The data element defines a description for the data element. According to an embodiment, the element, Height, as used in the data frame is defined in DE_VehicleHeight and may represent the height of the vehicle. According to an embodiment, the height of the vehicle may be represented from 0 to 127, and the LBS unit is increased on a per-5 cm basis up to 6.35 meters.

According to an embodiment, a BasicSafetyMessage may be transmitted. The BasicSafetyMessage is the most basic, critical message in the message set and is used to periodically transmit the basic information for the vehicle. This message may include coreData defined as BSMcoreData and Partll and regional data which are optional. The coreData may include data elements such as msgCnt, id, lat, long, elev, speed, deading, break, or size. The coreData indicates the message count, ID, latitude, longitude, altitude, speed, direction, brake, and vehicle size by using the data elements. The BSM may transmit the information corresponding to the coreData typically in a period of 100 msec (ten times per second).

The network/transport layer may correspond to OSI layer 3 (network layer) and layer 4 (transport layer). To transmit the WAVE short message (WSM) transferred from the higher layer, the WAVE short message protocol (WSMP) may be used. Additionally, the IPv6/TCP protocol may be used to process conventional IP signals. The LLC block may use the IEEE802.2 standard and distinguish the IP diagram and WSM packet.

The access layer may correspond to OSI layer 1 (physical layer) and layer 2 (data link layer). The access layer may use the PHY and MAC technology of IEEE 802.11 and may additionally use the MAC technology of IEEE 1609.4 to support vehicle communication.

The security entity and management entity may be operated, connected over the entire period.

FIG. 6 illustrates a WSMP packet structure according to an embodiment of the disclosure.

The network/transport layer of FIG. 5 may transmit a vehicle safety message such as BSM through the WSMP. The WSMP protocol is specified in the IEEE 1609.3 documentation and, to additionally transmit IP data, IPv6 and TCP/UDP may also be supported.

The WSMP is a protocol to transfer a WAVE short message generated in the ASN.1 scheme from the facilities layer to the lower layer. As shown in FIG. 6, the WSMP packet includes a WSMP header and WSM data containing a message. The WSMP header includes a version field, PSID field, extension field, WSM WAVE element ID field, and length field.

The version field may be defined as a 4-bit WsmpVersion field indicating the actual WSMP version and a 4-bit reserved field. The PSID field, as a provider service identifier, may be allocated by the higher layer depending on the application. The PSID field helps the receiver side to determine a proper higher layer. The extension field is a field for extending the WSMP header and may have such pieces of information as channel number, data rate, and transmit power used inserted thereto. The WSMP WAVE element ID field may designate the type of the WAVE short message transmitted. The length field may designate, in octets, the length of the WSM data transmitted through the 12-bit WSMLength field.

The LLC header provides the function of transmitting IP data and WSMP data, with the IP data and the WSMP data differentiated from each other. The IP data and the WSMP data may be differentiated from each other by the ethertype of the SNAP. According to an embodiment, the structure of the LLC header and SNAP header may be defined in the IEEE 802.2 documentation. When the IP data is transmitted, the ethertype may be set to 0x86DD and be included in the LLC header. According to an embodiment, when the WSMP data is transmitted, the ethertype may be set to 0x86DC and be included in the LLC header. The receiver may identify the ethertype field of the LLC packet header and, depending on the value, forward the packet to the IP data path or WSMP path and process it.

FIG. 7 illustrates a conceptual internal architecture of an MAC sublayer performing multi-channel operation (MCO) according to an embodiment of the disclosure.

According to an embodiment, the architecture of FIG. 7 may be included in the access layer of FIG. 5 or in the MAC layer of the access layer. The MCO architecture of FIG. 7 may include channel coordination where channel access is defined, channel routing defining the operation process of the management frame and the overall data between the PHY-MAC layers, enhanced dedicated channel access (EDCA) determining and defining the priority of transmission frames, and a data buffer (or queue) storing frames received by the higher layer. The channel coordination block is not shown in FIG. 7. Channel coordination may be carried out by the whole MAC sub-layer of FIG. 5.

Channel coordination: As an embodiment, channel access to the control channel (CCH) and service channel (SCH) may be controlled. Channel access coordination is described below. According to an embodiment, wave short messages (WSMs) may be transmitted via the CCH, and WSMs and/or IP data may be transmitted via the SCH.

Data buffer (queue): The data buffer may store the data frames received from the higher layer according to access categories (AC). In the embodiment of FIG. 3, a data buffer may be provided per AC.

Channel routing: The channel routing block may transfer the data input from the higher layer to the data buffer. For a request for transmission by the higher layer, transmission operation parameters, such as channel number, transmission power, and data rate, for frame transmission and the above-described channel coordination may be invoked.

EDCA: In a scheme for ensuring the QoS in the legacy IEEE 802.11e MAC layer, four access categories (ACs) may be provided depending on the kind of traffic, a differentiated priority may be given to each category, and differentiated parameters are allocated to each AC, so that more transmission chances are provided to higher-priority traffic—i.e., contention-based medium access. For transmission of data including priority, the EDCA block designates eight priorities from 0 to 7 and, depending on the priorities, data reaching the MAC layer may be mapped to the four ACs.

FIG. 8 illustrates the relationship between user priority of EDCA and access category (AC) according to an embodiment of the disclosure.

The relationship between the user priority of the EDCA and the AC is shown in FIG. 8. In the figure, as the number of the AC increases, the higher priority is given. All the ACs have their respective transmission queues and AC parameters, and the difference in priority between the ACs is determined based on AC parameter values set to differ. The different AC parameter values are connected with the backoff and have different channel access rankings. The parameter values of the ACs each use AIFS[AC], CWmin[AC], and CWmax[AC]. Here, AIFS (Arbitration Inter-Frame Space) refers to the minimum time for identifying whether the channel is idle before performing transmission. The smaller AIFS[AC] and CWmin[AC} are, the higher priority is given. Thus, the channel access delay is shortened so that more bands may be used in the given traffic environment.

When a collision occurs between the stations amid frame transmission, the transmitter generates a new backoff counter. The respective transmission queues of the four ACs defined in IEEE 802.11 MAC individually contend against each other to access the wireless medium in one station. Since each AC has an independent backoff counter, a virtual collision may occur. If two or more ACs have simultaneously finished backoff, data from the AC with the highest priority may first be transmitted, and the other ACs may increase the CW value to update again the backoff counter. The process of addressing collision is referred to as virtual collision processing. Further, the EDCA allows for a channel upon transmission of data via transmission opportunity (TXOP). If one frame is too long to transmit within one TXOP, it may be split into smaller frames that are then transmitted.

FIG. 9 illustrates a configuration of a physical layer of a V2X transmission device according to an embodiment of the disclosure.

According to an embodiment, FIG. 9 is a block diagram illustrating the physical layer signal processing of IEEE 802.11 or ITS-G5. However, FIG. 9 illustrates a configuration of physical layer according to an embodiment of the disclosure and its application is not limited to the above-described transmission standard technology.

The physical layer processor of FIG. 9 may include a physical layer convergence protocol (PLCP) sub-layer base band signal processing part and wave shaping 9090 including at least one of a scrambler 9010, an FEC encoder 9020, an interleaver 9030, a mapper 9040, a pilot insertion block 9050, an IFFT block 9060, a guard insertion block 9070, and a preamble insertion block 9080 and a physical medium dependent (PMD) sub-layer RF band signal processing part including at least one of an I/Q modulation block 9100 and a DAC 9110. The functions of each block are described below.

The scrambler 9010 may XOR the input bit stream with a pseudo random binary sequence (PRBS), thereby randomizing it. The FEC encoder 9020 may add a redundancy to the transmission data to allow the receive part to correct errors on the transmission channel. The interleaver 9030 may interleave the input data/bit stream based on an interleaving rule so as to respond to burst errors. According to an embodiment, if deep fading or erasure is applied to QAM symbols, since each QAM symbol has been mapped with interleaved bits, an error may be prevented from occurring in the consecutive bits among all the codeword bits. The mapper 9040 may allocate the input bit word to one constellation. The pilot insertion block 9050 inserts a reference signal in a predetermined position of the signal block. Use of the reference signal allows the receiver to estimate the channel and channel distortion, such as frequency offset and timing offset.

The IFFT block 9060, i.e., the inverse waveform transform block, may transform the input signal to have enhanced transmission efficiency and flexibility, considering the system structure and the properties of the transmission channel. According to an embodiment, for OFDM systems, the IFFT block 9060 may transform frequency-domain signals into time-domain signals using an inverse FFT operation. For single carrier systems, the IFFT block 9060 may be not used or omitted. The guard insertion block 9070 may insert a guard interval between adjacent signal blocks to minimize influence by the delay spread of the transmission channel. According to an embodiment, for OFDM systems, the guard insertion block 9070 may insert a cyclic prefix into a guard interval period. The preamble insertion block 9080 may insert a predetermined type of signal, i.e., the preamble, between the transmitter and receiver to the transmission signal for the receiver to quickly and efficiently detect the target signal. According to an embodiment, for OFDM systems, the preamble insertion block 9080 may define a signal block/signal frame including a plurality of OFDM symbols and insert a preamble symbol to the start of the signal block/signal frame.

The wave shaping block 9090 may waveform-process the input baseband signal based on the properties of channel transmission. According to an embodiment, the waveform shaping block 9090 may perform square-root-raised cosine (SRRC) filtering to obtain the out-of-band emission of the transmission signal. For multi-carrier systems, the waveform shaping block 9090 may be not used or be omitted. The I/Q modulator 9100 may perform in-phase and quadrature modulation. The digital-to-analog converter (DAC) 9110 block may convert the input digital signal into an analog signal and output the analog signal. The output analog signal may be transmitted via the output antenna.

Each of the blocks shown and described in connection with FIG. 9 may be omitted or replaced with other block with the same or similar features. The blocks of FIG. 9 may be configured of a combination of all or some thereof as necessary. In the disclosure, the V2X communication device may perform communication based on the DSRC technology and WAVE technology as described above in connection with FIGS. 7 to 9. However, the V2X communication device may also perform communication based on other communication technology including cellular technology, such as LTE, LTE-A, or 5G.

Hereinafter, cooperative adaptive cruise control (CACC) technology is described.

A worldwide need arises for automated and connected riving targeting traffic safety and mobility enhancements. To that end, CACC technology is recently being developed. The CACC is technology to form a CACC pair or CACC string and maintain the safety time gap between vehicles as the minimum value so as to enhance traffic efficiency and reduce fuel consumption.

The major motive behind the CACC is to reduce the time gap between vehicles as compared with adaptive cruise control (ACC) systems while more quickly responding to a variation in the speed of the target vehicle. This brings benefits to the driver, road operator, and potentially the society.

For example, for the driver, the major benefits of the CACC may be related to the time gap being reduced and automatically maintained (but safe) and the convenience that comes from a better response to a variation in the speed of the target vehicle. Further, this may reduce traffic jam and thus reduce fuel consumption. For the road operator, the main benefits of the CACC may be related to an increase in road capacity and traffic efficiency. A research reveals that an increase in highway lane capacity may be achieved even at a low penetration rate. The social benefits of the CACC may be related to increased road safety, reduced traffic jam, and environmental benefits. Although safety is not a main goal, the CACC provides the behavior of reacting more to a change in the speed of the vehicle in front and resultantly responding more quickly, thereby giving further enhanced safety and allowing the ACC more attractive and convenient for the driver.

The CACC application is an extension to the in-vehicle adaptive cruise control (ACC) system. The CACC application, as compared with the ACC system, allows for a more reduction in the time gap with the vehicle in front. Hereinafter, each term used in CACC technology is described as an example.

CACC: A V2X-capable in-vehicle driving assistance system that automatically adjusts the vehicle speed to maintain the target time gap with the target vehicle. In particular, the CACC may be a V2X-capable in-vehicle driving assistance system that automatically adjusts the vehicle speed to maintain the target time gap with the target vehicle while maintaining the minimum safety distance. The CACC may be, e.g., a V2X capable in-vehicle driving assistance system that automatically adjusts the vehicle speed to keep a target time gap with target vehicle while keeping a minimum safety distance, making use of information communicated from other vehicles and/or from the roadside infrastructure. Here, V2X-capable means that communication with other V2X communication device (ITS-S) is possible using wireless communication (V2X communication). For example, V2X-capable means that the device may transmit and/or receive a facilities and application layer message (e.g., a CAM) using wireless communication.

CACC application: An application layer entity that implements the CACC functionalities and application logic.

CACC vehicle: A CACC system equipped vehicle. The CACC vehicle may, or may not, be activated at a specific time. The CACC vehicle is capable of V2X communication.

Active CACC vehicle: A CACC vehicle with the CACC in active state.

CACC string: Two or more CACC pairs in sequence. At this time, the first (1st) active CACC vehicle corresponds to the target vehicle of the second (2nd) active CACC vehicle, and the second (2nd) CACC vehicle corresponds to the target vehicle of the third (3rd) active CACC vehicle.

CACC pair: A subject vehicle and a target vehicle of the subject vehicle

Measured time gap: A time gap between the subject vehicle and the vehicle in front of the subject vehicle, measured at a time.

Subject vehicle: A CACC vehicle following the target vehicle

Target time gap: A time gap targeted by the subject vehicle

Target vehicle (TV): A counterpart vehicle of the subject vehicle for the CACC application and the V2X-capable vehicle The target vehicle need not be a CACC vehicle.

Time gap: A time gap until the rear end of the vehicle in front and the front end of the following vehicle pass through the same position on the road surface. For example, a time gap between when a preceding vehicle's rear end and a following vehicle's front end passes the same location on the road surface, assuming that the following vehicle speed remains constant. In the disclosure, the time gap may be denoted a safety time gap.

Lead vehicle: The first vehicle in the CACC string and CACC pair. The lead vehicle may not be a CACC vehicle. In the CACC pair, the lead vehicle may be the same as the target vehicle. The lead vehicle in the CACC string is the target vehicle of the first CACC vehicle.

As described above, the CACC is an in-vehicle driving assistance system that automatically adjusts the vehicle speed to maintain the target time gap $\Delta t_{target}$ with the target vehicle TV while maintaining the minimum safety distance with the vehicle. The CACC may use data received from a roadside ITS-S and/or other vehicle ITS-S through an ITS network. The CACC may include a set of at least one ITS-S application (CACC application) and/or hardware component that implements an application logic with services provided by a lower layer (facilities layer, network/transport layer, or access layer).

The CACC application may process data received by other ITS-S and/or on-board sensor, automatically determine the vehicle speed and acceleration, and may thus transmit a control command to the end control system (e.g., the brake or accelerator). Further, the CACC application may optionally operate with other ITS-S application, such as other in-vehicle assistance system or pre-crash system, or side control system. The CACC may connect to an in-vehicle network and may access in-vehicle sensor data. The CACC may send a control command to the acceleration/deceleration system.

Multiple active CACC vehicles may follow each other to form a vehicle group represented as a CACC string. Meanwhile, the CACC string operation environment may be dynamically varied. For example, the CACC string may be divided into two groups or may be merged with other string to create a new CACC string or, when all the vehicles depart from the string, the CACC string may be released.

According to an embodiment, the CACC target time gap $\Delta t_{target}$ may be the time gap set by the CACC following the target vehicle TV. The CACC may adjust the acceleration, deceleration, and/or brake to maintain the time gap $\Delta t$ with the TV as $\Delta t_{target}$. Here, the time gap may be a time gap until the rear end of the preceding vehicle and the front end of the following vehicle pass the same position on the road surface as described above. At this time, the following vehicle may be assumed to have a constant speed. Meanwhile, the CACC needs to maintain the minimum safety distance, and the minimum safety distance should be more than a distance necessary for avoiding a collision.

CACC Architecture, State Transition & Operation Flow

Hereinafter, an example CACC architecture is described. First, the functional architecture and information architecture of the CACC are described. Then, the communication architecture (or protocol architecture) of the CACC is described. In particular, the protocol architecture of the target vehicle and subject vehicle for providing CACC services is described with reference to FIGS. 10 and 11.

First, an example CACC functional architecture is described. The CACC architecture may include all or some of the main functional blocks as follows.

Message handler: manages the generation, encoding/decoding, reception, and transmission of a message (e.g., a V2X message) to use the CACC application. The message handler may be denoted a messaging module/entity (e.g., a V2V messaging entity or V2V/I2V messaging entity).

Target vehicle (TV) identifier: identifies the TV based on data available in the message handler, vehicle status monitor and environment monitor.

Vehicle status monitor: monitors the vehicle movement status and other vehicle's in-vehicle system status. For example, a side control assistance system.

Environment monitor: monitors the vehicle ambient environment. For example, traffic condition, road topology, and other vehicle statuses. In the disclosure, the vehicle status monitor and environment monitor blocks may be collectively referred to as a vehicle and sensing information collecting entity/module.

CACC logic manager: manages the CACC logic. For example, a switch between different CACC application machine statuses, determination of subscribing or unsubscribing to/from the CACC string, and CACC parameter setting (e.g., the target time gap). In the disclosure, the CACC logic manager may be denoted a CACC management entity/module.

Motion planner: This function determines the vehicle operation and potential vehicle manipulation possibility based on the CACC parameters set by the CACC logic manager. For example, acceleration and planned speed.

Actuator control manager: manages and generates control commands to the vehicle actuator depending on the motion planner results.

Next, an example CACC information architecture is described. In each subject vehicle, the CACC may receive other vehicle's information through an ITS access layer (OTA: over the air) interface and receive self sensor data, such as perception sensor data, in the in-vehicle network or through a vehicle data provider (VDP) to operate the CACC application. The output result of the CACC application may be converted into a specific control command that may then be transmitted to the vehicle actuator. Resultantly, the subject vehicle may maintain the time gap with the target vehicle according to the target time gap as set.

Messages (V2V messages) may be exchanged between vehicles (in particular between the subject vehicle and the target vehicle). Further, optionally, the vehicle ITS-S and roadside ITS-S may exchange the whole or part of the following information to support a CACC service.

The traffic information (e.g., traffic jam, speed limit, average speed, or recommended speed) transmitted from the roadside ITS-S to the vehicle ITS-S in the ambient area. Upon application operation, the CACC application of the subject vehicle may consider such information to determine the target time gap and/or vehicle target speed depending on, e.g., the ambient traffic.

Road topology information (e.g., curve or cross topology) transmitted from the roadside ITS-S to the vehicle ITS-S in the ambient area. The CACC application in the subject vehicle may consider such information in the application logic so as to determine the target time gap and/or vehicle target speed depending on, e.g., the ambient traffic.

Signal light status and timing information transmitted from the roadside ITS-S to the ITS-S in the ambient area. The CACC application in the subject vehicle may consider such information in the application logic so as to determine the target time gap and/or vehicle target speed depending on, e.g., the ambient traffic.

In this case, the roadside ITS-S may provide the above-described service in a standalone manner or may be supported for the service from the central ITS-S. The central ITS-S may receive vehicle inspection information gathered by the roadside ITS-S or receive vehicle inspection information directly received from the vehicle ITS-S for traffic monitoring or may provide, e.g., traffic information, road topology information, or service information to the roadside ITS-S in the relevant area or directly to the corresponding vehicle's ITS-S. Such message and exchange protocol with the central ITS-S may be, e.g., DATEX II, OCIT-C, and TPEG.

Next, the CACC protocol architecture may include an application layer including the CACC application and a facilities layer including messaging, vehicle information gathering, CACC management, vehicle control, and/or HMI support. In this case, the facilities may be common facilities that may also be used in other applications or CACC-dedicated facilities that may be used only in the CACC application. In the disclosure, the CACC protocol architecture may be denoted, e.g., a protocol architecture or CACC architecture. The protocol architecture of the target vehicle and subject vehicle is described below with reference to FIGS. 10 and 11.

FIG. 10 illustrates a CACC protocol architecture including a common facility according to an embodiment of the disclosure. In particular, FIGS. 10(*a*) and (*b*) illustrates the CACC protocol architecture of the target vehicle and subject vehicle including common facilities according to an embodiment of the disclosure.

Referring to FIGS. 10(*a*) and (*b*), the CACC protocol architecture may include an application layer, a facilities layer, a network/transport layer, and/or an access layer. Further, the CACC protocol architecture may further include a management entity and a security entity. The basic description of each layer and entity has been made above in connection with FIG. 3.

In the embodiment of FIG. 10(*a*) illustrating the CACC protocol architecture of the target vehicle, the application layer may include a CACC application module/entity to provide a CACC service. Here, the CACC application entity denotes a higher layer entity (application layer entity) to enable a CACC service.

Further, the facilities layer may include a V2V messaging module/entity and/or a vehicle and sensing information gathering module/entity. Here, the V2V messaging entity denotes a facilities layer entity for exchanging V2V messages, and the vehicle and sensing information gathering entity denotes a facilities layer entity for gathering the vehicle's own information (vehicle information) and information via sensors (sensing information). The facilities layer's V2V messaging entity and vehicle and sensing information gathering entity are not dedicated facilities layer entities (dedicated facilities) used only for CACC services but common facilities layer entities (common facilities) used in other applications.

In the embodiment of FIG. 10(*b*) illustrating the CACC protocol architecture of the subject vehicle, the application layer may include a CACC application module/entity to provide a CACC service. As described above, the CACC application entity denotes a higher layer entity (application layer entity) to enable a CACC service. Further, the facilities layer may include a V2V/V2I messaging module/entity, a vehicle and sensing information gathering module/entity, a CACC management module/entity, a vehicle control module/entity, and/or an HMI supporting module/entity. As described above, the V2V messaging entity denotes a facilities layer entity for exchanging V2V messages, and the vehicle and sensing information gathering entity denotes a facilities layer entity for gathering the vehicle's own information (vehicle information) and information via sensors (sensing information). Further, the I2V messaging entity denotes a facilities layer entity for exchanging I2V messages. The V2X messaging entity and the I2V messaging entity may be denoted, e.g., a V2X/I2V messaging entity or V2X messaging entity.

The CACC management entity denotes a facilities layer entity that sets the CACC status, time gap, and/or target speed for a CACC service based on information for the V2X messaging entity and vehicle information gathering entity (vehicle and sensing information gathering entity). The vehicle control entity denotes a facilities layer entity that controls (e.g., controls the speed of) the vehicle. The vehicle control entity may control the vehicle by transmitting a control command directly to the vehicle actuator or transmitting a control command to the assistance system in other vehicle through the in-vehicle network. The HMI supporting entity denotes a facilities layer entity that transfers various notifications (for the driver) to the human machine interface (HMI) module. The facilities layer's V2V/V2I messaging entity, vehicle and sensing information gathering entity, and vehicle control entity and HMI supporting entity are not dedicated facilities layer entities (dedicated facilities) used only for CACC services but common facilities layer entities (common facilities) used in other applications.

FIG. 11 illustrates a CACC protocol architecture including a CACC dedicated facility according to an embodiment of the disclosure. In particular, FIGS. 11(a) and (b) illustrates the CACC protocol architecture of the target vehicle and subject vehicle including dedicated facilities according to an embodiment of the disclosure.

Referring to FIGS. 11(a) and (b), the CACC protocol architecture may include an application layer, a facilities layer, a network/transport layer, and/or an access layer. Further, the CACC protocol architecture may further include a management entity and a security entity. The basic description of each layer and entity has been made above in connection with FIG. 3.

Like in the embodiment of FIG. 10(a), in the embodiment of FIG. 11(a) illustrating the CACC protocol architecture of the target vehicle, the application layer may include a CACC application module/entity to provide a CACC service. As described above, the CACC application entity denotes a higher layer entity (application layer entity) to enable a CACC service.

However, unlike in the embodiment of FIG. 10(a), in the embodiment of FIG. 11(a), the facilities layer may include a dedicated CACC facilities layer entity (dedicated facility) for a CACC service. For example, the facilities layer may include a CACC V2V messaging module/entity and/or a CACC vehicle and sensing information gathering module/ entity. Here, the CACC V2V messaging entity denotes a facilities layer entity for exchanging V2V messages for a CACC service, and the CACC vehicle and sensing information gathering entity denotes a facilities layer entity for gathering the vehicle's own information (vehicle information) and information via sensors (sensing information) for a CACC service. The facilities layer's CACC V2V messaging entity and CACC vehicle and sensing information gathering entity correspond to dedicated facilities layer entities (dedicated facilities) used only for a CACC service. In a case where such dedicated facilities are used, a CACC service may be provided in low latency using the CACC-dedicated facility of the facilities layer.

Like in the embodiment of FIG. 10(b), in the embodiment of FIG. 11(b) illustrating the CACC protocol architecture of the subject vehicle, the application layer may include a CACC application module/entity to provide a CACC service. As described above, the CACC application entity denotes a higher layer entity (application layer entity) to enable a CACC service.

However, unlike in the embodiment of FIG. 10(b), in the embodiment of FIG. 11(b), the facilities layer may include a dedicated CACC facilities layer entity (dedicated facility) for a CACC service. For example, the facilities layer may include a CACC V2V/V2I messaging module/entity, a CACC vehicle and sensing information gathering module/ entity, a CACC management module/entity, and/or a CACC vehicle control module/entity. Further, the facilities layer may further include an HMI supporting module/entity.

As described above, the CACC V2V messaging entity denotes a facilities layer entity for exchanging V2V messages for a CACC service, and the CACC vehicle and sensing information gathering entity denotes a facilities layer entity for gathering the vehicle's own information (vehicle information) and information via sensors (sensing information) for a CACC service. Further, the CACC I2V messaging entity denotes a facilities layer entity for exchanging I2V messages for a CACC service. The CACC V2X messaging entity and the CACC I2V messaging entity may be denoted a CACC V2X/I2V messaging entity or CACC V2X messaging entity.

The CACC management entity denotes a facilities layer entity that sets the CACC status, time gap, and/or target speed for a CACC service based on information for the V2X messaging entity and vehicle information gathering entity (vehicle and sensing information gathering entity). The CACC vehicle control entity denotes a facilities layer entity that controls (e.g., controls the speed of) the vehicle for a CACC service. The vehicle control entity may control the vehicle by transmitting a control command directly to the vehicle actuator or transmitting a control command to the assistance system in other vehicle through the in-vehicle network. The HMI supporting entity denotes a facilities layer entity that transfers various notifications (for the driver) to the human machine interface (HMI) module. The facilities layer's CACC V2V/V2I messaging entity, CACC vehicle and sensing information gathering entity, and CACC vehicle control entity correspond to dedicated facilities layer entities (dedicated facilities) used only for a CACC service. In a case where such dedicated facilities are used, a CACC service may be provided in low latency using the CACC-dedicated facility of the facilities layer.

FIG. 12 illustrates a CACC state transition model according to an embodiment of the disclosure. FIG. 12 may be a CACC application status machine diagram. In the embodiment of FIG. 12, entry into each status may require a confirmation/permission from the CACC application or the driver. For example, TV discovery, CACC activation, or CACC end status may first be determined by the CACC management entity and, as necessary, a confirmation/permission from the CACC application or the driver may be needed. Each status is described below with reference to FIG. 12.

CACC Disabled: A status in which the CACC application has been disabled. This status may be triggered when the CACC application is turned off. For example, if the CACC is turned off in the TV discovery status, CACC terminated status, or CACC activated status, the CACC application may enter this status.

CACC Enabled: A status in which the CACC application has been enabled. This status may be triggered when the CACC application is turned on. According to an embodiment, this status may include a TV discovery status, a CACC activated status, and/or a CACC terminated status.

TV Discovery: A status in which the CACC application discovers the target vehicle. This status may be triggered when the CACC application is turned on, CACC disabled. As such, the enabled CACC application may discover the target vehicle by performing a preset TV discovery procedure.

CACC Activated: A status in which the CACC application has been activated. This status may be triggered when the target vehicle is selected in the TV discovery status. For example, when the target vehicle is discovered and selected, the CACC application may enter this status. In this status, the CACC application may determine whether a preset termination condition is met. Unless the termination condition is met, the CACC application may maintain this status. When the termination condition is met, the CACC application may enter the CACC terminated status. The preset termination condition may include the following examples.

Cut in: Where a third vehicle cuts in between the subject vehicle and the target vehicle.

Lane Change: Where the target vehicle changes lanes, and the target vehicle lacks a CACC application with lane change functionality.

Unwanted Route: Where the target vehicle moves to a route that the subject vehicle does not want.

Traffic signal: Where it is impossible to follow the target vehicle due to a traffic signal.

Misbehavior: Where the target vehicle does not follow the traffic signal and regulation speed.

Connection Lost: Where it is impossible to receive the target vehicle's V2V signal.

CACC Terminated: A status in which the CACC application has been terminated. This status may be triggered when the target vehicle is not selected in the TV discovery status. Or, this status may be triggered when a preset termination condition is met in the CACC activated status. Meanwhile, the CACC application may again perform the TV discovery procedure if CACC terminated. Even in this status, since the CACC application is in the enabled status, the CACC application may enter the TV discovery status again, e.g., if the CACC is not turned off.

FIG. 13 illustrates a CACC operation flow of a V2X communication device including a common facility according to an embodiment of the disclosure. In the embodiment of FIG. 13, the V2X communication device may be implemented according to a CACC protocol architecture (e.g., the protocol architecture of FIG. 10) including common facilities. In particular, in the embodiment of FIG. 13, the operation flow from the CACC disabled status to the TV discovery status and CACC activated status is shown.

In the embodiment of FIG. 13, the architecture of the roadside ITS-S may include an I2V messaging entity for exchanging I2V messages. The I2V messaging entity may be a facilities layer entity included in the facilities layer. Further, the architecture of the target vehicle (vehicle ITS-S) may follow the architecture of FIG. 10(a). For example, the target vehicle may include an application layer optionally including the CACC application, a facilities layer including the V2V messaging entity and/or vehicle and sensing information gathering entity, a network/transport layer, and an access layer. Further, the architecture of the subject vehicle (vehicle ITS-S) may follow the architecture of FIG. 10(b). For example, the subject vehicle may include an application layer including the CACC application, a facilities layer including the V2V/I2V messaging entity, vehicle and sensing information gathering entity, the CACC management entity, the vehicle control entity, and/or HMI supporting entity, a network/transport layer, and an access layer. Further, the subject vehicle may further include the HMI entity.

Referring to FIG. 13, the operation of the target vehicle (the vehicle ITS-S/V2X communication device of the target vehicle) is first described. The target vehicle may gather vehicle information using the vehicle and sensing information gathering entity. The vehicle and sensing information gathering entity may gather vehicle information and transfer the gathered vehicle information to the CACC application or V2V messaging entity. According to an embodiment, the vehicle information may include the vehicle's current speed, current acceleration, current degree of braking, whether a CACC string is formed, CACC string length, CAM message frequency, and/or vehicle type information.

The CACC application may transfer the vehicle information to the V2V messaging entity. As such, the gathered vehicle information may be transferred to the V2V messaging entity directly or via the CACC application.

Further, the target vehicle may transmit the vehicle information to the subject vehicle through V2X communication. To that end, the V2V messaging entity may transfer the vehicle information to the network/transport layer/access layer, and the network/transport layer/access layer may transmit the vehicle information to the subject vehicle through V2X communication.

At this time, processing for transmission of the vehicle information may be performed by each entity and layer. For example, the V2V messaging entity may generate a V2V message including the vehicle information and transfer the V2V message to the network/transport layer and access layer. Further, the network/transport layer and access layer may perform network/transport layer processing and access layer processing on the V2V message to generate a wireless signal and transfer the wireless signal to the subject vehicle through V2X communication. By such a process, the vehicle information may be transferred from the target vehicle's V2V messaging entity to the network/transport layer and access layer and may be transmitted to the subject vehicle via V2X communication.

Next, the operation of the roadside ITS-S/V2X communication device is described. The roadside ITS-S may transmit environment information to the subject vehicle via I2V communication. According to an embodiment, the environment information may include speed limit, degree of curve, number of lanes, whether CACC is permitted, whether CACC string length is limited and a length limit, whether number of CACC strings is limited and a limited number, degree of traffic, road condition, and/or weather condition.

The roadside ITS-S may transmit the environment information to the subject vehicle via I2V communication using the I2V messaging entity. At this time, processing for transmission of the environment information may be performed by the entity and layer of the roadside ITS-S. For example, the I2V messaging entity may generate an I2V message including the vehicle information and transfer the I2V message to the network/transport layer and access layer. Further, the network/transport layer and access layer may perform network/transport layer processing and access layer processing on the I2V message to generate a wireless signal and transfer the wireless signal to the subject vehicle through I2V communication. By such a process, the environment information may be transferred from the target vehicle's I2V messaging entity to the network/transport layer and access layer and may be transmitted to the subject vehicle via I2V communication.

Next, the operation of the subject vehicle (the vehicle ITS-S/V2X communication device of the subject vehicle) is described. The subject vehicle may turn on the CACC application. When the CACC application is turned on, the subject vehicle may switch the CACC status from the CACC disabled status to the CACC enabled status and TV discovery status. For example, where the CACC application is turned on, the CACC application may transfer a CACC enabling signal/message to the CACC management entity, and upon receiving the CACC enabling signal/message, the CACC management entity may switch the CACC status from the CACC disabled status to the CACC enabled status and TV discovery status. In this case, the CACC management entity may transfer CACC status information to the CACC application and/or HMI supporting entity. The HMI supporting entity may transfer the CACC status information to the HMI.

The subject vehicle may display the CACC status information using the HMI. Thus, the CACC status information may be provided to the user.

The subject vehicle may gather the subject vehicle's vehicle information (SV information) using the vehicle and sensing information gathering entity. The vehicle and sensing information gathering entity may gather the vehicle information and transfer the gathered vehicle information to the CACC application.

The subject vehicle may receive the target vehicle's vehicle information (TV information) from the target vehicle via V2X communication. In this case, the subject vehicle may perform the inversed operations of the operations for transmission of the target vehicle's vehicle information. For example, the access layer and network/transport layer of the subject vehicle may perform access layer processing and network/transport layer processing on the wireless signal received via V2X communication and transfer a V2V message containing the vehicle information to the V2V/I2V messaging entity. The V2V/I2V messaging entity of the subject vehicle may process the V2X message, obtaining the vehicle information. By such a process, the vehicle information may be received by the subject vehicle via V2X communication and be then transferred to the V2V/I2V messaging entity. Thereafter, the V2V/I2V messaging entity may transfer the obtained vehicle information to the CACC application.

The subject vehicle may receive environment information from the roadside ITS-S via I2V communication. In this case, the subject vehicle may perform the inversed operations of the operations for transmission of the roadside ITS-S's environment information. For example, the access layer and network/transport layer may perform access layer processing and network/transport layer processing on the wireless signal received via I2V communication and transfer an I2V message containing the environment information to the V2V/I2V messaging entity. The V2V/I2V messaging entity may process the I2V message, obtaining the environment information. By such a process, the environment information may be received by the subject vehicle via V2X communication and be then transferred to the V2V/I2V messaging entity. Thereafter, the V2V/I2V messaging entity may transfer the obtained environment information to the CACC application. Meanwhile, according to an embodiment, the V2V/I2V messaging entity may transfer the vehicle information and environment information both to the CACC application. Thus, the target vehicle's vehicle information and the environment information may be transferred to the CACC application. The CACC application may transfer the subject vehicle's vehicle information, the target vehicle's vehicle information and/or the environment information to the CACC management entity.

The subject vehicle may select the target vehicle using the CACC management entity. The CACC management entity may select the target vehicle using the subject vehicle's target information, the target vehicle's vehicle information and/or environment information and may transfer information about the selected target vehicle (selection target vehicle information) to the CACC application. In this case, the CACC application may transfer a confirmation message to the CACC management entity. At this time, the confirmation message may include information about the time gap (time gap information).

When the confirmation message is received, the subject vehicle may switch the CACC status into the CACC activated status using the CACC management entity. The CACC management entity may switch the CACC status from the TV discovery status to the CACC activated status. In this case, the CACC management entity may transfer the CACC status and selection target vehicle information to the CACC application. Further, the CACC management entity may transfer the CACC status and selection target vehicle information to the HMI supporting entity, and the HMI supporting entity may transfer the CACC status and selection target vehicle information to the HMI entity.

The subject vehicle may display the CACC status and target vehicle information using the HMI entity. Thus, the CACC status and target vehicle information may be provided to the user.

FIG. 14 illustrates a CACC operation flow of a V2X communication device including a common facility according to another embodiment of the disclosure. In particular, the embodiment of FIG. 14 shows an operation flow of the CACC activated status. In the embodiment of FIG. 14, the architecture of the roadside ITS-S, target vehicle, and subject vehicle follows the architecture of the roadside ITS-S, target vehicle, and subject vehicle of FIG. 13. In connection with FIG. 14, those described above with reference to FIG. 13 are not described.

Referring to FIG. 14, the operation of the target vehicle (the vehicle ITS-S/V2X communication device of the target vehicle) is first described. The target vehicle may gather vehicle information using the vehicle and sensing information gathering entity. Further, the target vehicle may transmit the vehicle information to the subject vehicle through V2X communication. A description related to the gathering and transmission of vehicle information is the same as what has been described above in connection with FIG. 13.

Next, the operation of the roadside ITS-S/V2X communication device is described. The roadside ITS-S may transmit environment information to the subject vehicle via I2V communication. A description related to the transmission of environment information is the same as what has been described above in connection with FIG. 13.

Next, the operation of the subject vehicle (the vehicle ITS-S/V2X communication device of the subject vehicle) is described. In the embodiment of FIG. 14, the subject vehicle is assumed to be in the CACC activated status. For example, the subject vehicle may enter from the TV discovery status to the CACC activated status through the process described above in connection with FIG. 13.

The subject vehicle may gather vehicle information using the vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 13.

Thereafter, the subject vehicle may calculate the target speed using the CACC management entity. The CACC management entity may calculate the target speed using the subject vehicle's vehicle information, the target vehicle's vehicle information, and/or the environment information.

Further, the subject vehicle may determine whether a termination condition is met using the CACC management entity. The termination condition is the same as what has been described above in connection with FIG. 12.

Further, the subject vehicle may control the vehicle speed using the vehicle control entity. For example, when the termination condition is not met, the CACC management entity may transfer information about the target speed (target speed information) to the vehicle control entity, and the vehicle control entity may control the vehicle speed using the target speed information.

Further, the subject vehicle may display the target speed information through the HMI entity. For example, unless the termination condition is met, the CACC management entity may transfer the target speed information to the HMI supporting entity, and the HMI supporting entity may transfer the target speed information to the HMI entity. In this case, the HMI entity may display the target speed information. Thus, the target speed information may be provided to the user.

FIG. 15 illustrates a CACC operation flow of a V2X communication device including a common facility according to still another embodiment of the disclosure. In particular, the embodiment of FIG. 15 shows an operation flow from the CACC activated status to the CACC terminated status. In the embodiment of FIG. 15, the architecture of the roadside ITS-S, target vehicle, and subject vehicle follows the architecture of the roadside ITS-S, target vehicle, and subject vehicle of FIG. 13. In connection with FIG. 15, no duplicate description is given of those described above in connection with FIGS. 13 and 14.

Referring to FIG. 15, the operation of the target vehicle (the vehicle ITS-S/V2X communication device of the target vehicle) is first described. The target vehicle may gather vehicle information using the vehicle and sensing information gathering entity. Further, the target vehicle may transmit the vehicle information to the subject vehicle through V2X communication. A description related to the gathering and transmission of vehicle information is the same as what has been described above in connection with FIG. 13.

Next, the operation of the roadside ITS-S/V2X communication device is described. The roadside ITS-S may transmit environment information to the subject vehicle via I2V communication. A description related to the transmission of environment information is the same as what has been described above in connection with FIG. 13.

Next, the operation of the subject vehicle (the vehicle ITS-S/V2X communication device of the subject vehicle) is described. In the embodiment of FIG. 15, the subject vehicle is assumed to be in the CACC activated status. For example, the subject vehicle may enter from the TV discovery status to the CACC activated status through the process described above in connection with FIG. 13.

The subject vehicle may gather vehicle information using the vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 13.

Thereafter, the subject vehicle may calculate the target speed using the CACC management entity. This is the same as what has been described above in connection with FIG. 14. Further, the subject vehicle may determine whether a termination condition is met using the CACC management entity. The termination condition is the same as what has been described above in connection with FIG. 12.

When the termination condition is met, the subject vehicle may switch the CACC status to the CACC terminated status. For example, when the termination condition is met, the CACC management entity may switch the CACC status from the CACC activated status to the CACC terminated status. In this case, the CACC management entity may transfer CACC status information to the CACC application and/or HMI supporting entity. The HMI supporting entity may transfer the CACC status information to the HMI.

Further, the subject vehicle may display the CACC status information using the HMI. Thus, the CACC status information may be provided to the user.

FIG. 16 illustrates a CACC operation flow of a V2X communication device including a common facility according to still another embodiment of the disclosure. In particular, the embodiment of FIG. 16 shows an operation flow from the CACC activated status to the CACC disabled status. In the embodiment of FIG. 16, the architecture of the roadside ITS-S, target vehicle, and subject vehicle follows the architecture of the roadside ITS-S, target vehicle, and subject vehicle of FIG. 13. In connection with FIG. 16, no duplicate description is given of those described above in connection with FIGS. 13 to 15.

Referring to FIG. 16, the operation of the target vehicle (the vehicle ITS-S/V2X communication device of the target vehicle) is first described. The target vehicle may gather vehicle information using the vehicle and sensing information gathering entity. Further, the target vehicle may transmit the vehicle information to the subject vehicle through V2X communication. A description related to the gathering and transmission of vehicle information is the same as what has been described above in connection with FIG. 13.

Next, the operation of the roadside ITS-S/V2X communication device is described. The roadside ITS-S may transmit environment information to the subject vehicle via I2V communication. A description related to the transmission of environment information is the same as what has been described above in connection with FIG. 13.

Next, the operation of the subject vehicle (the vehicle ITS-S/V2X communication device of the subject vehicle) is described. In the embodiment of FIG. 16, the subject vehicle is assumed to be in the CACC activated status. For example, the subject vehicle may enter from the TV discovery status to the CACC activated status through the process described above in connection with FIG. 13.

The subject vehicle may gather vehicle information using the vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 13.

Thereafter, the subject vehicle may calculate the target speed using the CACC management entity. This is the same as what has been described above in connection with FIG. 14. Further, the subject vehicle may determine whether a termination condition is met using the CACC management entity. The termination condition is the same as what has been described above in connection with FIG. 12.

Further, the subject vehicle may turn off the CACC application. In this case, the CACC application may transfer a CACC disabling signal/message to the CACC management entity.

Further, when the CACC disabling message is received, the subject vehicle may switch the CACC status to the CACC disabled status. For example, when the CACC disabling message is received, the CACC management entity may switch the CACC status from the CACC activated status to the CACC disabled status. In this case, the CACC management entity may transfer CACC status information to the CACC application and/or HMI supporting entity. The HMI supporting entity may transfer the CACC status information to the HMI.

Further, the subject vehicle may display the CACC status information using the HMI. Thus, the CACC status information may be provided to the user.

As described above in connection with FIGS. 13 to 16, where a vehicle provides a CACC service using a common facility, the provision of the CACC service needs to be controlled always via the CACC application. In this case, since the vehicle information or environment information used for, e.g., selecting the target vehicle, calculating the target speed, or determining the termination condition, is transferred to the CACC application, and then, need be processed by each entity of the facilities layer via the control of the CACC application, latency for providing a CACC service may be increased.

FIG. 17 illustrates a CACC operation flow of a V2X communication device including a CACC dedicated facility according to an embodiment of the disclosure. In the embodiment of FIG. 17, the V2X communication device may be implemented according to a CACC protocol architecture (e.g., the protocol architecture of FIG. 11) including common facilities. In particular, in the embodiment of FIG. 17, the operation flow from the CACC disabled status to the TV discovered status and CACC activated status is shown.

In the embodiment of FIG. 17, the architecture of the roadside ITS-S may include an I2V messaging entity for exchanging I2V messages. The I2V messaging entity may be a facilities layer entity included in the facilities layer. Further, the architecture of the target vehicle (vehicle ITS-S) may follow the architecture of FIG. 11(a). For example, the target vehicle may include an application layer optionally including the CACC application, a facilities layer including the CACC V2V messaging entity and/or CACC vehicle and sensing information gathering entity, a network/transport layer, and an access layer. Further, the architecture of the subject vehicle (vehicle ITS-S) may follow the architecture of FIG. 11(b). For example, the subject vehicle may include an application layer including the CACC application, a facilities layer including the CACC V2V/I2V messaging entity, CACC vehicle and sensing information gathering entity, the CACC management entity, the CACC vehicle control entity, and/or HMI supporting entity, a network/transport layer, and an access layer. Further, the subject vehicle may further include the HMI entity.

Referring to FIG. 17, the operation of the target vehicle (the vehicle ITS-S/V2X communication device of the target vehicle) is first described. The target vehicle may enable the CACC V2V messaging entity and the CACC vehicle and sensing information gathering entity. For example, the CACC application may enable the CACC V2V messaging entity and CACC vehicle and sensing information gathering entity by transmitting a CACC enabling signal/message to the V2V messaging entity and CACC vehicle and sensing information gathering entity.

Further, the target vehicle may gather vehicle information using the vehicle and sensing information gathering entity. The vehicle and sensing information gathering entity may gather vehicle information and transfer the gathered vehicle information to the CACC V2V messaging entity. As such, the gathered vehicle information may be transferred directly to the CACC V2V messaging entity without passing through the CACC application. According to an embodiment, the vehicle information may include the vehicle's current speed, current acceleration, current degree of braking, whether a CACC string is formed, CACC string length, CAM message frequency, and/or vehicle type information.

Further, the target vehicle may transmit the vehicle information to the subject vehicle through V2X communication. To that end, the V2V messaging entity may transfer the vehicle information to the network/transport layer and access layer, and the network/transport layer and access layer may transmit the vehicle information to the subject vehicle via V2X communication.

At this time, processing for transmission of the vehicle information may be performed by each entity and layer. For example, the CACC V2V messaging entity may generate a V2V message including the vehicle information and transfer the V2V message to the network/transport layer and access layer. Further, the network/transport layer and access layer may perform network/transport layer processing and access layer processing on the V2V message to generate a wireless signal and transfer the wireless signal to the subject vehicle through V2X communication. By such a process, the vehicle information may be transferred from the target vehicle's CACC V2V messaging entity to the network/transport layer and access layer and may be transmitted to the subject vehicle via V2X communication.

Next, the operation of the roadside ITS-S/V2X communication device is described. The roadside ITS-S may transmit environment information to the subject vehicle via I2V communication. According to an embodiment, the environment information may include speed limit, degree of curve, number of lanes, whether CACC is permitted, whether CACC string length is limited and a length limit, whether number of CACC strings is limited and a limited number, degree of traffic, road condition, and/or weather condition.

The roadside ITS-S may transmit the environment information to the subject vehicle via I2V communication using the I2V messaging entity. At this time, processing for transmission of the environment information may be performed by the entity and layer of the roadside ITS-S. For example, the I2V messaging entity may generate an I2V message including the vehicle information and transfer the I2V message to the network/transport layer and access layer.

Further, the network/transport layer and access layer may perform network/transport layer processing and access layer processing on the I2V message to generate a wireless signal and transfer the wireless signal to the subject vehicle through I2V communication. By such a process, the environment information may be transferred from the target vehicle's I2V messaging entity to the network/transport layer and access layer and may be transmitted to the subject vehicle via I2V communication.

Next, the operation of the subject vehicle (the vehicle ITS-S/V2X communication device of the subject vehicle) is described. The subject vehicle may turn on the CACC application. When the CACC application is turned on, the subject vehicle may switch the CACC status from the CACC disabled status to the CACC enabled status and TV discovery status. For example, where the CACC application is turned on, the CACC application may transfer a CACC enabling signal/message to the CACC management entity, and upon receiving the CACC enabling signal/message, the CACC management entity may switch the CACC status from the CACC disabled status to the CACC enabled status and TV discovery status. In this case, the CACC management entity may transfer CACC status information to the CACC application and/or HMI supporting entity. The HMI supporting entity may transfer the CACC status information to the HMI.

The subject vehicle may display the CACC status information using the HMI. Thus, the CACC status information may be provided to the user.

The subject vehicle may gather the subject vehicle's vehicle information (SV information) using the CACC vehicle and sensing information gathering entity. The CACC vehicle and sensing information gathering entity may gather the vehicle information and transfer the gathered vehicle information to the CACC management entity. In other words, the CACC vehicle and sensing information gathering entity may directly transfer the gathered vehicle information to the CACC management entity without passing through the CACC application.

The subject vehicle may receive the target vehicle's vehicle information (TV information) from the target vehicle via V2X communication. In this case, the subject vehicle may perform the inversed operations of the operations for transmission of the target vehicle's vehicle information. For example, the access layer and network/transport layer of the subject vehicle may perform access layer processing and network/transport layer processing on the wireless signal received via V2X communication and transfer a V2X message containing the vehicle information to the CACC V2V/I2V messaging entity. The CACC V2V/I2V messaging entity of the subject vehicle may process the V2V message, obtaining the vehicle information. By such a process, the vehicle information may be received by the subject vehicle via V2X communication and be then transferred to the CACC V2V/I2V messaging entity. Thereafter, the CACC V2V/I2V messaging entity may transfer the obtained vehicle information to the CACC management entity.

The subject vehicle may receive environment information from the roadside ITS-S via I2V communication. In this case, the subject vehicle may perform the inversed operations of the operations for transmission of the roadside ITS-S's environment information. For example, the access layer and network/transport layer may perform access layer processing and network/transport layer processing on the wireless signal received via I2V communication and transfer an I2V message containing the environment information to the CACC V2V/I2V messaging entity. The CACC V2V/I2V messaging entity may process the I2V message, obtaining the environment information. By such a process, the environment information may be received by the subject vehicle via V2X communication and be then transferred to the CACC V2V/I2V messaging entity. Thereafter, the CACC V2V/I2V messaging entity may transfer the obtained environment information to the CACC management entity. Meanwhile, according to an embodiment, the CACC V2V/I2V messaging entity may transfer the vehicle information and environment information both to the CACC management entity. Thus, the target vehicle's vehicle information and/or the environment information may be transferred to the CACC management entity. In other words, the CACC V2V/I2V messaging entity may transfer the received vehicle information and environment information directly to the CACC management entity without passing through the CACC application.

The subject vehicle may select the target vehicle using the CACC management entity. The CACC management entity may select the target vehicle using the subject vehicle's target information, the target vehicle's vehicle information and/or environment information and may transfer information about the selected target vehicle (selection target vehicle information) to the CACC application. In this case, the CACC application may transfer a confirmation message to the CACC management entity. At this time, the confirmation message may include information about the time gap (time gap information).

When the confirmation message is received, the subject vehicle may switch the CACC status into the CACC activated status using the CACC management entity. The CACC management entity may switch the CACC status from the TV discovery status to the CACC activated status. In this case, the CACC management entity may transfer the CACC status and selection target vehicle information to the CACC application. Further, the CACC management entity may transfer the CACC status and selection target vehicle information to the HMI supporting entity, and the HMI supporting entity may transfer the CACC status and selection target vehicle information to the HMI entity.

The subject vehicle may display the CACC status and target vehicle information using the HMI entity. Thus, the CACC status and target vehicle information may be provided to the user.

FIG. 18 illustrates a CACC operation flow of a V2X communication device including a CACC dedicated facility according to another embodiment of the disclosure. In particular, the embodiment of FIG. 18 shows an operation flow of the CACC activated status. In the embodiment of FIG. 18, the architecture of the roadside ITS-S, target vehicle, and subject vehicle follows the architecture of the roadside ITS-S, target vehicle, and subject vehicle of FIG. 17. In connection with FIG. 18, those described above with reference to FIG. 17 are not described.

Referring to FIG. 18, the operation of the target vehicle (the vehicle ITS-S/V2X communication device of the target vehicle) is first described. The target vehicle may gather vehicle information using the CACC vehicle and sensing information gathering entity. Further, the target vehicle may transmit the vehicle information to the subject vehicle through V2X communication. A description related to the gathering and transmission of vehicle information is the same as what has been described above in connection with FIG. 17.

Next, the operation of the roadside ITS-S/V2X communication device is described. The roadside ITS-S may transmit environment information to the subject vehicle via I2V communication. A description related to the transmission of environment information is the same as what has been described above in connection with FIG. 13.

Next, the operation of the subject vehicle (the vehicle ITS-S/V2X communication device of the subject vehicle) is described. In the embodiment of FIG. 18, the subject vehicle is assumed to be in the CACC activated status. For example, the subject vehicle may enter from the TV discovery status to the CACC activated status through the process described above in connection with FIG. 17.

The subject vehicle may gather vehicle information using the CACC vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 17.

Thereafter, the subject vehicle may calculate the target speed using the CACC management entity. The CACC management entity may calculate the target speed using the subject vehicle's vehicle information, the target vehicle's vehicle information, and/or the environment information.

Further, the subject vehicle may determine whether a termination condition is met using the CACC management entity. The termination condition is the same as what has been described above in connection with FIG. 12.

Further, the subject vehicle may control the vehicle speed using the CACC vehicle control entity. For example, when the termination condition is not met, the CACC management entity may transfer information about the target speed (target speed information) to the CACC vehicle control entity, and the CACC vehicle control entity may control the vehicle speed using the target speed information.

Further, the subject vehicle may display the target speed information through the HMI entity. For example, unless the termination condition is met, the CACC management entity may transfer the target speed information to the HMI supporting entity, and the HMI supporting entity may transfer the target speed information to the HMI entity. In this case, the HMI entity may display the target speed information. Thus, the target speed information may be provided to the user.

FIG. 19 illustrates a CACC operation flow of a V2X communication device including a CACC dedicated facility according to still another embodiment of the disclosure. In particular, the embodiment of FIG. 19 shows an operation flow from the CACC activated status to the CACC terminated status. In the embodiment of FIG. 19, the architecture of the roadside ITS-S, target vehicle, and subject vehicle follows the architecture of the roadside ITS-S, target vehicle, and subject vehicle of FIG. 17. In connection with FIG. 19, no duplicate description is given of those described above in connection with FIGS. 17 and 18.

Referring to FIG. 19, the operation of the target vehicle (the vehicle ITS-S/V2X communication device of the target vehicle) is first described. The target vehicle may gather vehicle information using the CACC vehicle and sensing information gathering entity. Further, the target vehicle may transmit the vehicle information to the subject vehicle through V2X communication. A description related to the gathering and transmission of vehicle information is the same as what has been described above in connection with FIG. 17.

Next, the operation of the roadside ITS-S/V2X communication device is described. The roadside ITS-S may transmit environment information to the subject vehicle via I2V communication. A description related to the transmission of environment information is the same as what has been described above in connection with FIG. 17.

Next, the operation of the subject vehicle (the vehicle ITS-S/V2X communication device of the subject vehicle) is described. In the embodiment of FIG. 19, the subject vehicle is assumed to be in the CACC activated status. For example, the subject vehicle may enter from the TV discovery status to the CACC activated status through the process described above in connection with FIG. 17.

The subject vehicle may gather vehicle information using the CACC vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 17.

Thereafter, the subject vehicle may calculate the target speed using the CACC management entity. This is the same as what has been described above in connection with FIG. 18. Further, the subject vehicle may determine whether a termination condition is met using the CACC management entity. The termination condition is the same as what has been described above in connection with FIG. 12.

When the termination condition is met, the subject vehicle may switch the CACC status to the CACC terminated status. For example, when the termination condition is met, the CACC management entity may switch the CACC status from the CACC activated status to the CACC terminated status. In this case, the CACC management entity may transfer CACC status information to the CACC application and/or HMI supporting entity. The HMI supporting entity may transfer the CACC status information to the HMI.

Further, the subject vehicle may display the CACC status information using the HMI. Thus, the CACC status information may be provided to the user.

FIG. 20 illustrates a CACC operation flow of a V2X communication device including a CACC dedicated facility according to still another embodiment of the disclosure. In particular, the embodiment of FIG. 20 shows an operation flow from the CACC activated status to the CACC disabled status. In the embodiment of FIG. 20, the architecture of the roadside ITS-S, target vehicle, and subject vehicle follows the architecture of the roadside ITS-S, target vehicle, and subject vehicle of FIG. 17. In connection with FIG. 20, no duplicate description is given of those described above in connection with FIGS. 17 to 19.

Referring to FIG. 20, the operation of the target vehicle (the vehicle ITS-S/V2X communication device of the target vehicle) is first described. The target vehicle may gather vehicle information using the CACC vehicle and sensing information gathering entity. Further, the target vehicle may transmit the vehicle information to the subject vehicle through V2X communication. A description related to the gathering and transmission of vehicle information is the same as what has been described above in connection with FIG. 17.

Next, the operation of the roadside ITS-S/V2X communication device is described. The roadside ITS-S may transmit environment information to the subject vehicle via I2V communication. A description related to the transmission of environment information is the same as what has been described above in connection with FIG. 17.

Next, the operation of the subject vehicle (the vehicle ITS-S/V2X communication device of the subject vehicle) is described. In the embodiment of FIG. 20, the subject vehicle is assumed to be in the CACC activated status. For example, the subject vehicle may enter from the TV discovery status to the CACC activated status through the process described above in connection with FIG. 17.

The subject vehicle may gather vehicle information using the CACC vehicle and sensing information gathering entity. Further, the subject vehicle may receive the target vehicle's vehicle information from the target vehicle via V2X communication. Further, the subject vehicle may receive environment information from the roadside ITS-S via I2V communication. The subject vehicle's vehicle information, the target vehicle's vehicle information, and/or the environment information may be transferred to the CACC management entity via the processes of gathering the subject vehicle's vehicle information, receiving the target vehicle's vehicle information, and receiving the environment information. This is the same as what has been described above in connection with FIG. 17.

Thereafter, the subject vehicle may calculate the target speed using the CACC management entity. This is the same as what has been described above in connection with FIG. 18. Further, the subject vehicle may determine whether a termination condition is met using the CACC management entity. The termination condition is the same as what has been described above in connection with FIG. 12.

Further, the subject vehicle may turn off the CACC application. In this case, the CACC application may transfer a CACC disabling signal/message to the CACC management entity.

Further, when the CACC disabling message is received, the subject vehicle may switch the CACC status to the CACC disabled status. For example, when the CACC disabling message is received, the CACC management entity may switch the CACC status from the CACC activated status to the CACC disabled status. In this case, the CACC management entity may transfer CACC status information to the CACC application and/or HMI supporting entity. The HMI supporting entity may transfer the CACC status information to the HMI.

Further, the subject vehicle may display the CACC status information using the HMI. Thus, the CACC status information may be provided to the user.

As described above in connection with FIGS. 17 to 20, where a vehicle provides a CACC service using a CACC dedicated facility, the CACC service need not be provided always through the CACC application but may be provided directly by the CACC facility entity. In this case, since the vehicle information or environment information used for, e.g., selecting the target vehicle, calculating the target speed, or determining the termination condition, is transferred to the CACC application, and then, need not be processed by each entity of the facilities layer via the control of the CACC application, latency for providing a CACC service may be decreased.

The V2X communication device may provide a CACC service that is operated actually without an error by defining a CACC architecture, status transition model, and operation flow exemplified in FIGS. 10 to 20. Further, a CACC pair/string may smoothly be released/recombined via a status transition model related to the termination condition. Further, the operation flow may be simplified via the CACC dedicated facilities layer entity so that the delay/latency for providing a CACC service may be reduced.

CACC Gap Enhancement

Described below are issues when providing a CACC service considering only the minimum time gap and a scheme for address such issues. In particular, a scheme using the minimum safety distance is described.

Given the time gap alone, the distance between the target vehicle and the subject vehicle is calculated by the following equation.

$$d(t)=T \cdot v_s(t)$$ [Equation 1]

(where $d(t)$ is the distance between the target vehicle and subject vehicle at time instance (t), T is a predefined time gap, and $V_s(t)$ is the speed of the subject vehicle at time instance (t)).

In practice, since it is difficult to exactly maintain the distance and, when $V_s(t)$ becomes "0," $d(t)$ becomes "0" as well, a safety margin, i.e., the minimum safety distance for vehicle safety, needs to be considered. For example, where the vehicle's speed is very low, providing a CACC service considering only the minimum time gap causes the target vehicle to become very close to the subject vehicle. This may raise the risk of collision between the two vehicles. Thus, the minimum safety distance, along with the minimum time gap, needs to be considered in providing a CACC service and, at this time, the minimum safety distance should be set to be not less than the distance necessary for avoiding a collision. Hence, the CACC service may be defined as a service that automatically adjusts the subject vehicle's speed to maintain the target time gap with the target vehicle while maintaining the minimum safety distance with the target vehicle. Resultantly, the inter-vehicle distance in the CACC may be defined as in the following equation.

$$T \geq T_{min} \& D \geq D_{min}$$ [Equation 2]

(where T is the time gap, and D is the distance gap. Tmin is the minimum time gap, and Dmin is the minimum distance gap.)

where T is the time gap, and D is the distance gap. Tmin is the minimum time gap, and Dmin is the minimum distance gap.

Meanwhile, although a variation in the speed of the target vehicle occurs, if the amount of information for the target vehicle increases, the time gap and the distance gap may remain constant (low variance). If this gap may be maintained constant, the minimum gap for ensuring safety, i.e., the minimum time gap and the minimum distance gap, may be selected as a small value. Resultantly, this may enhance traffic efficiency and reduce fuel consumption. Kinds of information for that purpose are as follows.

Distance information between target vehicle and subject vehicle

Target vehicle's speed information

Target vehicle's acceleration information

Further, if the subject vehicle may adjust its speed at fewer intervals by more frequently obtaining the information, the time gap and the distance gap may be maintained constant. At this time, the minimum time gap and the minimum distance gap may be selected as small values. Resultantly, this may enhance traffic efficiency and reduce fuel consumption.

Generally, the CACC may be applied between vehicles on a single lane. However, in some cases, the CACC may also be applied between vehicles on different lanes. Thus, CACC applicable between vehicles on different lanes (multi-lane CACC), as well as CACC applicable between vehicles on a single lane (single lane CACC) needs to be considered.

Hereinafter, such multi-lane CACC is described. Further, the operation of the subject vehicle when the target vehicle changes lanes is described.

First, a communication/protocol architecture for multi-lane CACC and CACC with lane change is described. Further, the gap for multi-lane CACC, target vehicle ID (TVID), and status transition model are described. A CACC service with lane change is described as well. Further, a flow of CACC messages and information for a CACC service is described.

The CACC-related embodiments described below are also applicable to platooning technology as well as CACC technology. Here, platooning is technology that forms a group for reducing fuel consumption and maintains the minimum gap between the members of the group. The platoon group may be managed by the lead vehicle, be joined by a new member or left by an existing member, or platoon groups may be merged together, one group may be separated off, or the group itself may be dismissed. Group management in such platooning technology may be performed in the same or a similar manner to the CACC string management described below. For example, providing a platooning service on multiple lanes and the operation of a vehicle in a platooning group, e.g., as the lead vehicle changes lanes may correspond to a multi-lane CACC service and the operation of the subject vehicle as the target vehicle changes lanes as described below. In this case, the CACC pair may correspond to the platooning pair, and the CACC string may correspond to the platooning string.

FIG. 21 illustrates a CACC protocol architecture according to another embodiment of the disclosure. In particular, the embodiment of FIG. 21 illustrates a protocol architecture for multi-lane CACC and CACC with lane change. In the embodiment of FIG. 21, the CACC protocol architecture may include a common facility and provide a CACC service through the common facility. The description of the common facility is the same as what has been described above in connection with FIG. 10.

Referring to FIG. 21, the CACC protocol architecture may include an application layer, a facilities layer, a network/transport layer, and/or an access layer. Further, the CACC protocol architecture may further include a management entity and a security entity. The basic description of each layer and entity has been made above in connection with FIG. 3.

In the embodiment of FIG. 21, the application layer may include a CACC application module/entity to provide a CACC service. Here, the CACC application entity denotes a higher layer entity (application layer entity) to enable a CACC service. Further, the facilities layer may include a V2V/I2V messaging module/entity, a vehicle and sensing information gathering module/entity, a CACC management module/entity, a vehicle control module/entity, and/or an HMI supporting module/entity. Basic descriptions of the V2V/I2V messaging entity, vehicle and sensing information gathering entity, vehicle control entity, and HMI supporting entity are the same as those described above in connection with FIG. 10.

In the embodiment of FIG. 21, the facilities layer may further include entities such as a lane recognition system and/or a lane keeping system. When its function is active, the lane keeping system may provide a warning message to the driver in various manners or adjusts the travelling direction of the vehicle on its own when the vehicle departs off the lane, preventing the vehicle from departing off the current lane while automatically adjusting the vehicle. The lane keeping system needs to be equipped with the lane recognition system as default so that it may run. For vehicles equipped with both the lane keeping system and CACC system which are both active, such a setting may be made that the lane keeping system prevents the CACC system from changing lanes, and a lane change by the CACC system may allowed in the lane keeping system.

As described above, the CACC management entity denotes a facilities layer entity that sets the CACC status, time gap, and/or target speed for a CACC service based on information for the V2X messaging entity and vehicle information gathering entity (vehicle and sensing information gathering entity). Further, upon identifying whether the target vehicle makes a lane change via an assistance system such as a V2X message and/or lane recognition system and the lane keeping system, the CACC management entity may determine whether to terminate the CACC, keep following the target vehicle via a lane change (i.e., whether to maintain the single lane CACC), or to keep following the target vehicle while maintaining the current lane (i.e., whether to switch to the multi-lane CACC). In this case, the CACC management entity may identify the driver's determination or a preset determination via the HMI supporting entity and determine the same.

Gap for Multi-Lane CACC

The gap between the target vehicle and subject vehicle in multi-lane CACC is described below with reference to FIGS. 22 to 25. Here, gap means the minimum value (geometrical distance or FIG. 22 illustrates a geometrical distance gap for multi-lane CACC according to an embodiment of the disclosure. FIG. 23 illustrates a geometrical distance gap for multi-lane CACC according to another embodiment of the disclosure.

As shown in FIG. 22, the geometrical distance gap for multi-lane CACC may be defined as a geometrical distance of the longitudinal difference between a preceding vehicle's (i.e., TV's) front end and a following vehicle's (i.e., SV's) front end.

As shown in FIG. 23, the geometrical distance gap for multi-lane CACC may be defined as a geometrical distance of the longitudinal difference between a preceding vehicle's (i.e., TV's) rear end and a following vehicle's (i.e., SV's) front end.

FIG. 24 illustrates a time gap for multi-lane CACC according to an embodiment of the disclosure. FIG. 25 illustrates a time gap for multi-lane CACC according to another embodiment of the disclosure.

As shown in FIG. 24, the time gap for multi-lane CACC may be defined as a time gap at a given time that will be taken for a following vehicle's (i.e., SV's) front end to pass the longitudinal location of a preceding vehicle's (i.e., TV's) front end.

This time gap may be defined as in Equation 3 below.

$$\text{Time Gap }(t_0) = \frac{\text{Geometrical Distance Gap }(t_0)}{v_s(t_0)} \quad \text{[Equation 3]}$$

Here, time gap (t0) is the time gap at given time t0, geometrical distance gap t0 is the geometrical distance gap at given time t0, and Vs(t0) is the speed of the subject vehicle at given time t0.

Or, as shown in FIG. 25, the time gap for multi-lane CACC may be defined as a time gap at a given time that will be taken for a following vehicle's (i.e., SV's) rear end to pass the longitudinal location of a preceding vehicle's (i.e., TV's) front end.

The gap between the target vehicle and the subject vehicle plays a role as a safety margin, and the vehicle speed needs to be considered as a main factor.

Given only the time gap in single lane CACC, the actual distance gap between the two vehicles becomes very small as the vehicle speed is very low. Thus, in single lane CACC, the distance gap, along with the time gap, needs to be considered to reduce the risk of collision when the vehicle speed is low. This is described with reference to FIG. 26.

Meanwhile, in multi-lane CACC, although the actual distance gap in the vertical direction is reduced as the vehicle speed is very low, the target vehicle and the subject vehicle are positioned on different lanes and thus has no risk of collision therebetween, and thus, considering the time gap alone would not increase the risk of direct collision. This is described with reference to FIG. 27.

However, in multi-lane CACC, the subject vehicle's likelihood of collision with other vehicle, not the target vehicle, on the same lane needs to be considered. This is described with reference to FIG. 28.

FIG. 26 illustrates an example of use of a gap for single lane CACC according to an embodiment of the disclosure.

For example, where a (minimum) time gap (e.g., 0.2 seconds) is maintained at a high speed (e.g., a speed higher than 18 km/h) as shown in FIG. 26(a), the target vehicle and the subject vehicle may have a distance along the horizontal direction which is longer than a (minimum) distance gap (e.g., one meter). However, where the (minimum) time gap (e.g., 0.2 seconds) is maintained at a low speed (e.g., a speed lower than 18 km/h) as shown in FIG. 26(b), the target vehicle and the subject vehicle may have a distance along the horizontal direction which is short than the (minimum) distance gap (e.g., one meter).

As such, since in single lane CACC the distance along the horizontal direction between the target vehicle and the subject vehicle reduces as the vehicle speed decreases, the risk of collision between the two vehicles increases. Thus, in single lane CACC, the (minimum) distance gap along with the (minimum) time gap needs to be considered to prevent the risk of collision between the target vehicle and the subject vehicle. In this case, the distance between the two vehicles needs to remain longer than the minimum distance gap regardless of the vehicle speed.

FIG. 27 illustrates an example of use of a gap for multi-lane CACC according to an embodiment of the disclosure.

For example, where the (minimum) time gap (e.g., 0.2 seconds) is maintained at a high speed (e.g., 60 km/h) as shown in FIG. 27(a), the target vehicle and the subject vehicle may have a distance along the horizontal direction which is equal to a first distance (e.g., 3.33 meters). Where the (minimum) time gap (e.g., 0.2 seconds) is maintained at a low speed (e.g., 30 km/h) as shown in FIG. 27(b), the target vehicle and the subject vehicle may have a distance along the horizontal direction which is equal to a second distance (e.g., 1.67 meters) which is shorter than the first distance. Where the (minimum) time gap (e.g., 0.2 seconds) is maintained when stopped (e.g., 0 km/h), the distance along the horizontal direction between the target vehicle and the subject vehicle may be 0. However, since the two vehicles are on different lanes, they do not collide with each other.

As such, although in multi-lane CACC the distance along the horizontal direction between the target vehicle and the subject vehicle reduces as the vehicle speed decreases, the risk of collision between the two vehicles does not increase because the target vehicle and the subject vehicle are on the different lanes. Thus, in multi-lane CACC, the risk of collision between the target vehicle and the subject vehicle does not increase although only the time gap is considered.

FIG. 28 illustrates a gap increased upon recognizing a collision risk according to an embodiment of the disclosure. FIG. 28(a) illustrates the time gap in a normal context, and FIG. 28(b) illustrates an increased gap upon recognizing the risk of collision.

For example, in the normal context as shown in FIG. 28(a), the (minimum) time gap between the target vehicle and the subject vehicle may be maintained. According to an embodiment, the time gap may be maintained to be 0.3 seconds or less via V2X communication. For example, in the normal context, the time gap may be maintained as 0.2 seconds (=3.33 meters) when driving at 60 km/h. However, where the minimum value is determined via a regulation of the area where CACC applies, the time gap should not violate the minimum value.

In other words, the subject vehicle needs to slow down to avoid a collision when a collision is expected while following the target vehicle at a predetermined gap. At this time, although the gap with the target vehicle may further increase, the CACC may be regarded as normally operating because a larger gap than the predetermined time gap or the minimum distance gap is maintained.

As shown in FIG. 28(b), the target vehicle may recognize the risk of collision with a vehicle other than the target vehicle. In this case, to avoid the risk of collision with the other vehicle than the target vehicle, the subject vehicle needs to reduce the speed. At this time, to avoid the risk of collision with the other vehicle than the target vehicle, the actual gap (actual time gap or actual distance gap) between the subject vehicle and the target vehicle increases. However, even in this case, since the increased actual gap is larger than the preset time gap or minimum distance gap, the CACC may be considered as normally operating. In such a context, a selection process may be performed as to whether to maintain the multi-lane CACC, switch to the single lane CACC, or terminate the CACC.

Broadcasting Target Vehicle's ID (TVID)

In single lane CACC, the target vehicle needs to be located always ahead of the subject vehicle, and such an occasion does not arise where the target vehicle follows the subject vehicle. However, since multi-lane CACC does not have such restriction, such a context may arise where the target vehicle determines that the subject vehicle is its target vehicle and follows it. This may be denoted circular following which is described below with reference to FIG. 29.

FIG. 29 illustrates circular following in multi-lane CACC according to an embodiment of the disclosure. In the embodiment of FIG. 29, vehicle A and vehicle BB are assumed to be multi-lane CACC-capable CACC vehicles.

FIG. 29(a) illustrates an example of no CACC, e.g., when no CACC pair or CACC string has been formed. As in the embodiment of FIG. 29(a), vehicle B which is CACC-activated may discover a target vehicle for multi-lane CACC.

FIG. 29(b) illustrates an example of multi-lane CACC. As in the embodiment of FIG. 29(b), in the case of multi-lane CACC, vehicle B may follow vehicle A, as the target vehicle, on a different lane. In this case, vehicle B may follow vehicle A at a preset gap b.

FIG. 29(c) illustrates an example of multi-lane CACC. As in the embodiment of FIG. 29(c), in the case of multi-lane CACC, vehicle A which is the target vehicle of vehicle B may find a target vehicle for multi-lane CACC.

FIG. 29(d) illustrates an example in which circular following starts. As in the embodiment of FIG. 29(d), as vehicle A, which is the target vehicle of vehicle B, attempts to follow vehicle B, circular following may begin.

FIG. 29(e) illustrates an example of circular following. As in the embodiment of FIG. 29(e), vehicle A may follow vehicle B, which takes vehicle A as the target vehicle, by slowing down. In this case, vehicle A may follow vehicle B at a preset gap a. Thus, the circular following phenomenon in which a vehicle follows the subject vehicle taking the vehicle as its target vehicle may occur.

FIG. 29(f) illustrates an example of circular following. As in the embodiment of FIG. 29(f), vehicle B may again follow vehicle A, which takes vehicle A as the target vehicle, by slowing down. In this case, vehicle B may follow vehicle A at a preset gap b. Thus, the circular following phenomenon in which a vehicle follows the subject vehicle taking the vehicle as its target vehicle may be repeated.

Where such circular following occurs, each of the two vehicles repeats the slow-down to following the other vehicle, as the target vehicle, causing the capability of multi-lane CACC. Thus, a need exists for a scheme for preventing such circular following phenomenon.

An embodiment for preventing circular following using target vehicle ID information for identifying the target vehicle is described below with reference to FIG. 30.

FIG. 30 illustrates a method for avoiding circular following in multi-lane CACC according to an embodiment of the disclosure. In the embodiment of FIG. 30, vehicle A and vehicle BB are assumed to be multi-lane CACC-capable CACC vehicles.

FIG. 30(a) illustrates an example of no CACC, e.g., when no CACC pair or CACC string has been formed. As in the embodiment of FIG. 30(a), when there is no CACC, vehicle B which is CACC-activated may discover a target vehicle for multi-lane CACC.

FIG. 30(b) illustrates an example of multi-lane CACC. As in the embodiment of FIG. 30(b), in the case of multi-lane CACC, vehicle B may follow vehicle A, as the target vehicle, on a different lane. In this case, vehicle B may follow vehicle A at a preset gap b. Further, vehicle B may broadcast ID information for vehicle A, which is vehicle B's target vehicle, as target vehicle ID information (TVID).

FIG. 30(c) illustrates an example of multi-lane CACC. As in the embodiment of FIG. 29(c), in the case of multi-lane CACC, vehicle A which is the target vehicle of vehicle B may find a target vehicle for multi-lane CACC.

FIG. 30(d) illustrates an example in which no circular following occurs. As in the embodiment of FIG. 30(d), vehicle A does not attempt to follow vehicle B which is the target vehicle following vehicle A. This is why vehicle A has received the target vehicle ID information from vehicle B which is the target vehicle following vehicle A and has identified that the target vehicle of vehicle B identified by the information is vehicle A itself.

As such, the subject vehicle may prevent circular following by broadcasting ID information for its target vehicle.

According to an embodiment, the target vehicle ID information may be defined as in Table 1 below.

TABLE 1

| Descriptive Name | TVID |
|---|---|
| Identifier | DataType_xxx |
| ASN.1 representation | TVID ::= INTEGER(0 . . . 1000) Or BIT STRING (64) or OCTET STRING (8) |
| Definition | This DE (Data Element) identifies the target vehicle. |
| Unit | N/A |

The target vehicle ID information (TVID), as the DE, may be used to identify the target vehicle. That is, the target vehicle ID information may indicate the target vehicle's ID. For example, the target vehicle ID information may be the MAC address of the target vehicle.

The target vehicle may broadcast an ITS message (V2X message) containing the target vehicle ID information, and the target vehicle of the subject vehicle may receive the ITS message. The target vehicle may obtain the target vehicle ID information contained in the ITS message, compare the target vehicle ID information with its own ID value, and determine whether the target vehicle identified by the target vehicle ID information is itself. When the target vehicle identified by the target vehicle ID information is determined to be itself, the target vehicle may determine that the vehicle taking the target vehicle as its target vehicle is not the subject vehicle for multi-lane CACC. Thus, circular following may be prevented.

Selection and Switch of CACC Mode (Single Lane CACC Mode/Multi-Lane CACC Mode)

If more and more vehicles provide single lane CACC, the CACC string is lengthened. Further, if more and more vehicles provide multi-lane CACC, the CACC vehicles happen to occupy more lanes. As such, if the CACC string is lengthened or CACC vehicles are present on too many lanes, traffic efficiency reduces.

Thus, a CACC vehicle may identify the CACC mode of its ambient CACC vehicles, setting the CACC mode that has no or minimum negative influence on traffic efficiency. Or, the RSU may broadcast the length of the CACC string, number of lanes allowed for CACC, or traffic regulation information, e.g., lanes allowed for CACC. In this case, the CACC vehicle should be able to select the CACC mode that may observe such regulation and requires information for the CACC mode of the CACC vehicles (CACC mode information).

By the CACC mode information, the CACC vehicle may identify which mode of the single lane CACC mode or multi-lane CACC mode its surrounding CACC vehicle (neighbor CACC vehicle) operates in and, based thereupon, select, or switch to, its proper CACC mode. Thus, the CACC vehicle needs to transmit its own CACC mode information. According to an embodiment, the CACC mode information (CACC mode) may be defined as in Table 2 below.

TABLE 2

| Descriptive Name | CACCMode |
|---|---|
| Identifier | DataType_xxx |
| ASN.1 representation | CACCMode ::= INTEGER {singleLaneCACC(1), multiLaneCACC(2)} (1 . . . 10) |
| Definition | This DE (Data Element) identifies the CACC mode. |
| Unit | N/A |

The CACC mode information, as the DE, may indicate/identify the CACC mode. For example, the CACC mode information may be an integer ranging from 1 to 10 to indicate the CACC mode. For example, where the CACC mode information value is 1, the CACC mode information may indicate that the CACC mode is the single lane CACC mode to provide single lane CACC. Where the CACC mode information value is 2, the CACC mode information may indicate that the CACC mode is the multi-lane CACC mode to provide multi-lane CACC.

The CACC vehicle may transmit an ITS message (V2X message) containing the CACC mode information. Thus, the CACC vehicle may provide information for its CACC mode to its neighbor CACC vehicle.

The neighbor CACC vehicle may receive the ITS message and obtain the CACC mode information contained in the ITS message. The neighbor CACC vehicle may select or switch its CACC mode based on the CACC mode information. Thus, the neighbor CACC vehicle may properly set the CACC mode that has no or minimum negative influence on traffic efficiency.

Described below are an embodiment in which a subject vehicle selects a CACC mode with reference to FIGS. 31 and 32 and an embodiment in which the subject vehicle switches the CACC mode with reference to FIGS. 33 and 34.

FIG. 31 illustrates a method in which a subject vehicle determines a CACC mode using CACC mode information according to an embodiment of the disclosure. In particular, the embodiment of FIG. 31 shows a method in which the subject vehicle selects the multi-lane CACC mode, as its CACC mode, using CACC mode information.

As shown in FIG. 31(a), the subject vehicle may discover the target vehicle and may thus find a long string of single lane CACC. As such, a large portion of one lane may be occupied by the long single lane CACC string. At this time, the CACC vehicles in the single lane CACC string may broadcast CACC mode information (e.g., CACCMode=1) indicating the single lane CACC mode.

As shown in FIG. 31(b), the subject vehicle may activate multi-lane CACC based on the received CACC mode information. For example, the subject vehicle may select the multi-lane CACC mode, as its CACC mode, using the CACC mode information received from the CACC vehicles in the long single lane CACC string. At this time, the subject vehicle may determine whether the length of the single lane CACC string is a preset length limit based on the received CACC mode information and, if it is longer than the preset length limit, select the multi-lane CACC mode as its CACC mode. By doing so, the length of the single lane CACC string may be prevented from further increasing.

In this case, the subject vehicle may determine that one CACC vehicle in the single lane CACC string is the target vehicle and may follow the target vehicle on a different lane. For example, as shown, the subject vehicle may determine that the lead vehicle in the single lane CACC string is the target vehicle and follow the lead vehicle on a next lane. According to an embodiment, the subject vehicle may broadcast the CACC mode information indicating the multi-lane CACC mode which is its CACC mode.

FIG. 32 illustrates a method in which a subject vehicle determines a CACC mode using CACC mode information according to an embodiment of the disclosure. In particular, the embodiment of FIG. 32 shows a method in which the subject vehicle selects the single lane CACC mode, as its CACC mode, using CACC mode information.

As shown in FIG. 32(a), the subject vehicle may discover the target vehicle and may thus find the string of a plurality of multi-lane CACC vehicles. As such, many lanes may be occupied by the multi-lane CACC string. At this time, the CACC vehicles in the multi-lane CACC string may broadcast CACC mode information (e.g., CACCMode=2) indicating the multi-lane CACC mode.

As shown in FIG. 32(b), the subject vehicle may activate single lane CACC based on the received CACC mode information. For example, the subject vehicle may select the single lane CACC mode, as its CACC mode, using the single lane CACC mode received from the CACC vehicles in the multi-lane CACC string. At this time, the subject vehicle may determine whether the number of CACC vehicles included in the multi-lane CACC string or the number of lanes where the CACC vehicle is located is more than a preset number limit based on the received CACC mode information and, if it is more than the preset number limit, select the single lane CACC mode as its CACC mode. Thus, the number of lanes occupied by the multi-lane CACC string may be prevented from increasing.

In this case, the subject vehicle may determine that one CACC vehicle among the multi-lane CACC vehicles is the target vehicle and may follow the target vehicle on the same lane. According to an embodiment, the subject vehicle may broadcast the CACC mode information indicating the single lane CACC mode which is its CACC mode.

For various reasons, the subject vehicle may have difficulty in maintaining the current CACC mode or, if maintaining the current CACC mode, its traffic efficiency or fuel efficiency may be lowered. In this case, the subject vehicle may terminate the CACC or switch the CACC mode between the single lane CACC mode and the multi-lane CACC mode to thereby maintain the CACC. Described below is an embodiment of switching the CACC mode between the single lane CACC mode and the multi-lane CACC mode with reference to FIGS. 33 and 34.

FIG. 33 illustrates a method in which a subject vehicle changes a CACC mode according to an embodiment of the disclosure. In particular, the embodiment of FIG. 33 shows a method in which the subject vehicle switches the CACC mode from the single lane CACC mode to the multi-lane CACC mode. In the embodiment of FIG. 33, it is assumed that vehicle A is vehicle B's target vehicle, and vehicle B is vehicle A's subject vehicle.

As shown in FIG. 33(a), where CACC is not activated (no CACC), vehicle B may find the target vehicle. As shown in FIG. 33(b), vehicle B may determine that vehicle A is the target vehicle and select the single lane CACC mode as its CACC mode. By so doing, vehicle B may follow vehicle A, as the target vehicle, on the same lane.

As shown in FIG. 33(c), the single lane CACC may be disturbed. For example, as other vehicle cuts in between vehicle B and vehicle A which is vehicle B's target vehicle, the single lane CACC service may be disturbed. According to an embodiment, vehicle B may detect the cut-in vehicle via its own sensor.

As shown in FIG. 33(d), where the single lane CACC service is disturbed, vehicle B may switch the CACC mode from the single lane CACC mode to the multi-lane CACC mode. By so doing, vehicle B may follow vehicle A on a different lane. In such a manner, vehicle B may keep on following vehicle A although disturbed by a cut-in vehicle.

FIG. 34 illustrates a method in which a subject vehicle changes a CACC mode according to another embodiment of the disclosure. In particular, the embodiment of FIG. 34 shows a method in which the subject vehicle switches the CACC mode from the multi-lane CACC mode to the single lane CACC mode. In the embodiment of FIG. 34, it is assumed that vehicle A is vehicle B's target vehicle, and vehicle B is vehicle A's subject vehicle.

As shown in FIG. 34(*a*), vehicle B which is in the multi-lane CACC mode may follow vehicle A, as the target vehicle, on a different lane. In this case, vehicle B may follow vehicle A at a preset gap b.

As shown in FIG. 34(*b*), there may be other vehicle travelling at a second speed (e.g., 30 km/h) which is lower than a first speed (e.g., 60 km/h), in front of vehicle B travelling at the first speed. In this case, vehicle B's multi-lane CACC service may be disturbed by the preceding vehicle. According to an embodiment, vehicle B may detect the preceding vehicle via its own sensor.

As shown in FIG. 34(*c*), where the multi-lane CACC service is disturbed, vehicle B may switch the CACC mode from the multi-lane CACC mode to the single lane CACC mode. By so doing, vehicle B may follow vehicle A on the same lane. In such a manner, vehicle B may keep on following vehicle A although disturbed by the preceding vehicle.

CACC Status Transition Model

A CACC status transition model including the single lane CACC mode and multi-lane CACC mode as CACC modes is described below with reference to FIG. 35.

FIG. 35 illustrates a CACC state transition model according to another embodiment of the disclosure. Unlike in the embodiment of FIG. 12, in the embodiment of FIG. 35, the CACC mode may include the single lane CACC mode and the multi-lane CACC mode. Thus, the CACC status transition model according to the embodiment of FIG. 35, unlike the CACC status transition model according to the embodiment of FIG. 12, may further include a CACC mode decision status, and the CACC activated status may be divided into a single lane CACC activated status and a multi-lane CACC activated status.

In the embodiment of FIG. 35, entry into each status may require a confirmation/permission from the CACC application or the driver. For example, target vehicle (TV) discovery, CACC mode decision, CACC activation, or CACC end status may first be determined by the CACC management entity and, as necessary, a confirmation/permission from the CACC application or the driver may be needed. Each status is described below with reference to FIG. 35.

CACC Disabled: A status in which the CACC application has been disabled. This status may be triggered when the CACC application is turned off. For example, if the CACC application is turned off in the TV discovery status, CACC mode decision status, CACC terminated status, or CACC activated status (single lane CACC activated status or multi-lane CACC activated status), the CACC application may enter this status.

CACC Enabled: A status in which the CACC application has been enabled. This status may be triggered when the CACC application is turned on. According to an embodiment, this status may include the TV discovery status, CACC mode decision status, CACC activated status (single lane CACC activated status or multi-lane CACC activated status) and/or the CACC terminated status.

TV Discovery: A status in which the CACC application discovers the target vehicle. This status may be triggered when the CACC application is turned on in the CACC disabled status. As such, the enabled CACC application may discover and select the target vehicle by performing a preset TV discovery procedure.

CACC mode decision: A status to determine the CACC mode. This status may be triggered when the target vehicle is selected in the TV discovery status. In this status, the CACC application may determine whether the CACC mode is the single lane CACC mode or multi-lane CACC mode.

Single Lane CACC Activated: A status in which the single lane CACC mode has been activated. This status may be triggered when the single lane CACC mode is decided as the CACC mode in the CACC mode decision status. In this status, the CACC application may determine whether a preset termination condition is met or whether a mode switch condition is met. Unless the termination condition and the mode switch condition are met, the CACC application may maintain this status.

When the termination condition is met, the CACC application may enter the CACC terminated status. Or, when the mode switch condition is met, the CACC application may enter the multi-lane CACC activated status. The termination condition and mode switch condition are described below.

Multi-lane CACC Activated: A status in which the multi-lane CACC mode has been activated. This status may be triggered when the multi-lane CACC mode is decided as the CACC mode in the CACC mode decision status. In this status, the CACC application may determine whether a preset termination condition is met or whether a mode switch condition is met. Unless the termination condition and the mode switch condition are met, the CACC application may maintain this status.

When the termination condition is met, the CACC application may enter the CACC terminated status. Or, when the mode switch condition is met, the CACC application may enter the single lane CACC activated status. The termination condition and mode switch condition are described below.

CACC Terminated: A status in which the CACC application has been terminated. This status may be triggered when the target vehicle is not selected in the TV discovery status. Or, this status may be triggered when a preset termination condition is met in the single lane CACC activated status or multi-lane CACC activated status. Meanwhile, the CACC application may again perform the TV discovery procedure if CACC terminated. Even in this status, since the CACC application is in the enabled status, the CACC application may enter the TV discovery status again, e.g., if the CACC is not turned off.

CACC with Lane Change

Described below is a method of changing lanes of a subject vehicle providing a CACC service with reference to FIG. 36. In particular, the operation of the subject vehicle when the target vehicle changes lanes is described.

FIG. 36 illustrates a method in which a subject vehicle operates when changing lanes according to an embodiment of the disclosure.

As shown in FIG. 36(*a*), the subject vehicle may follow the target vehicle in the single lane CACC mode. At this time, the target vehicle may change lanes as shown in FIG. 36(*b*). According to an embodiment, the target vehicle may broadcast a V2X message containing information indicating a CACC lane change (lane change indication information). For example, the target vehicle may broadcast an event notification message (e.g., a DENM message) containing the lane change indication information. For example, the target vehicle may broadcast an event notification message having a cause code indicating a CACC lane change and a sub cause code value indicating a change to the right lane. The event notification message is described below.

The subject vehicle may recognize a CACC lane change of the target vehicle. According to an embodiment, the subject vehicle may recognize a lane change of the target vehicle using the V2X message containing the lane change indication information received from the target vehicle or a lane recognition system (e.g., a vehicle's sensor).

Where the subject vehicle recognizes the target vehicle's lane change as shown in FIG. 36(c) to (e), the subject vehicle may terminate the CACC, change its lane following the target vehicle to thereby follow the target vehicle in the single lane CACC mode or may maintain the current lane to thereby follow the target vehicle in the multi-lane CACC mode.

The subject vehicle's specific operations according to the CACC capability are described below. First, a method of changing lanes when the subject vehicle provides only CACC services (CACC only) is described. Also described is a lane change method when the subject vehicle provides a CACC service with a lane recognition system. Also described is a lane change method when the subject vehicle provides a CACC service with a lane keeping system.

CACC Only (First Capability)

The subject vehicle with the first capability or whose first capability has been activated may follow the target vehicle only in the single lane CACC mode. For example, where the subject vehicle lacks the lane recognition system and the lane keeping system or the systems are not activated, the subject vehicle may follow the target vehicle only in the single lane CACC mode.

Where the target vehicle maintains the lane, the subject vehicle may follow the target vehicle in the current mode, i.e., the single lane CACC mode. Or, if the target vehicle changes lanes, the subject vehicle may not directly recognize whether the target vehicle has changed lanes. Thus, in this case, the target vehicle needs to provide the subject vehicle with information indicating whether the target vehicle has changed lanes (lane change indication information). According to an embodiment, the lane change indication information may be transferred in an event notification message, e.g., a DENM message. Table 3 shows an example of the lane change indication information of the target vehicle.

TABLE 3

| Cause code description | Direct cause code | Sub cause code | Sub cause description |
|---|---|---|---|
| CACC Lane Change | xxx | 0 | Unavailable |
|  |  | 1 | To the left lane |
|  |  | 2 | To the right lane |

Referring to FIG. 3, the lane change indication information may be the cause code indicating a CACC lane change. At this time, the direct cause code may have any value different from the currently defined direct cause code value. The sub cause code may have a value between 0 and 1. For example, when the sub cause code value is 0, this may indicate unavailable, when the sub cause code value is 1, this may indicate a change to the left lane, and when the sub cause code value is 2, this may indicate a change to the right lane.

The target vehicle may broadcast a V2X message (ITS message) containing the lane change indication information, and the subject vehicle receiving the V2X message may determine whether to keep on following the target vehicle based the V2X message. According to an embodiment, whether the subject vehicle keeps on following the target vehicle may be determined by the selection of the driver of the subject vehicle or based on a preset reference.

When the subject vehicle is determined to keep on following the target vehicle, the subject vehicle may maintain the single lane CACC activated status and, based on the lane change indication information, change lanes and keep on following the target vehicle. This is why the subject vehicle with the first capability are unable to recognize lanes and thus may not follow in multi-lane CACC.

Where the subject vehicle is determined not to keep on following the target vehicle, the subject vehicle may terminate the CACC. This may be an example CACC termination condition.

CACC with Lane Recognition System (Second Capability)

The subject vehicle with the second capability or whose second capability has been activated may follow the target vehicle only in the single lane CACC mode with the lane recognition system. For example, where the subject vehicle has the lane recognition system which has been activated but lacks the lane keeping system or has it but the lane keeping system has not been activated, the subject vehicle may follow the target vehicle in single lane CACC with the lane recognition system.

Where the target vehicle maintains the lane, the subject vehicle may follow the target vehicle in the current mode, i.e., the single lane CACC mode. Or, where the target vehicle changes lanes, the subject vehicle may recognize whether the target vehicle has changed lanes using the lane recognition system. In this case, the subject vehicle may determine whether to keep on following the target vehicle and which CACC mode it will keep on following the target vehicle in. This is why unlike the subject vehicle with the first capability (CACC only), the subject vehicle with the second capability is able to recognize lanes using the lane recognition system and may thus follow the subject vehicle in multi-lane CACC as well as single lane CACC. According to an embodiment, whether to keep on following the target vehicle and which CACC mode it will follow the target vehicle in may be determined by the selection of the driver of the subject vehicle or based on a preset reference.

When the subject vehicle is determined to keep on following the target vehicle in the single lane CACC mode, the subject vehicle may maintain the CACC activated status (single lane CACC activated status), change lanes, and keep on following the target vehicle.

When the subject vehicle is determined to keep on following the target vehicle in the multi-lane CACC mode, the subject vehicle may switch the CACC activated status from the single lane CACC activated status to the multi-lane CACC activated status, maintain the current lane, and keep on following the target vehicle. This may be an example CACC mode switch condition.

Where the subject vehicle is determined not to keep on following the target vehicle, the subject vehicle may terminate the CACC. This may be an example CACC termination condition.

CACC with Lane Keeping System (Third Capability)

The subject vehicle with the third capability or whose third capability has been activated may follow the target vehicle in the single lane CACC mode with the lane recognition system and the lane keeping system. For example, where the subject vehicle has the lane recognition system and the lane keeping system and the systems have been activated, the subject vehicle may follow the target vehicle in the single lane CACC mode with the lane recognition system and the lane keeping system.

Where the target vehicle maintains the lane, the subject vehicle may follow the target vehicle in the current mode, i.e., the single lane CACC mode. Or, where the target vehicle changes lanes, the subject vehicle may recognize whether the target vehicle has changed lanes using the lane recognition system and may maintain the current lane using the lane keeping system.

Even in this case, however, the subject vehicle may determine whether to keep on following the target vehicle and which CACC mode it will keep on following the target vehicle in. According to an embodiment, whether to keep on following the target vehicle and which CACC mode it will follow the target vehicle in may be determined by the selection of the driver of the subject vehicle or based on a preset reference.

When the subject vehicle is determined to keep on following the target vehicle in the single lane CACC mode, the subject vehicle may maintain the CACC activated status (single lane CACC activated status), temporarily release the lane keeping system, change lanes, and keep on following the target vehicle.

When the subject vehicle is determined to keep on following the target vehicle in the multi-lane CACC mode, the subject vehicle may switch the CACC activated status from the single lane CACC activated status to the multi-lane CACC activated status, maintain the current lane using the lane keeping system, and keep on following the target vehicle. This may be an example CACC mode switch condition.

Where the subject vehicle is determined not to keep on following the target vehicle, the subject vehicle may terminate the CACC. This may be an example CACC termination condition.

CACC Message Format

The CACC message format is described below. The message format for CACC may be a CACC dedicated message format or an expansion of the legacy ITS message. The dedicated CACC message format is described with reference to FIGS. 37 and 38, and the ITS message format expanded for CACC is described with reference to FIGS. 39 and 40.

FIG. 37 illustrates a dedicated CACC message format according to an embodiment of the disclosure.

Referring to FIG. 37, the dedicated CACC message may include an ITS PDU header and/or a CACC management container. Optionally, the dedicated CACC message may further include add a location container and an application container. Each container and the fields included in each container are described below.

ITS PDU header: common header field for all ITS message formats

CACC management container: including information required for CACC management and CACC operation.

location container: describes the location of the vehicle transmitting this message.

application container: includes application-specific information.

CACC mode: identifies/indicates the CACC mode. That is, this indicates whether the CACC mode is the single lane CACC mode or multi-lane CACC mode.

target vehicle ID (TVID): identifies/indicates the target vehicle's ID.

causeCode: identifies various contexts including, e.g., a lane change.

FIG. 38 illustrates a dedicated CACC message format according to another embodiment of the disclosure. In connection with FIG. 38, those described above with reference to FIG. 37 are not described.

Referring to FIG. 38, the dedicated CACC message may include an ITS PDU header and/or a CACC management container. Optionally, the dedicated CACC message may further include add a location container and an application container. The same description given in connection with FIG. 37 is applied to the ITS PDU header, CACC management container, location container and application container, and CACC mode, TVID, and causeCode field included in the CACC management container.

In the embodiment of FIG. 38, the CACC management container may further include additional fields other than the CACC mode, TVID, and causeCode fields. The additional fields included in the CACC management container are described below.

CACCStringID: indicates the ID of the CACC string.
orderInString: indicates the position in the CACC string.
CACCStringLength: indicates the length of the CACC string.
CACCStringLVPosition: indicates the position of the lead vehicle in the CACC string.
CACCStringLengthLimit: indicates the currently allowed length limit (in number) of the CACC string.
CACCStringLengthLimitGD: indicates the currently allowed length limit (in geometrical distance) of the CACC string.
CACCStringNumLimit: indicates the currently allowed number limit of the CACC string.
CACCStringLane: indicates the lane position of the CACC string.
CACCStringAllowedLane: indicates the currently allowed lane position for the CACC string.
CACCStringDesignatedLane: indicates the currently designated lane position for the CACC string.

As shown in FIGS. 37 and 38, information for CACC may be provided using a separate CACC dedicated message format.

FIG. 39 illustrates an expansion of a CAM message for CACC according to an embodiment of the disclosure.

Referring to FIG. 39, a CAM message may include a CAM extension part, and the CAM extension part may optionally include a CACC management container for CACC. The CACC management container included in the CAM extension part may include a CACC mode field, a TVIS field, and a causecode field, to which the same description given with reference to FIG. 37 may be applied.

FIG. 40 illustrates an expansion of a CAM message for CACC according to another embodiment of the disclosure.

Referring to FIG. 40, a CAM message may include a CAM extension part, and the CAM extension part may optionally include a CACC management container for CACC. The same description given with reference to FIG. 38 may be applied to each field included in the CACC management container included in the CAM extension part.

As shown in FIGS. 39 and 40, information for CACC may be provided by expanding the CAM message rather than using a separate CACC dedicated message format. The information for CACC may also be provided through an expansion of an event notification message, e.g., a DENM message, but not a CAM message.

FIG. 41 illustrates a message flow for CACC activation according to an embodiment of the disclosure. In the embodiment of FIG. 41, the subject vehicle (vehicle ITS station/V2X communication device) may be implemented according to the CACC protocol architecture of FIG. 21.

Referring to FIG. 41, the subject vehicle may turn on the CACC application. When the CACC application is turned on, the subject vehicle may switch the CACC status from the CACC disabled status to the CACC enabled status and TV discovery status. For example, where the CACC application is turned on, the CACC application may transfer a CACC enabling signal/message to the CACC management entity, and upon receiving the CACC enabling signal/message, the CACC management entity may switch the CACC status from the CACC disabled status to the CACC enabled status and TV discovery status. In this case, the CACC management entity may transfer an optional report containing the CACC status information to the CACC application.

The subject vehicle may gather the subject vehicle's vehicle information (SV information) using the vehicle and sensing information gathering entity. The vehicle and sensing information gathering entity may gather the vehicle information and transfer the gathered vehicle information to the CACC management entity.

The subject vehicle may receive a candidate target vehicle's vehicle information (TV information) from the candidate target vehicle via V2X communication. For example, the subject vehicle may receive a V2X message containing the TV information received via V2X communication, perform access layer processing and network/transport layer processing on the V2X message, and transfer the resultant information to the V2V/I2V messaging entity. The V2V/I2V messaging entity may obtain the TV information from the V2X message. Thereafter, the V2V/I2V messaging entity may transfer the obtained TV information to the CACC management entity. By such a process, the vehicle information for the candidate target vehicle may be received by the subject vehicle via V2X communication and be then transferred to the CACC management entity.

Further, the subject vehicle may receive environment information from the roadside ITS-S via I2V communication. For example, the subject vehicle may receive a V2X message (I2V message) containing the environment information received via I2V communication, perform access layer processing and network/transport layer processing on the V2X message, and transfer the resultant information to the V2V/I2V messaging entity. The V2V/I2V messaging entity may obtain the environment information from the V2X message. Thereafter, the V2V/I2V messaging entity may transfer the obtained environment information to the CACC management entity. By such a process, the environment information may be received by the subject vehicle via I2V communication and be then transferred to the CACC management entity.

Meanwhile, according to an embodiment, the V2V/I2V messaging entity may transfer the candidate target vehicle's vehicle information and environment information both to the CACC management entity. Thus, the candidate target vehicle's vehicle information and the environment information may be transferred to the CACC management entity.

The subject vehicle may select the target vehicle using the CACC management entity. According to an embodiment, the CACC management entity may set/determine the target vehicle, CACC mode, and/or gap using the subject vehicle's vehicle information, the candidate target vehicle's vehicle information, and/or the environment information. At this time, the CACC management entity may transfer a confirmation request message to the CACC application, and the CACC application may transfer the confirmation message to the CACC management entity. At this time, the confirmation message may include information about the time gap (time gap information) and/or information about the CACC mode (CACC mode information).

The subject vehicle may switch the CACC status into the CACC activated status using the CACC management entity. According to an embodiment, the CACC management entity may switch the CACC status to the single lane CACC activated status or multi-lane CACC activated status. In this case, the CACC management entity may transfer an optional report containing the CACC status to the CACC application.

The subject vehicle may transfer the target speed information to the vehicle control entity using the CACC management entity. The vehicle control entity may control the vehicle speed based on the target speed information.

FIG. 42 illustrates a message flow for a lane change until a determination for a lane change is obtained according to an embodiment of the disclosure. In the embodiment of FIG. 41, the subject vehicle (vehicle ITS station/V2X communication device) may be implemented according to the CACC protocol architecture of FIG. 21. In connection with FIG. 42, those described above with reference to FIG. 41 are not described.

Referring to FIG. 42, first, the CACC management entity of the subject vehicle may set the CACC status to the single lane CACC activated status.

The subject vehicle may recognize a lane change of the target vehicle using the V2X message received from the target vehicle. For example, the subject vehicle may receive a V2X message containing information of a lane change of the target vehicle (lane change information) via V2X communication, perform access layer processing and network/transport layer processing on the V2X message, and transfer the resultant information to the V2V/I2V messaging entity. The V2V/I2V messaging entity may obtain the lane change information from the V2X message. Thereafter, the V2V/I2V messaging entity may notify the CACC management entity of the target vehicle's lane change. By such a process, the lane change information may be received by the subject vehicle via V2X communication and be then transferred to the CACC management entity.

Along with, or instead of, this, the subject vehicle may detect the target vehicle's lane change using its own lane recognition system. In this case, the lane recognition system may notify the CACC management entity of the target vehicle's lane change.

The subject vehicle may determine a preset decision for a lane change using the CACC management entity. In other words, the subject vehicle may determine whether there is a preset decision on a lane change of the target vehicle. The preset decision may also be referred to as a preset operation decision.

When there is the preset decision, the subject vehicle may obtain a decision on the lane change. According to an embodiment, the preset decision may include at least one of a decision not to follow (the target vehicle having changed lanes), a decision to keep following (the target vehicle having changed lanes) in the single lane CACC mode or a decision to keep following (the target vehicle having changed lanes) in the multi-lane CACC mode. According to the decision, the subject vehicle may automatically determine whether to change lanes and whether to change CACC modes.

Or, unless there is the preset decision, the subject vehicle may transfer a message to request the driver's decision on the lane change to the HMI supporting entity. In this case, the HMI supporting entity may transfer the same to the HMI entity. Thereafter, the subject vehicle may display the decision request information on the lane change using the HMI entity. Thus, the decision request information for the lane change may be provided to the user (driver). In this case, the subject vehicle may receive the information for the user's decision via the HMI entity, and the HMI entity may transfer the same to the CACC management entity. Thus, the subject vehicle may obtain the decision on the lane change.

FIG. 43 illustrates a message flow for a lane change after a determination for a lane change is obtained according to an embodiment of the disclosure. In the embodiment of FIG. 41, the subject vehicle (vehicle ITS station/V2X communication device) may be implemented according to the CACC protocol architecture of FIG. 21. In connection with FIG. 43, those described above with reference to FIGS. 41 and 42 are not described.

Referring to FIG. 43, upon obtaining the decision not to follow (the target vehicle having changed lanes) (first decision), the CACC management entity of the subject vehicle may change the CACC status to the CACC terminated status. Thus, the subject vehicle may not follow the target vehicle, which has changed lanes, any longer. In this case, the CACC management entity of the subject vehicle may transfer an optional report containing CACC status information to the CACC application.

Or, upon obtaining the decision to keep following the (target vehicle having changed lanes) in the single lane CACC mode," the CACC management entity of the subject vehicle may transfer the target speed and lane change information to the vehicle control entity. The CACC management entity may transfer a request message to turn off the lane keeping system to the lane keeping system and, thus, the lane keeping system may be turned off. Thereafter, the vehicle control entity of the subject vehicle may control the vehicle speed and lane. Thus, the subject vehicle may change lanes and follow the target vehicle in the single lane CACC mode.

Or, upon obtaining the decision to keep following (the target vehicle having changed lanes) in the multi-lane CACC mode, the CACC management entity of the subject vehicle may switch the CACC status from the single lane CACC activated status to the multi-lane CACC activated status. In this case, the CACC management entity may transfer an optional report containing the CACC status information to the CACC application. The CACC management entity may transfer the target speed information to the vehicle control entity. Thereafter, the vehicle control entity of the subject vehicle may control the vehicle speed without changing lanes. Thus, the subject vehicle may maintain the lane and follow the target vehicle in the multi-lane CACC mode.

Hybrid Communication for CACC

Hybrid communication for CACC is described below. In some contexts, direct communication between the target vehicle and the subject vehicle may be difficult. Such a scenario case arises, e.g., when a third vehicle cuts in between the two vehicles or when there is an obstacle, e.g., a road facility, which may disturb direct communication. In this case, maintaining CACC may be an issue. At this time, indirect communication via a cellular network may be used to address this issue.

FIG. 44 illustrates a simultaneous transmission method for CACC in hybrid communication according to an embodiment of the disclosure.

In the embodiment of FIG. 44, a simultaneous transmission method corresponds to a method of transmitting a message for CACC using two or more access layer techniques for direct communication and indirect communication.

As shown in FIG. 44, the CACC vehicle may generate a CACC message, perform network/transport layer processing on the CACC message, and transmit the resultant message through an access layer (access #1) for direct communication and an access layer (access #2) for indirect communication. Thus, the CACC message (V2X message) may be transmitted simultaneously via direct communication and indirect communication.

FIG. 45 illustrates an alternative transmission method for CACC in hybrid communication according to an embodiment of the disclosure.

In the embodiment of FIG. 45, an alternative transmission method corresponds to a method of transmitting a message for CACC using one of an access layer technique for direct communication or an access layer technique for indirect communication. For example, the alternative transmission method may be a method in which the access layer technique for direct communication is first used and, if the direct communication has a trouble, it switches to the access layer technique for indirect communication to transmit the message.

As shown in FIG. 45, the CACC vehicle may generate a CACC message and transfer the CACC message to the network/transport layer. The CACC vehicle may identify the availability of direct communication and indirect communication and transfer information about an available or suggested technique to the network/transport layer.

The so-transferred CACC message may be network/transport layer processed and be transferred to one of the access layer (access #1) for direct communication or the access layer (access #2) for indirect communication based on the information about the access techniques.

Thereafter, the CACC vehicle may transmit the CACC message via processing of the access layer (access #1) for direct communication or the access layer (access #2) for indirect communication. Thus, the CACC message (V2X message) may be transmitted via one of direct communication or indirect communication.

FIG. 46 illustrates a V2X communication device according to an embodiment of the disclosure.

Referring to FIG. 46, a V2X communication device 46000 may include a memory 46010, a processor 46020, and a communication unit 46030. As described above, the V2X communication device may correspond to an on board unit (OBU) or road side unit (RSU) or may be included in an OBU or RSU. Or, the V2X communication device may correspond to an ITS station or may be included in an ITS station.

The communication unit 46030 may be connected with the processor 46020 to transmit/receive wireless signals. The communication unit 46030 may up-convert data received from the processor 46020 into a transmission/reception band and transmit the signal. The communication unit may implement the operation of the access layer. According to an embodiment, the communication unit may implement the operation of the physical layer included in the access layer or may additionally implement the operation of the MAC layer. The communication unit may also include a plurality of sub communication units to perform communication according to a plurality of communication protocols.

The processor 46020 may be connected with the communication unit 46030 to implement the operation of the layers according to the ITS system or WAVE system. The processor 46020 may be configured to perform operations according to various embodiments of the disclosure as described with reference to the drawings. Further, according to various embodiments of the disclosure, at least one of a module, data, program, or software for implementing the operation of the V2X communication device 46000 may be stored in the memory 46010 and be executed by the processor 46020.

The memory 46010 is connected with the processor 46020 to store various pieces of information for driving the processor 46020. The memory 46010 may be included in the processor 46020 or be installed outside the processor 46020 and connected with the processor 46020 via a known means. The memory may include a secure/non-secure storage device or be included in a secure/non-secure storage device. According to an embodiment, the memory may be denoted a secure/non-secure storage device.

The specific configuration of the V2X communication device 46000 of FIG. 46 may be implemented so that the above-described various embodiments of the disclosure are applied independently from each other or two or more thereof are applied together.

The GNSS receiver and DSRD radio related to FIG. 2 may be included in the communication unit 46030 of FIG. 46. The DSRC device processor may be included in the communication unit 46030 or processor 46020 of FIG. 46.

FIG. 47 illustrates a method in which a V2X communication device receives a V2X message according to an embodiment of the disclosure. In the embodiment of FIG. 47, the V2X communication device may be the subject vehicle's V2X communication device.

The V2X communication device may detect a lane change of the target vehicle followed by the subject vehicle (S47010). According to an embodiment, the V2X communication device may detect the target vehicle's lane change based on lane change indication information indicating the target vehicle's lane change included in the V2X message received from the target vehicle. At this time, the lane change indication information (e.g., a cause code indicating a CACC lane change) is the same as what has been described above in connection with FIG. 36 and Table 3. For example, when the lane change indication information value is a first value, the lane change indication information may indicate that there is no lane change, when the lane change indication information value is a second value, the lane change indication information may indicate that there is a change to the left lane, and when the lane change indication information value is a third value, the lane change indication information may indicate that there is a change to the right lane.

Upon detecting the target vehicle's lane change, the V2X communication device may set the CACC mode based on a preset decision (S47020). At this time, the V2X communication device may maintain the current CACC mode or change the current CACC mode, thereby setting the CACC mode. According to an embodiment, the preset operation decision may include at least one of a decision not to follow the target vehicle having changed lanes (first decision), a decision to keep following the target vehicle having changed lanes in the single lane CACC mode (second decision), or a decision to keep following the target vehicle having changed lanes in the multi-lane CACC mode (third decision).

The V2X communication device may transmit a V2X message containing information about the set CACC mode (S47030). According to an embodiment, the CACC mode may include a single lane CACC mode to provide a single lane CACC service and a multi-lane CACC mode to provide a multi-lane CACC service. According to an embodiment, the V2X message may further include target vehicle ID information to identify the target vehicle's ID.

According to an embodiment, the V2X communication device may further include determining whether to change lanes based on the preset operation decision. For example, when the preset operation decision is the decision not to follow the target vehicle having changed lanes (first decision), the V2X communication device may determine to maintain the lane, when the preset operation decision is the decision to keep following the target vehicle having changed lanes in the single lane CACC mode (second decision), the V2X communication device may determine to change lanes, and when the preset operation decision is the decision to keep following the target vehicle having changed lanes in the multi-lane CACC mode (third decision), the V2X communication device may determine to maintain the lane.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

Mode to Practice the Disclosure

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof.

The disclosure sets forth both devices and methods, and descriptions thereof may be complementarily applicable to each other.

Various embodiments have been described in the best mode for practicing the disclosure.

INDUSTRIAL AVAILABILITY

The disclosure is used in a series of vehicle communication fields.

It is appreciated by one of ordinary skill in the art that various changes and modifications may be made to the embodiments of the disclosure without departing from the scope or spirit of the disclosure. Thus, all such changes or modifications are intended to belong to the scope of the disclosure as defined by the appended claims or equivalents thereof

The invention claimed is:

1. A method of transmitting, by a vehicle-to-everything (V2X) communication device of a subject vehicle, a V2X message, the method comprising:
   detecting a lane change of a target vehicle followed by the subject vehicle;
   upon detecting the lane change of the target vehicle, setting a CACC mode based on a preset operation decision on the lane change; and
   transmitting the V2X message including information for the set CACC mode, wherein the CACC mode includes a single lane CACC mode for providing a single lane CACC service and a multi-lane CACC mode for providing a multi-lane CACC service.

2. The method of claim 1, wherein the preset operation decision includes at least one of a decision not to follow the target vehicle having changed lanes, a decision to keep following the target vehicle having changed lanes in the single lane CACC mode, or a decision to keep following the target vehicle having changed lanes in the multi-lane CACC mode.

3. The method of claim 2, further comprising:
   determining whether to change a lane based on the preset operation decision.

4. The method of claim 3, wherein determining whether to change the lane includes:
   when the preset operation decision is the decision not to follow the target vehicle having changed lanes, determining to maintain the lane;
   when the preset operation decision is the decision to keep following the target vehicle having changed lanes in the single lane CACC mode, determining to change the lane; and
   when the preset operation decision is the decision to keep following the target vehicle having changed lanes in the multi-lane CACC mode, determining to maintain the lane.

5. The method of claim 1, wherein the V2X message further includes target vehicle ID information for identifying an ID of the target vehicle.

6. The method of claim 1, wherein detecting the lane change of the target vehicle is performed based on lane change indication information indicating the lane change of the target vehicle included in the V2X message received from the target vehicle.

7. The method of claim 6, wherein:
   when a value of the lane change indication information is a first value, the lane change indication information indicates that there is no lane change,
   when the value of the lane change indication information is a second value, the lane change indication information indicates that there is a lane change to a left, and
   when the value of the lane change indication information is a third value, the lane change indication information indicates that there is a lane change to a right.

8. The V2X communication device of claim 1, wherein the preset operation decision includes at least one of a decision not to follow the target vehicle having changed lanes, a decision to keep following the target vehicle having changed lanes in the single lane CACC mode, or a decision to keep following the target vehicle having changed lanes in the multi-lane CACC mode.

9. The V2X communication device of claim 8, further comprising
   determining whether to change a lane based on the preset operation decision.

10. The V2X communication device of claim 9, wherein determining whether to change the lane includes:
    when the preset operation decision is the decision not to follow the target vehicle having changed lanes, determining to maintain the lane;
    when the preset operation decision is the decision to keep following the target vehicle having changed lanes in the single lane CACC mode, determining to change the lane; and
    when the operation decision is the decision to keep following the target vehicle having changed lanes in the multi-lane CACC mode, determining to maintain the lane.

11. A V2X communication device of a subject vehicle, comprising: a memory storing data;
    a communication unit transmitting/receiving a wireless signal; and a processor controlling the communication unit, wherein the V2X communication device comprises:
    detecting a lane change of a target vehicle followed by the subject vehicle;
    upon detecting the lane change of the target vehicle, setting a CACC mode based on a preset operation decision; and
    transmitting a V2X message including information for the set CACC mode, wherein the CACC mode includes a single lane CACC mode for providing a single lane CACC service and a multi-lane CACC mode for providing a multi-lane CACC service.

12. The V2X communication device of claim 11, wherein the V2X message further includes target vehicle ID information for identifying an ID of the target vehicle.

13. The V2X communication device of claim 11, wherein detecting the lane change of the target vehicle is performed based on lane change indication information indicating the lane change of the target vehicle included in the V2X message received from the target vehicle.

14. The V2X communication device of claim 13, wherein:
    when a value of the lane change indication information is a first value, the lane change indication information indicates that there is no lane change,
    when the value of the lane change indication information is a second value, the lane change indication information indicates that there is a lane change to a left, and
    when the value of the lane change indication information is a third value, the lane change indication information indicates that there is a lane change to a right.

* * * * *